(12) United States Patent
Evans et al.

(10) Patent No.: US 10,201,941 B2
(45) Date of Patent: *Feb. 12, 2019

(54) SYSTEMS FOR ADDITIVELY MANUFACTURING COMPOSITE PARTS

(71) Applicant: The Boeing Company, Chicago, IL (US)

(72) Inventors: Nick S. Evans, Lynnwood, WA (US); Faraón Torres, Seattle, WA (US); Ryan G. Ziegler, Mill Creek, WA (US); Samuel F. Harrison, Bothell, WA (US); Ciro J. Grijalva, III, Seattle, WA (US); Hayden S. Osborn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 347 days.

This patent is subject to a terminal disclaimer.

(21) Appl. No.: 14/920,748

(22) Filed: Oct. 22, 2015

(65) Prior Publication Data

US 2017/0028633 A1    Feb. 2, 2017

Related U.S. Application Data

(60) Provisional application No. 62/199,665, filed on Jul. 31, 2015.

(51) Int. Cl.
*B29C 64/20*    (2017.01)
*B29C 70/54*    (2006.01)
(Continued)

(52) U.S. Cl.
CPC .......... *B29C 70/545* (2013.01); *B29B 15/125* (2013.01); *B29C 64/106* (2017.08);
(Continued)

(58) Field of Classification Search
CPC ... B29C 67/0088; B29C 70/28; B29C 70/521; B29C 53/8066; G01B 17/02; B05D 1/28; B29B 15/08
(Continued)

(56) References Cited

U.S. PATENT DOCUMENTS 3,600,272 A    8/1971    Cortigene et al.
3,813,976 A    6/1974    Greer
(Continued)

FOREIGN PATENT DOCUMENTS

CN    103817937    5/2014
DE    201310103973    10/2014
(Continued)

OTHER PUBLICATIONS

European Patent Office, Partial European Search Report for related European patent application EP 16 16 8653, dated Dec. 12, 2016.
(Continued)

*Primary Examiner* — Galen H Hauth
*Assistant Examiner* — Cedrick S Williams
(74) *Attorney, Agent, or Firm* — Dascenzo Intellectual Property Law, P.C.

(57) ABSTRACT

A system comprises a delivery guide movable relative to a surface. The delivery guide is configured to deposit a continuous flexible line along a print path that is stationary relative to the surface. The system further comprises a vessel, configured to hold a volume of a liquid photopolymer resin and to apply a quantity of the liquid photopolymer resin to the non-resin component to create the continuous flexible line. The system further comprises a feed mechanism, configured to pull the non-resin component through the vessel and to push the continuous flexible line out of the delivery guide. The system further comprises a source of curing energy. The source is configured to deliver the curing
(Continued)

energy at least to a portion of the segment of the continuous flexible line after the segment of the continuous flexible line exits the delivery guide.

66 Claims, 25 Drawing Sheets

(51) Int. Cl.
  B29C 70/38    (2006.01)
  B29B 15/12    (2006.01)
  B29C 69/00    (2006.01)
  B29C 70/16    (2006.01)
  B29C 64/106   (2017.01)
  B29C 64/165   (2017.01)
  B29C 64/386   (2017.01)
  B33Y 30/00    (2015.01)
  B33Y 50/02    (2015.01)
  B29K 105/00   (2006.01)
  B29K 105/10   (2006.01)
  B29L 31/30    (2006.01)

(52) U.S. Cl.
  CPC ............ *B29C 64/165* (2017.08); *B29C 64/20* (2017.08); *B29C 64/386* (2017.08); *B29C 69/001* (2013.01); *B29C 70/16* (2013.01); *B29C 70/38* (2013.01); *B29C 70/382* (2013.01); *B29K 2105/0058* (2013.01); *B29K 2105/10* (2013.01); *B29K 2105/25* (2013.01); *B29L 2031/3076* (2013.01); *B33Y 30/00* (2014.12); *B33Y 50/02* (2014.12)

(58) Field of Classification Search
  USPC .......................................... 427/420; 425/147
  See application file for complete search history.

(56) References Cited

U.S. PATENT DOCUMENTS

| | | | |
|---|---|---|---|
| 4,154,634 A | 5/1979 | Shobert et al. | |
| 4,378,343 A | 3/1983 | Sugiura et al. | |
| 4,435,246 A | 3/1984 | Green | |
| 4,943,472 A | 7/1990 | Dyksterhouse et al. | |
| 5,204,124 A | 4/1993 | Secretan et al. | |
| 5,294,461 A | 3/1994 | Ishida | |
| 5,340,433 A * | 8/1994 | Crump .................. | B22F 3/115 118/202 |
| 5,398,193 A | 3/1995 | deAngelis | |
| 5,495,328 A | 2/1996 | Spence et al. | |
| 5,936,861 A * | 8/1999 | Jang ...................... | B29C 70/384 700/98 |
| 6,129,872 A * | 10/2000 | Jang ........................ | B29C 41/36 264/245 |
| 6,149,856 A * | 11/2000 | Zemel .................. | B29C 35/0288 264/401 |
| 6,214,279 B1 | 4/2001 | Yang et al. | |
| 6,395,210 B1 * | 5/2002 | Head ..................... | B29C 70/525 264/137 |
| 6,722,872 B1 | 4/2004 | Swanson et al. | |
| 7,114,943 B1 | 10/2006 | Fong et al. | |
| 8,133,537 B2 | 3/2012 | Nair et al. | |
| 8,801,990 B2 | 8/2014 | Mikulak et al. | |
| 8,920,697 B2 | 12/2014 | Mikulak et al. | |
| 9,149,989 B2 | 10/2015 | Uckelmann | |
| 2003/0044593 A1 | 3/2003 | Vaidyanathan et al. | |
| 2004/0119188 A1 | 6/2004 | Lowe | |
| 2005/0023719 A1 | 2/2005 | Nielsen et al. | |
| 2005/0038222 A1 * | 2/2005 | Joshi .................. | B29C 53/8066 528/44 |
| 2005/0104241 A1 | 5/2005 | Kritchman et al. | |
| 2005/0116391 A1 | 6/2005 | Lindemann et al. | |
| 2005/0248065 A1 * | 11/2005 | Owada .................. | B29C 64/106 264/494 |
| 2007/0029030 A1 | 2/2007 | McCowin | |
| 2008/0213419 A1 * | 9/2008 | Skubic ................ | B29C 47/0806 425/113 |
| 2008/0315462 A1 | 12/2008 | Batzinger et al. | |
| 2009/0095410 A1 | 4/2009 | Oldani | |
| 2009/0130449 A1 | 5/2009 | El-Siblani | |
| 2009/0314391 A1 | 12/2009 | Crump et al. | |
| 2010/0024964 A1 * | 2/2010 | Ingram, Jr. ........... | B29C 53/587 156/189 |
| 2010/0084087 A1 | 4/2010 | McCowin et al. | |
| 2010/0190005 A1 | 7/2010 | Nair et al. | |
| 2011/0147993 A1 * | 6/2011 | Eshed ................... | B33Y 10/00 264/308 |
| 2011/0300301 A1 | 12/2011 | Fernando et al. | |
| 2014/0061974 A1 * | 3/2014 | Tyler .................. | B29C 67/0055 264/401 |
| 2014/0086780 A1 | 3/2014 | Miller et al. | |
| 2014/0154347 A1 | 6/2014 | Dilworth et al. | |
| 2014/0263534 A1 | 9/2014 | Post et al. | |
| 2014/0265000 A1 | 9/2014 | Magnotta et al. | |
| 2014/0265040 A1 | 9/2014 | Batchelder | |
| 2014/0291886 A1 | 10/2014 | Mark et al. | |
| 2014/0328964 A1 * | 11/2014 | Mark .................. | B29C 67/0088 425/166 |
| 2014/0375794 A1 | 12/2014 | Singh | |
| 2015/0008422 A1 | 1/2015 | Lee et al. | |
| 2015/0037599 A1 | 2/2015 | Blackmore | |
| 2015/0044377 A1 * | 2/2015 | Tibor ..................... | B29C 47/02 427/358 |
| 2015/0048553 A1 * | 2/2015 | Dietrich ................ | B22F 3/1055 264/401 |
| 2015/0140230 A1 | 5/2015 | Jones et al. | |
| 2015/0165691 A1 | 6/2015 | Mark et al. | |
| 2015/0174824 A1 | 6/2015 | Gifford et al. | |
| 2015/0217517 A1 | 8/2015 | Karpas et al. | |
| 2015/0266243 A1 | 9/2015 | Mark et al. | |
| 2015/0291833 A1 | 10/2015 | Kunc et al. | |
| 2016/0136897 A1 * | 5/2016 | Nielsen-Cole ......... | B33Y 30/00 425/131.1 |
| 2016/0159009 A1 * | 6/2016 | Canale .................. | B29C 64/106 264/401 |
| 2016/0303793 A1 * | 10/2016 | Ermoshkin ............ | B33Y 10/00 |
| 2016/0332363 A1 * | 11/2016 | Moore ................ | B29C 65/1412 |
| 2017/0129180 A1 | 5/2017 | Coates et al. | |

FOREIGN PATENT DOCUMENTS

| | | |
|---|---|---|
| DE | 102015002967 | 10/2016 |
| EP | 1151849 | 11/2001 |
| JP | 2015174284 | 10/2015 |
| WO | WO 2006/020685 | 2/2006 |
| WO | WO 2012/039956 | 3/2012 |
| WO | WO 2013/086577 | 6/2013 |
| WO | WO 2014/153535 | 9/2014 |
| WO | WO 2015/009938 | 1/2015 |
| WO | WO2015193819 | 12/2015 |
| WO | WO 2016/053681 | 4/2016 |
| WO | WO 2016125138 | 8/2016 |
| WO | WO 2016139059 | 9/2016 |
| WO | WO2016149181 | 9/2016 |

OTHER PUBLICATIONS

Printout of online article, "Improving Additive Manufacturing (3D Printing) using Infrared Imaging," Aug. 10, 2016, from AZoM.com website, downloaded on Nov. 4, 2016.
Website screenshots showing Stratonics ThermaViz® Sensor Systems, from Stratonics.com website, downloaded on Nov. 4, 2016.
Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.
Hu et al., "Sensing, Modeling and Control for Laser-Based Additive Manufacturing," International Journal of Machine Tools and Manufacture, No. 43, pp. 51-60, 2003.

(56) References Cited

OTHER PUBLICATIONS

Screenshots of online article, Evan Milberg, "*Arevo Labs Introduces First Robot-Based Platform for 3-D Printing Composite Parts*," Composites Manufacturing Magazine website, Nov. 23, 2015, downloaded from compositesmanufacturingmagazine.com/2015/11/arevo-labs-introduces-first-robot-based-platform-for-3-d-printing-composite-parts/ on Jan. 12, 2016.
Printout of online article, Jeff Sloan, "*Arevo Labs launches 3D printing platform for composite parts fabrication*," CompositesWorld website, Nov. 16, 2015, downloaded from compositesworld.com/products/arevo-labs-launches-3D-printing-platform-for-composite-parts-fabrication on Dec. 9, 2015.
European Patent Office, Extended European Search Report for related European patent application EP 16168653, dated Mar. 27, 2017.
Ogale et al., "Fabrication of Fiber Reinforced Plates with Curvilinear Layout by 3-D Photolithography," 26th International SAMPE Technical Conference, vol. 26, pp. 54-61, Oct. 17-20, 1994.
Ogale et al., "3-Dimensional Composite Photolithography," Proceedings of the American Society for Composites, Eleventh Technical Conference, pp. 822-828, Oct. 7-9, 1996.
Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.
Gupta et al., "Dual Curing of Carbon Fiber Reinforced Photoresins for Rapid Prototyping," Polymer Composites, vol. 23, No. 6, pp. 1162-1170, Dec. 2002.
Website screenshots showing "Fiber Composite 3D Printing," downloaded from makezine.com/2014/11/05/fiber-composite-3d-printing/, Jun. 2, 2015.
User Manual for 3Doodler 2.0, downloaded from the3doodler.com/manuals/, Aug. 19, 2015.
Website article "Automated Fiber Placement," downloaded from automateddynamics.com/article/thermoplastic-composite-basics/processing-methods/automated-fiber-placement, Aug. 19, 2015.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, downloaded from sciencedirect.com/science/article/pii/S0010448510001788, Aug. 19, 2015.
Website screenshots showing The Mark One Composite 3D Printer, downloaded from markforged.com/mark-one/, Aug. 19, 2015.
Website article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Website screenshots showing Krassenstein "Orbital Composites to Make 3D Printing 100 Times Faster Using Carbon Fiber, Fiber Optics, Injection & More," Apr. 28, 2015, downloaded from 3dprint.com/60662/orbital-composites/, Aug. 19, 2015.
Website article "Carbon3D Introduces Breakthrough CLIP Technology for Layerless 3D Printing, 25-100x Faster," Mar. 17, 2015, downloaded from 3ders.org/articles/20150317-carbon3d-introduces-breakthrough-clip-technology-for-layerless-3d-printing.html, Aug. 19, 2015.
Website screenshots showing the Form 1+ SLA 3D Printer, downloaded from formlabs.com/products/form-1-plus/, Aug. 20, 2015.
Formlabs, Frequently Asked Questions (re the Form1+ SLA 3D Printer), downloaded from formlabs.com/support/faq/, Aug. 19, 2015.
Website screenshots showing "Fiber Composite 3D Printing (The Bug)," downloaded from instructables.com/id/Fiber-Composite-3D-Printing-The-Bug/?ALLSTEPS, Aug. 20, 2015.
Machine generated English translation of abstract for DE 201310103973 downloaded from Espacenet.com on Nov. 1, 2017.
Machine generated English translation of CN 103817937, dated Mar. 26, 2018.
Machine generated English translation of the abstract of JP2015174284, downloaded from Espacenet.com Jun. 12, 2018.
Machine generated English translation of the abstract of DE102015002967, downloaded from Espacenet.com Jun. 12, 2018.

\* cited by examiner

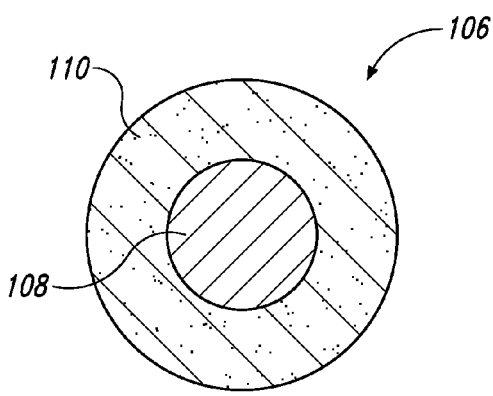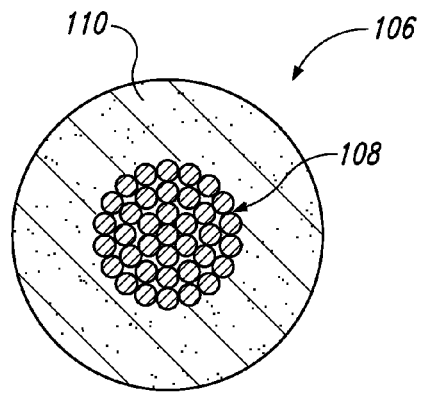
Fig. 4    Fig. 5
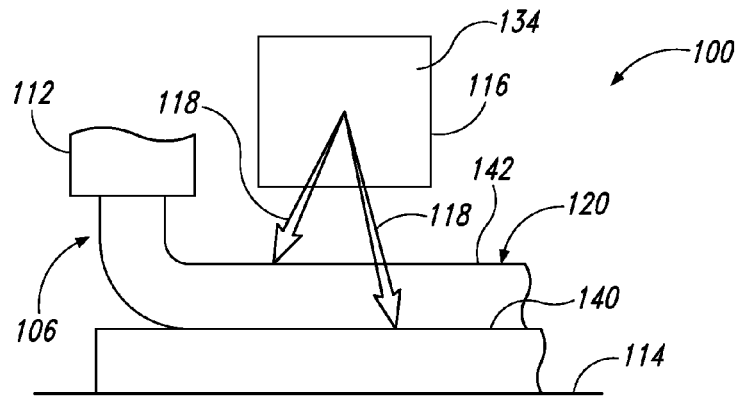
Fig. 6
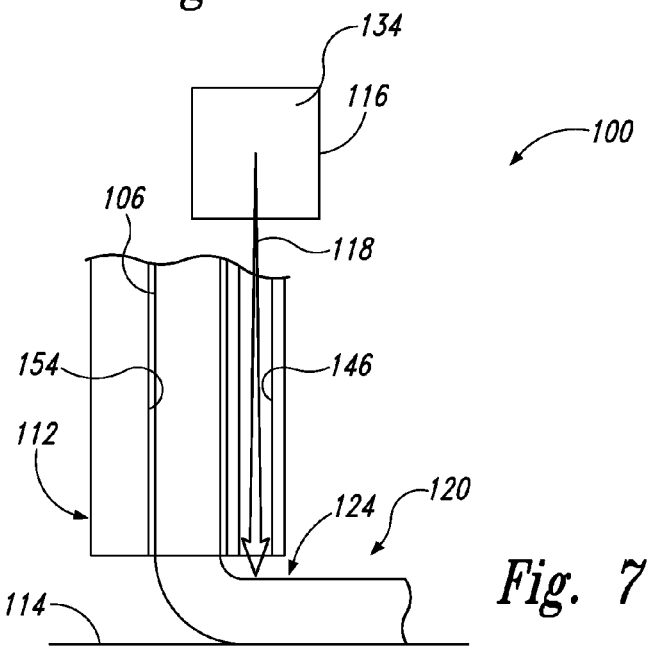
Fig. 7

SYSTEMS FOR ADDITIVELY MANUFACTURING COMPOSITE PARTS

RELATED APPLICATION

This application claims priority to U.S. Provisional Patent Application No. 62/199,665, entitled "SYSTEMS AND METHODS FOR ADDITIVELY MANUFACTURING COMPOSITE PARTS," which was filed on Jul. 31, 2015, and the complete disclosure of which is hereby incorporated by reference.

BACKGROUND

Conventionally, manufacturing of typical composite parts relies on sequential layering of multiple plies of composite material, with each ply containing, e.g., unidirectional reinforcement fibers or randomly oriented chopped fibers. Parts manufactured in this manner must have laminar construction, which undesirably increases the weight of the finished part, since not all of the reinforcement fibers are oriented along the direction(s) of the force(s) to be applied to the parts. Additionally, limitations inherent to laminar techniques of manufacturing composites are not conducive to implementation of many types of advanced structural designs.

SUMMARY

Accordingly, apparatuses and methods, intended to address at least the above-identified concerns, would find utility.

The following is a non-exhaustive list of examples, which may or may not be claimed, of the subject matter according the present disclosure.

One example of the present disclosure relates to a system for additively manufacturing a composite part. The system comprises a delivery guide movable relative to a surface. The delivery guide is configured to deposit at least a segment of a continuous flexible line along a print path. The print path is stationary relative to the surface. The system further comprises a vessel, configured to hold a volume of a liquid photopolymer resin and to apply a quantity of the liquid photopolymer resin to the non-resin component. The system further comprises a feed mechanism, configured to pull the non-resin component through the vessel and to push the continuous flexible line out of the delivery guide. The continuous flexible line comprises the non-resin component and further comprises a photopolymer-resin component that comprises at least some of the liquid photopolymer resin applied to the non-resin component in the vessel. The system further comprises a source of curing energy. The source is configured to deliver the curing energy at least to a portion of the segment of the continuous flexible line after the segment of the continuous flexible line exits the delivery guide.

Another example of the present disclosure relates to a method of additively manufacturing a composite part. The method comprises depositing a segment of a continuous flexible line along a print path. The continuous flexible line comprises a non-resin component and further comprises a photopolymer-resin component that is uncured. The method further comprises delivering a predetermined or actively determined amount of curing energy at least to a portion of the segment of the continuous flexible line at a controlled rate while advancing the continuous flexible line toward the print path and after the segment of the continuous flexible line is deposited along the print path to at least partially cure at least the portion of the segment of the continuous flexible line.

Yet another example of the present disclosure relates to a method of additively manufacturing a composite part. The method comprises applying a liquid photopolymer resin to a non-resin component to create a continuous flexible line by pulling the non-resin component through a vessel containing a volume of the liquid photopolymer resin. The continuous flexible line comprises the non-resin component and a photopolymer-resin component that comprises at least some of the liquid photopolymer resin applied to the non-resin component. The method further comprises routing the continuous flexible line into a delivery guide, pushing the continuous flexible line out of the delivery guide, depositing, via the delivery guide, a segment of the continuous flexible line along a print path, and delivering the curing energy at least to a portion of the segment of the continuous flexible line.

BRIEF DESCRIPTION OF THE DRAWINGS

Figure 1:
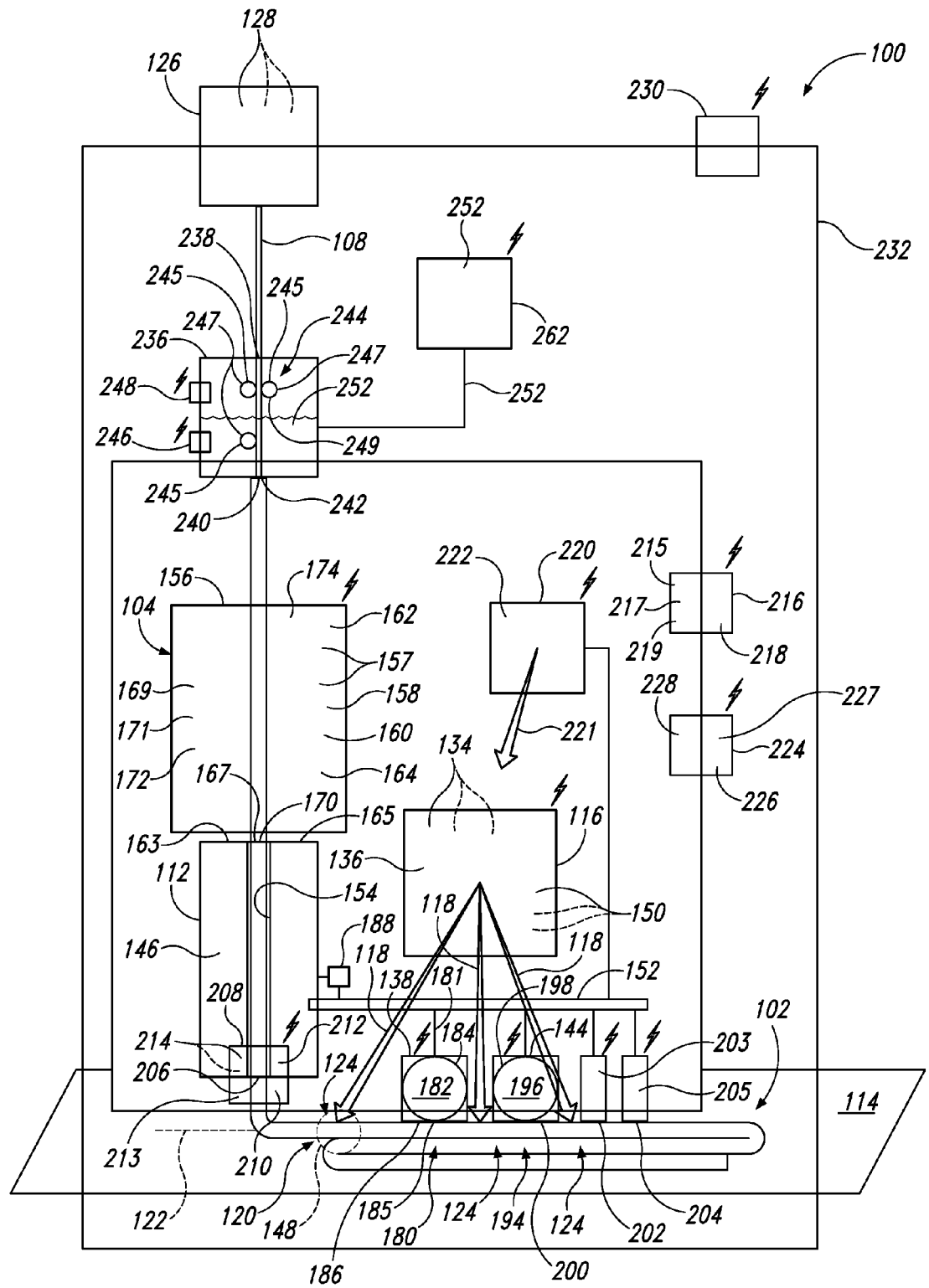
Figure 2:
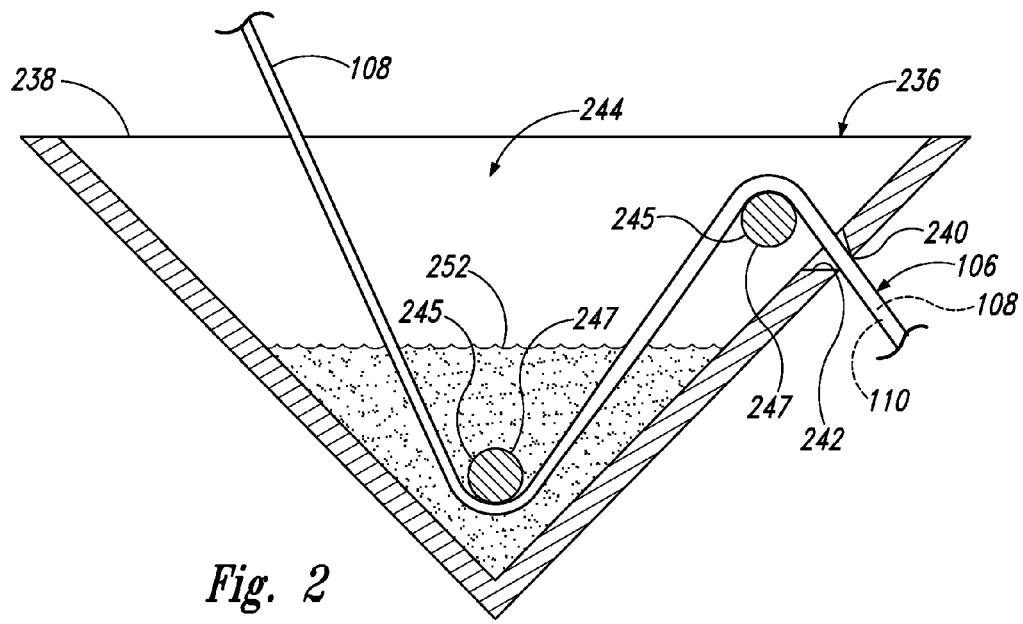
Figure 3:
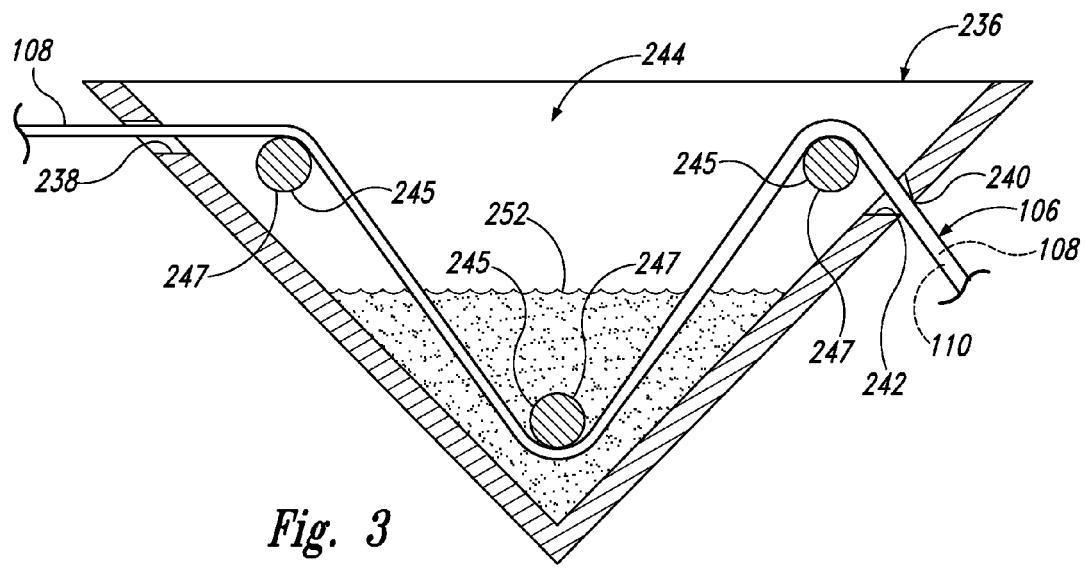
Figure 8:
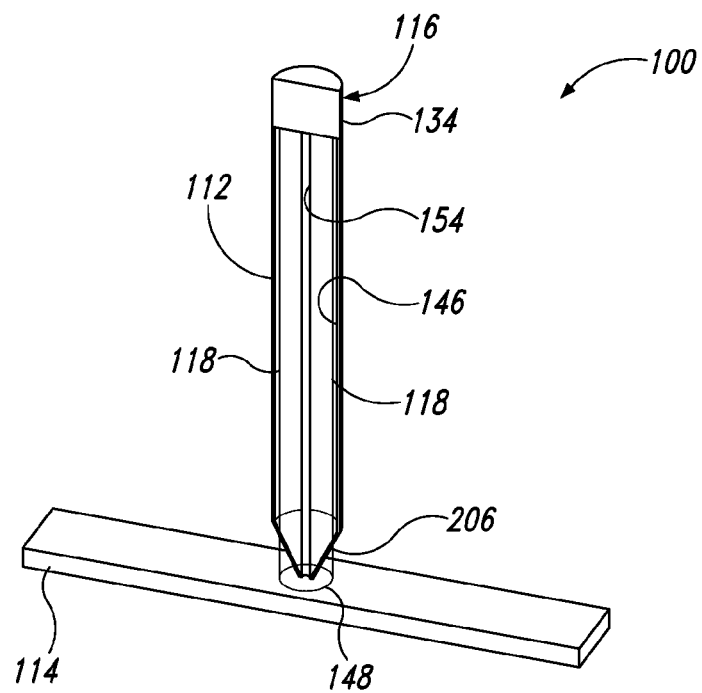
Figure 9:
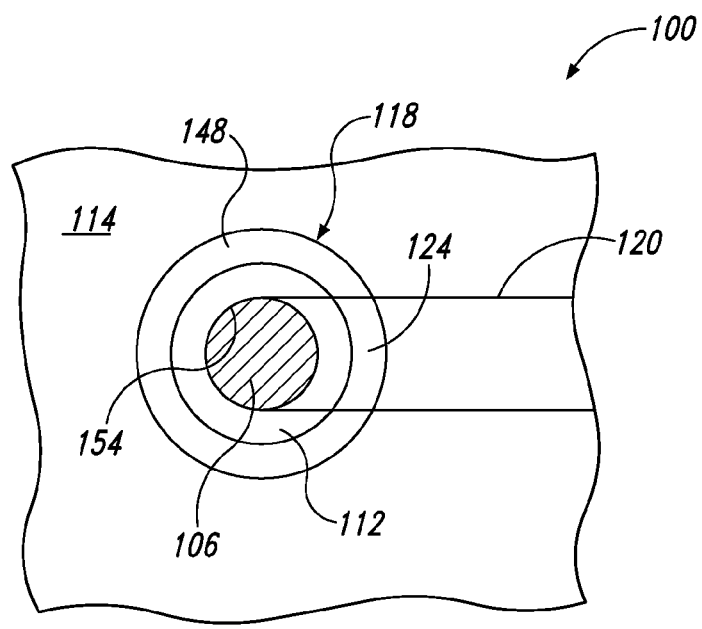
Figure 10:
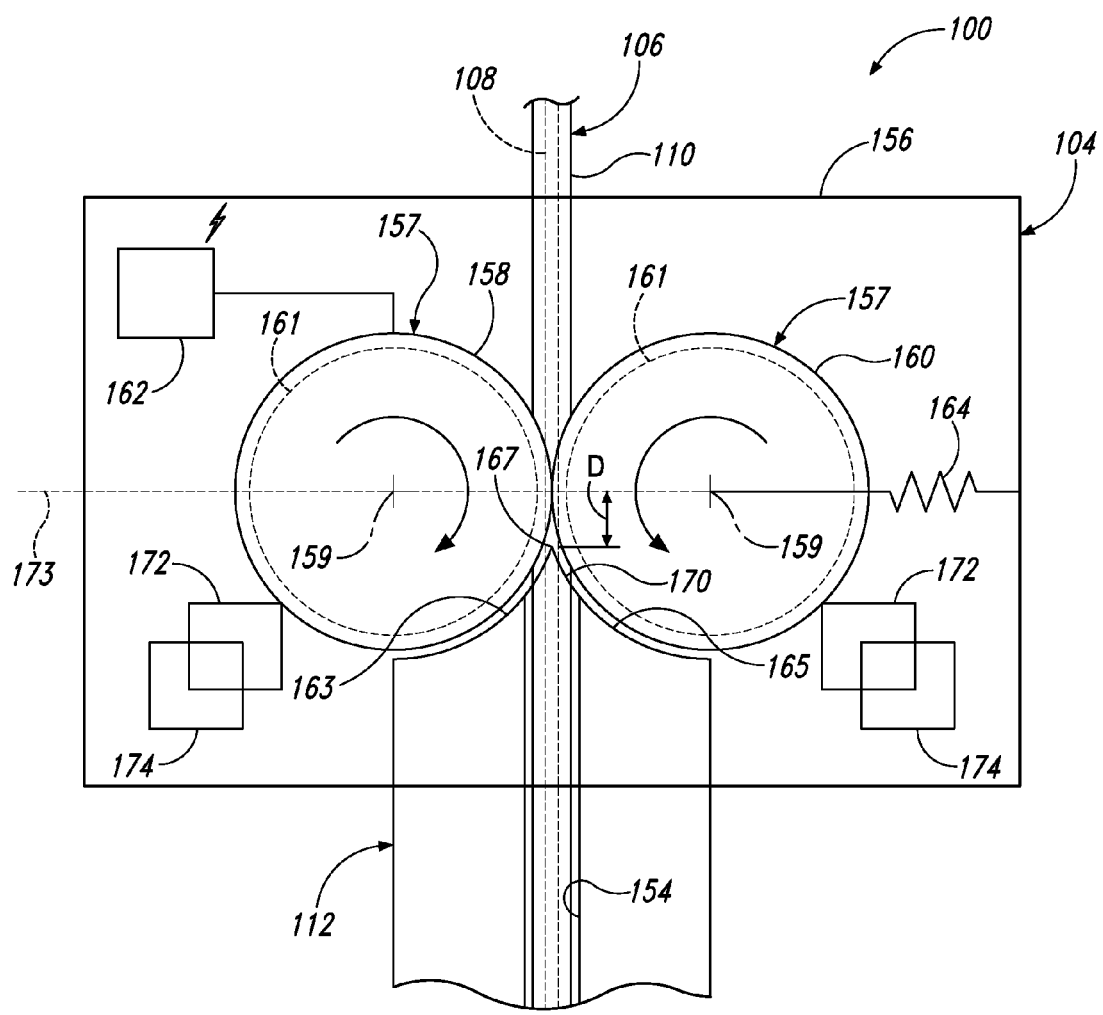
Figure 11:
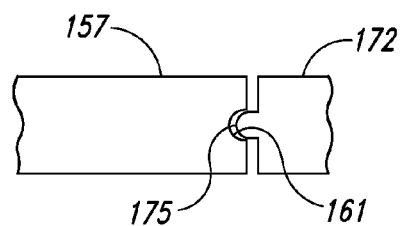
Figures 12, 13:
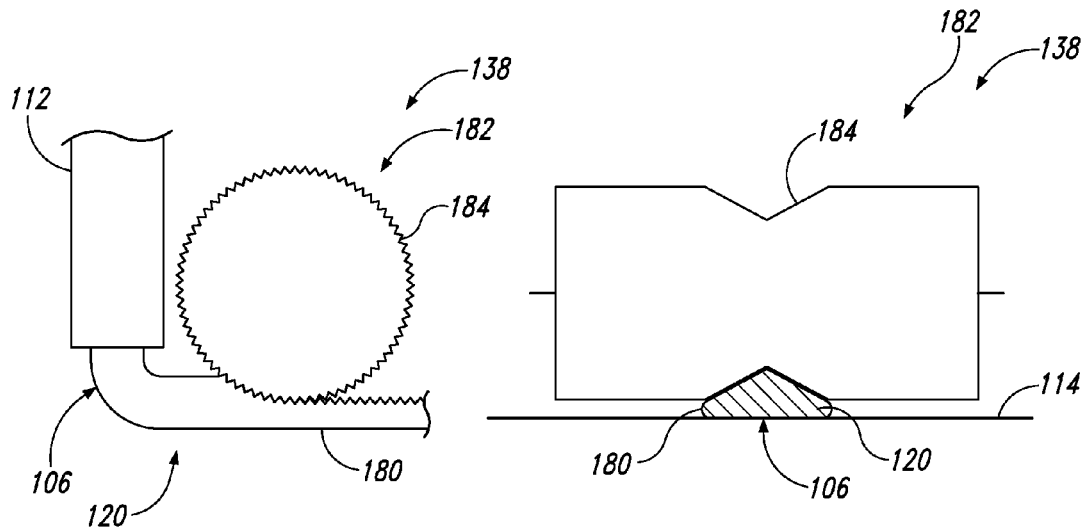
Figure 14:
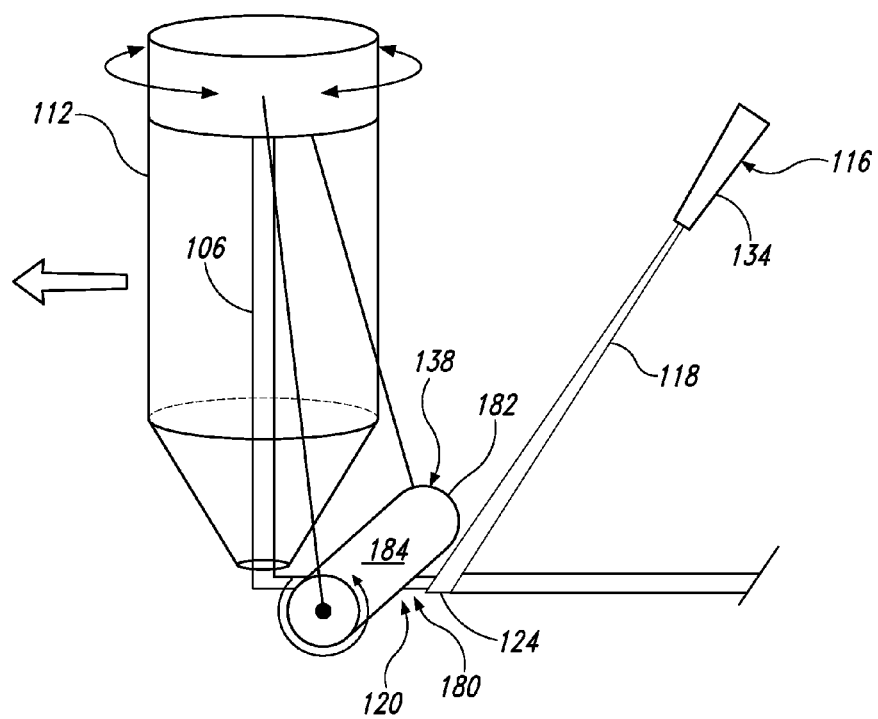
Figure 15:
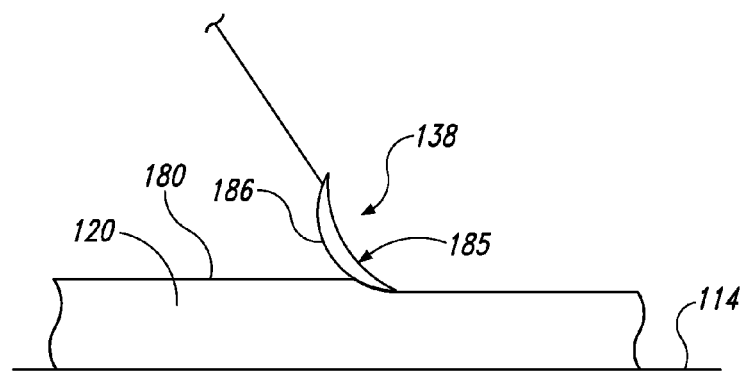
Figure 16:
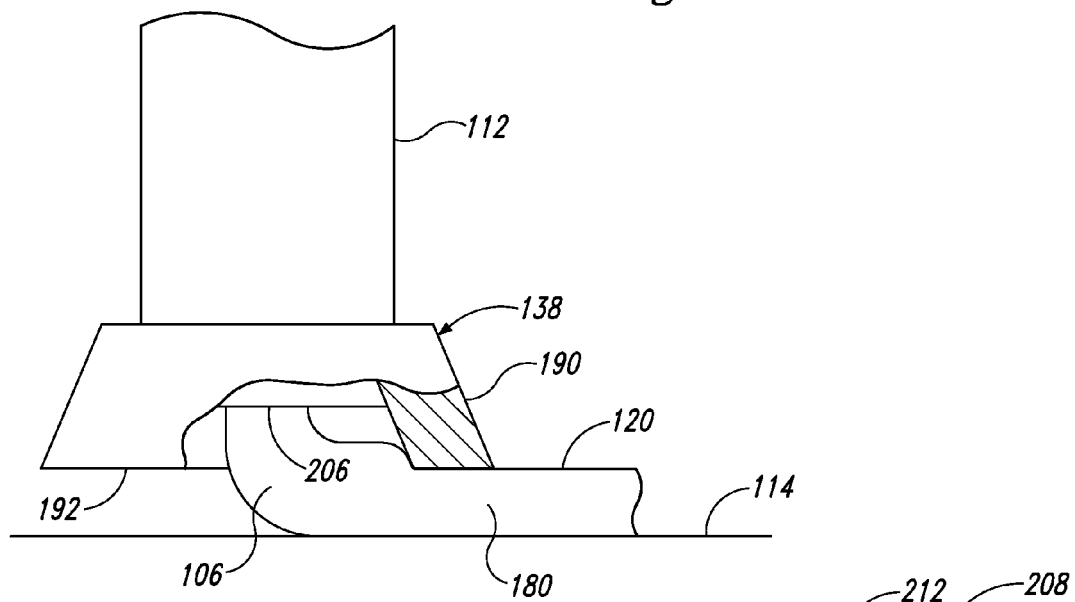
Figure 17:
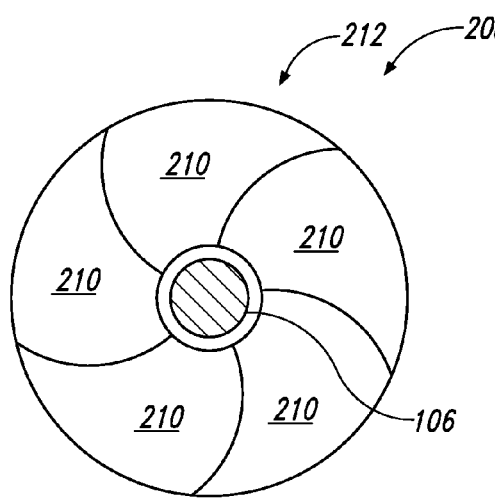
Figure 18:
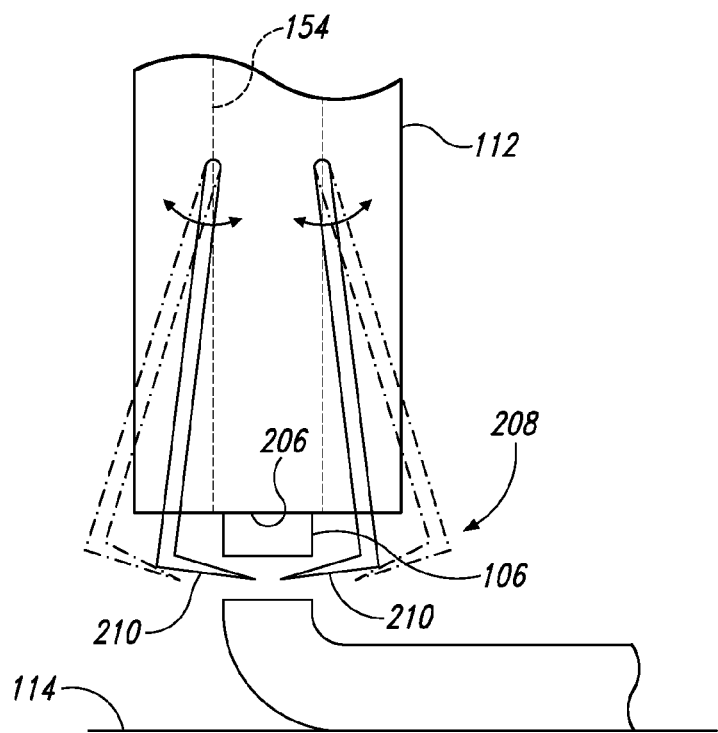
Figure 19:
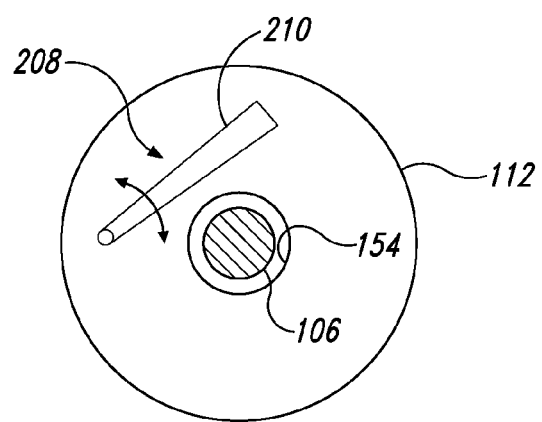
Figure 20:
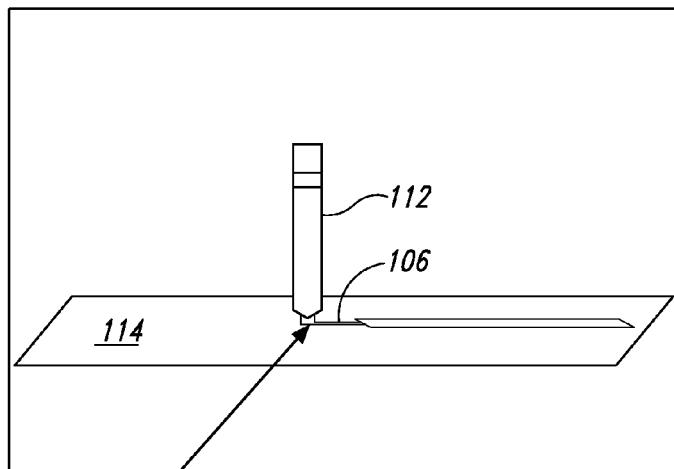
Figure 21:
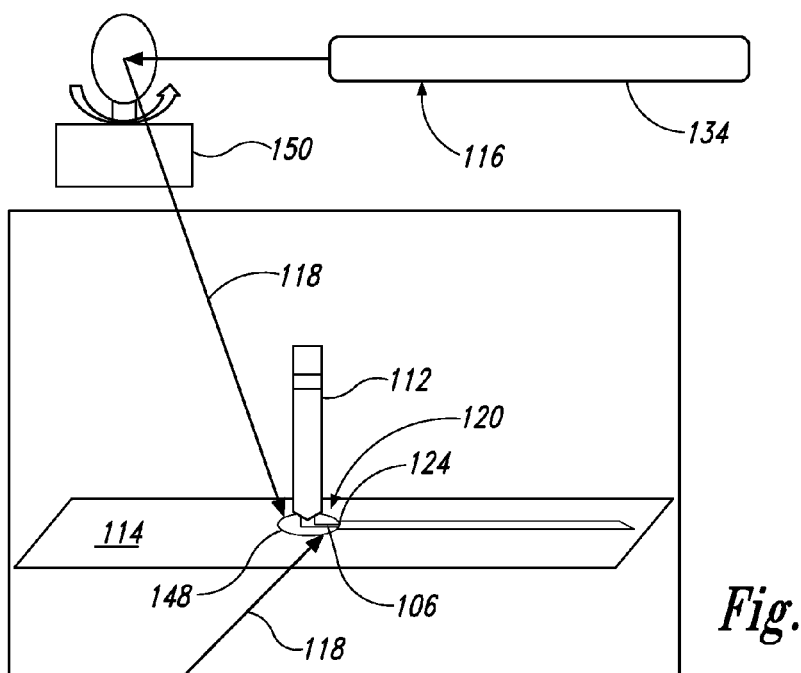
Figure 22:
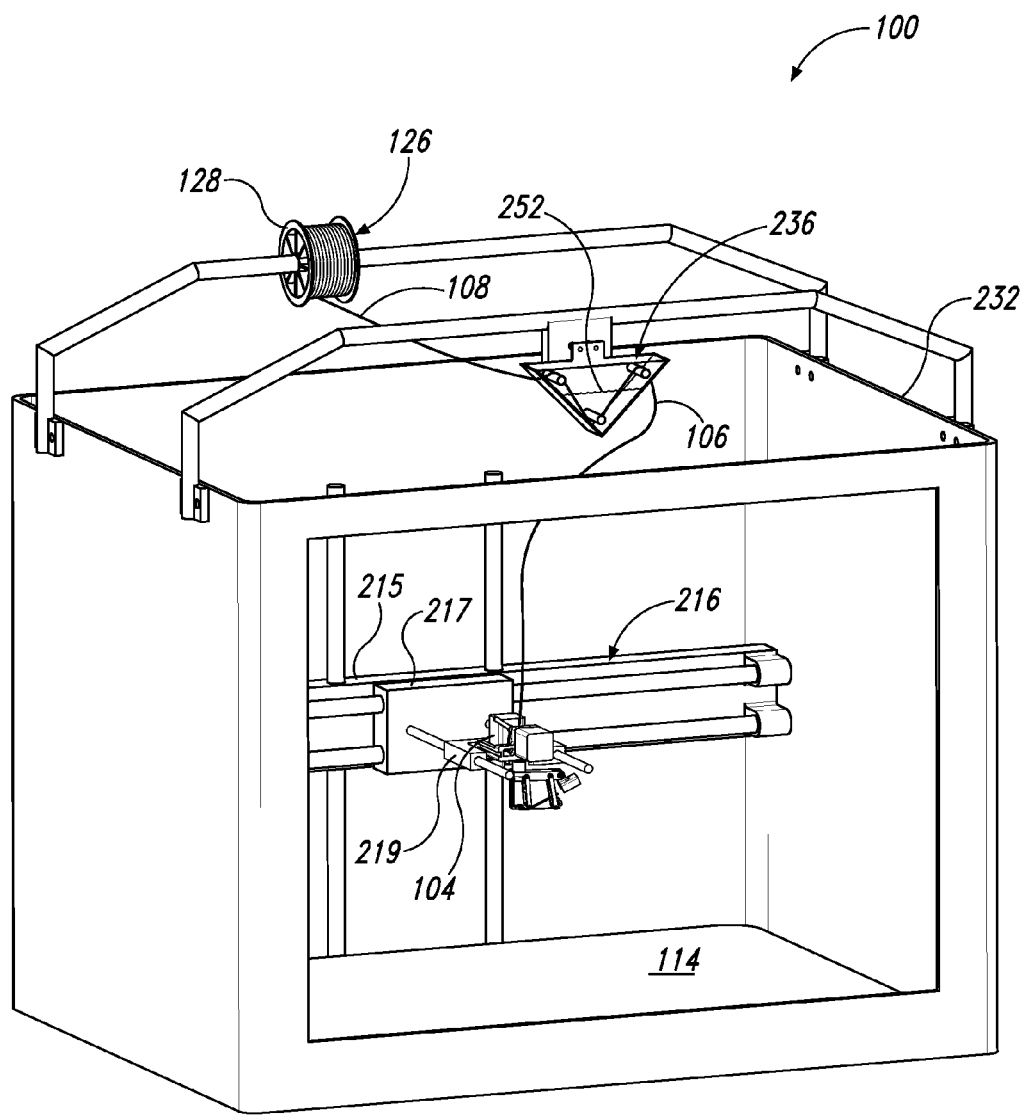
Figure 23:
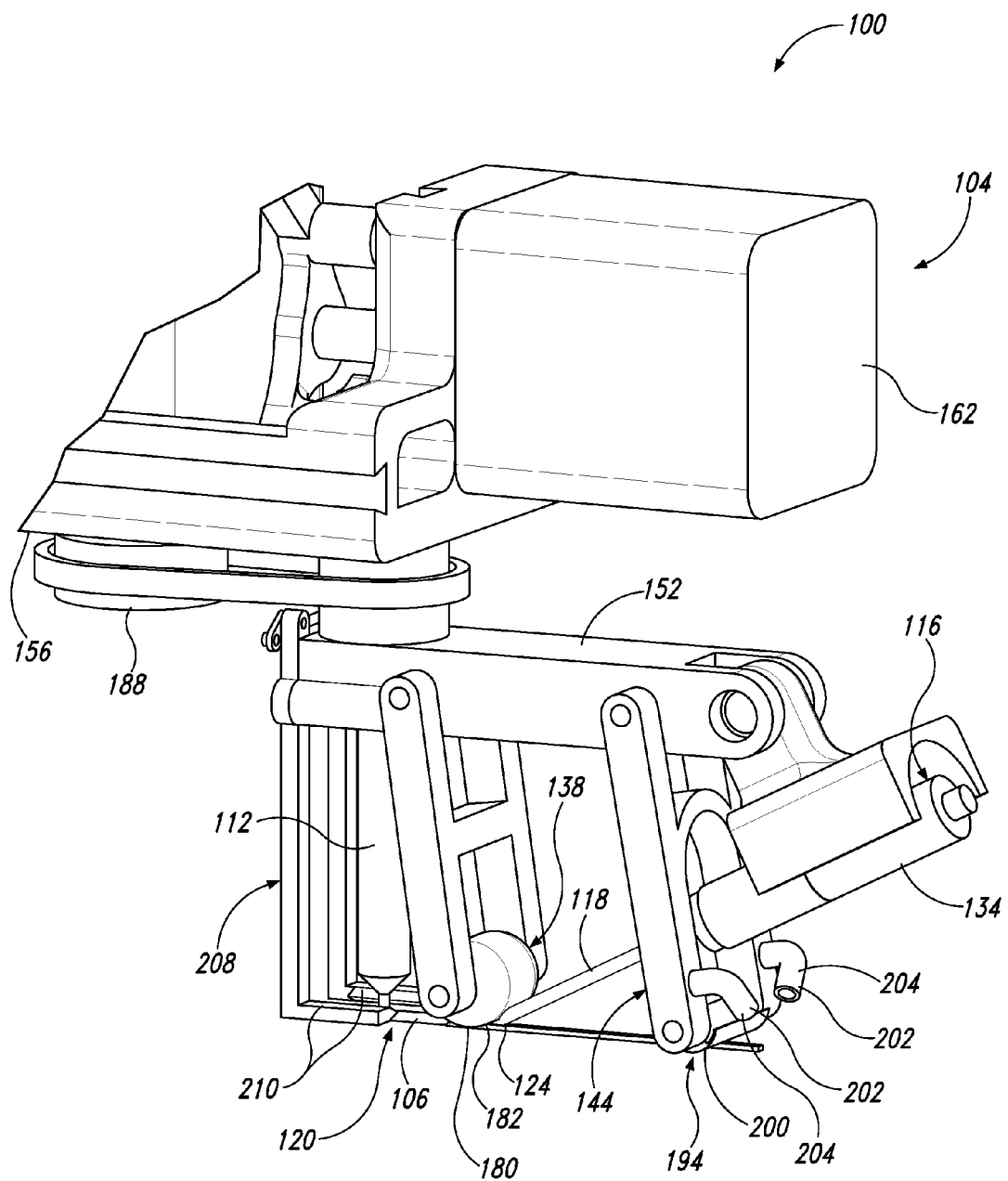
Figure 24:
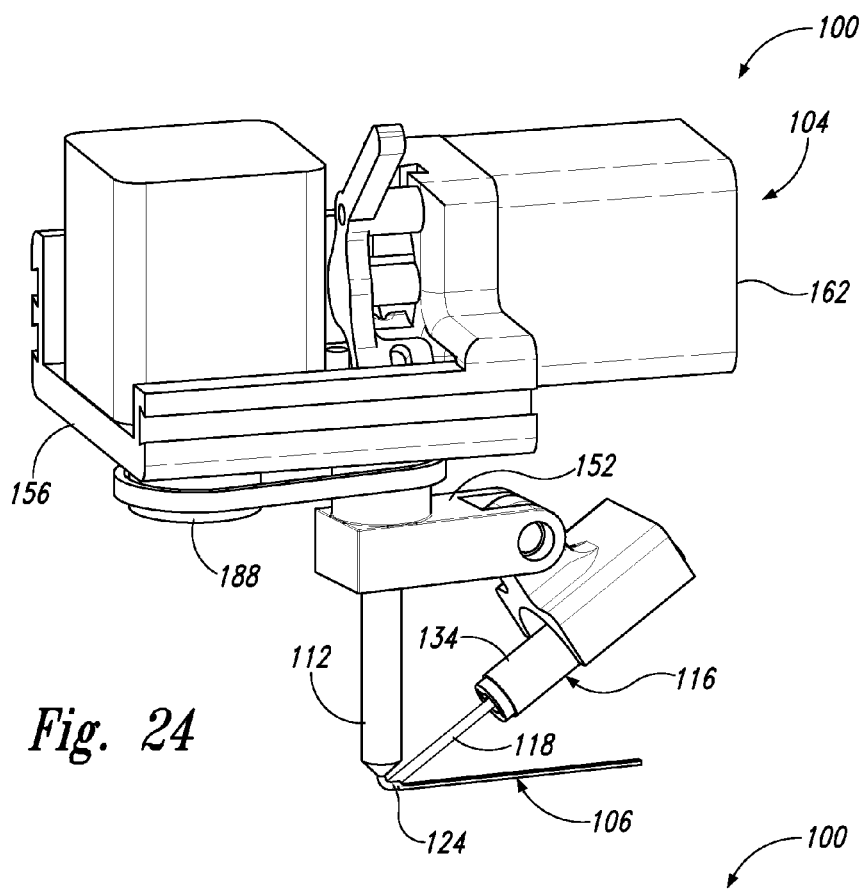
Figure 25:
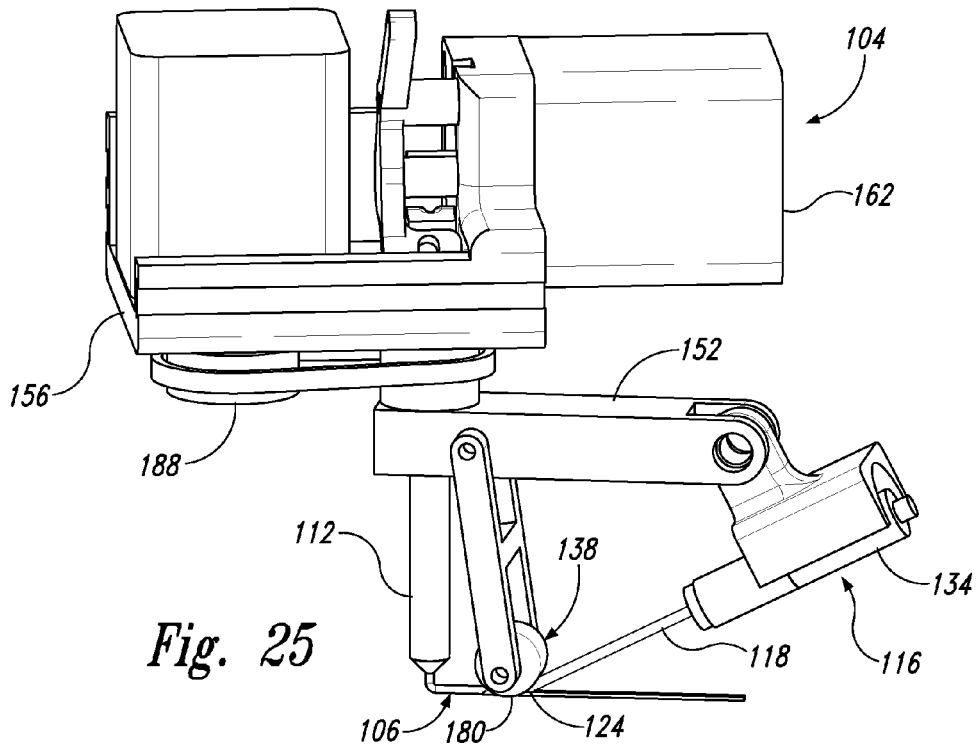
Figure 26:
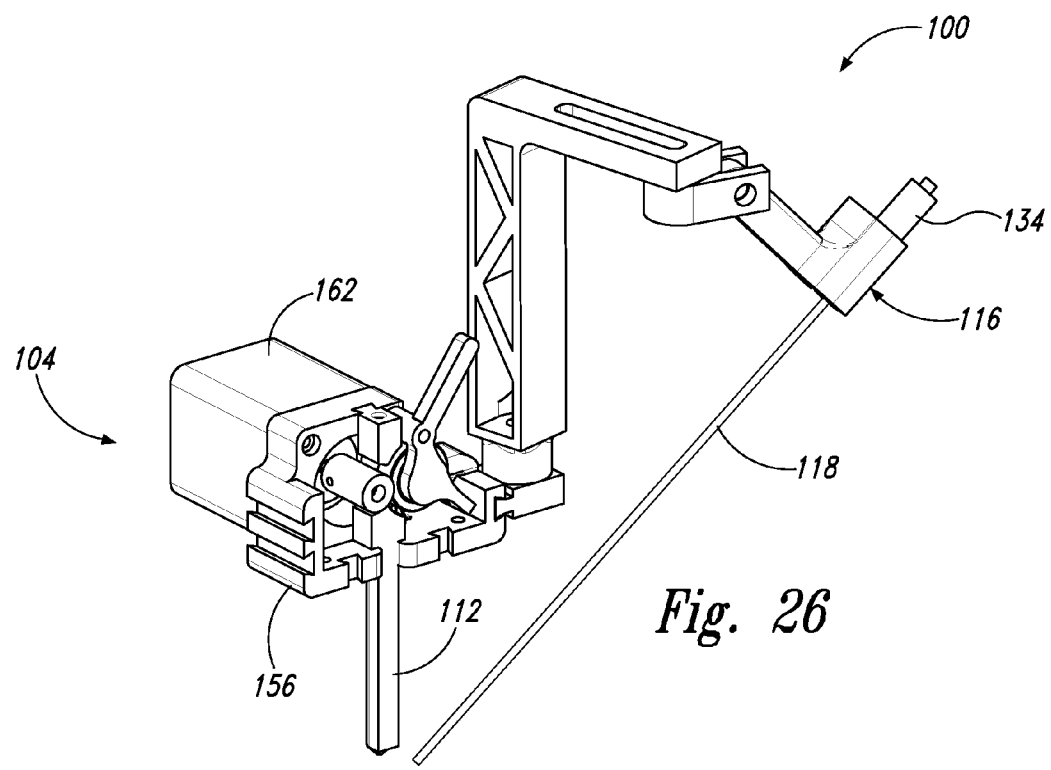
Figure 27:
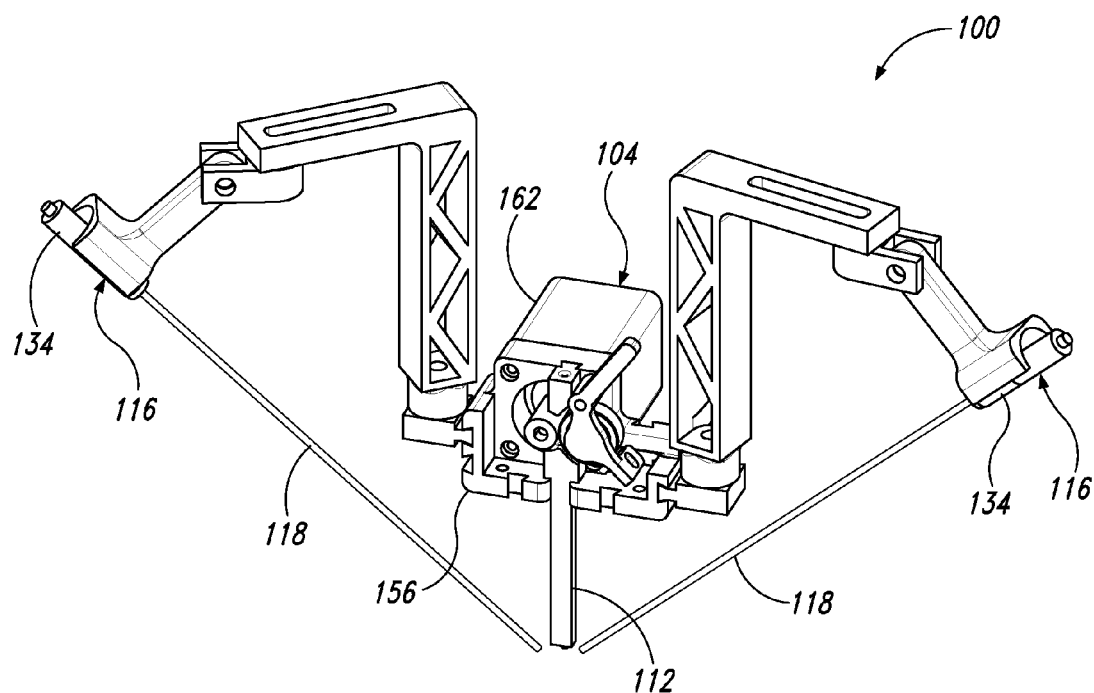
Figure 28:
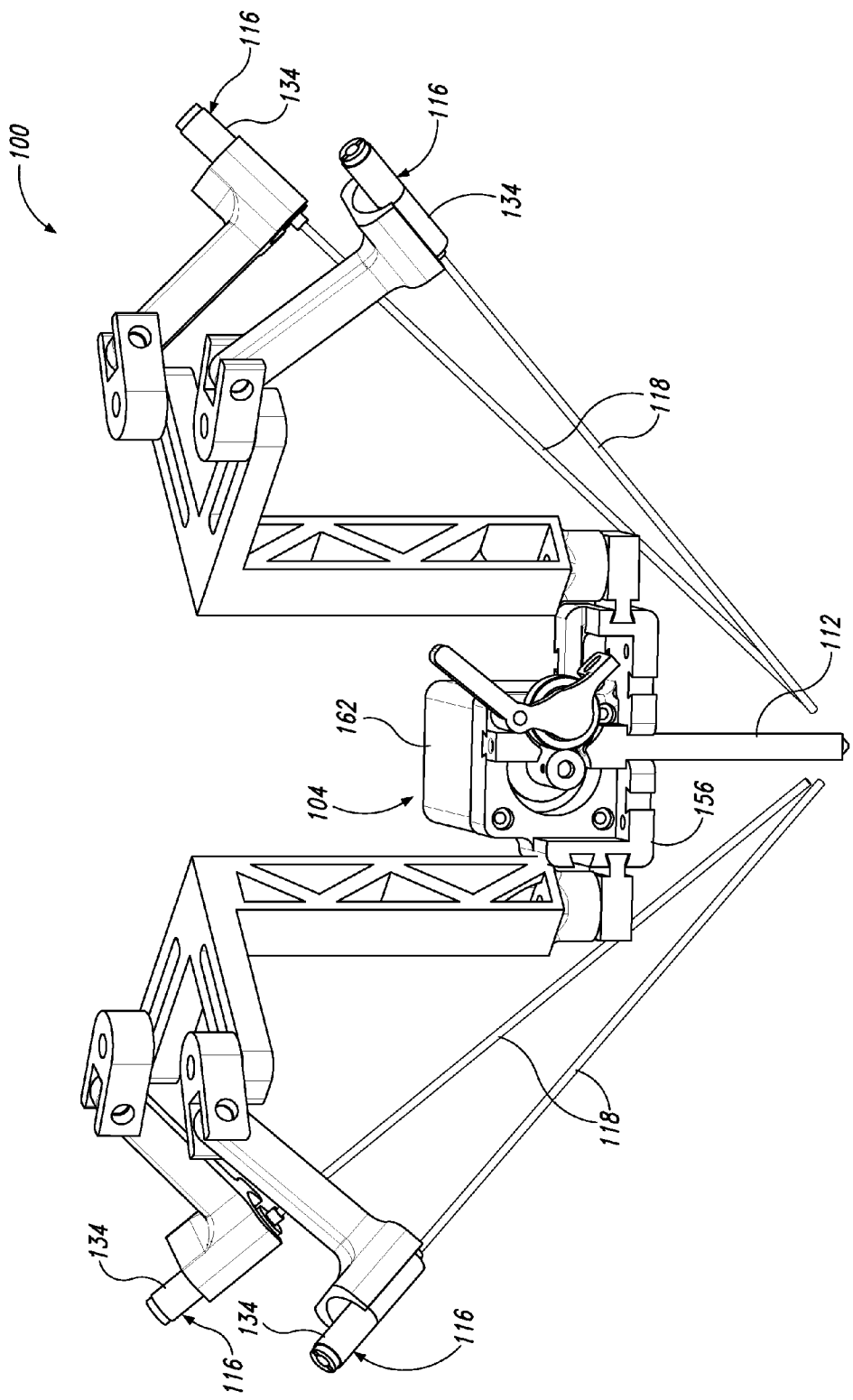
Figure 29:
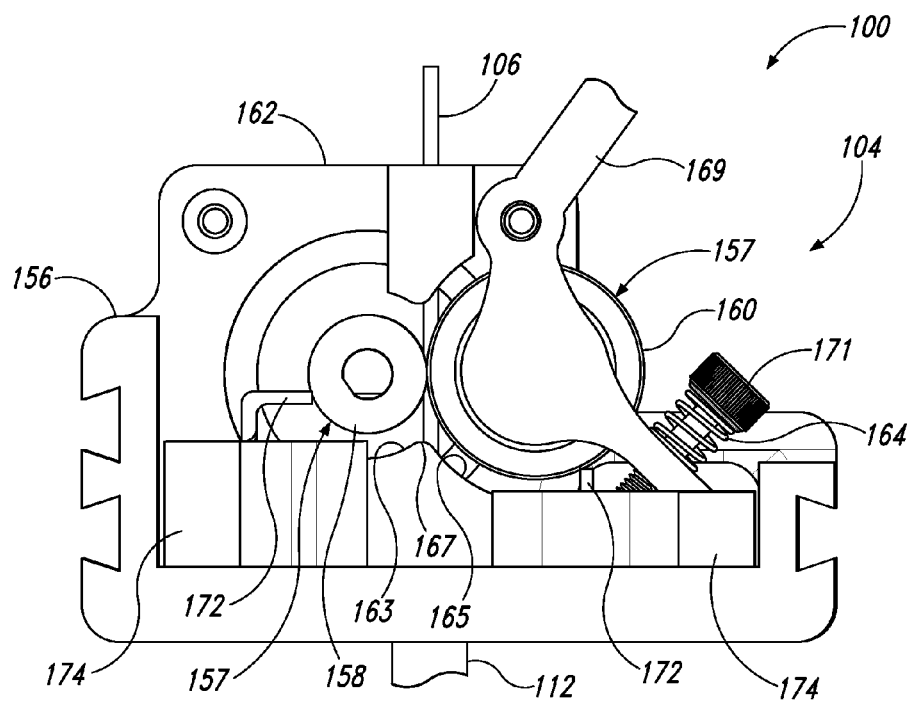
Figure 30:
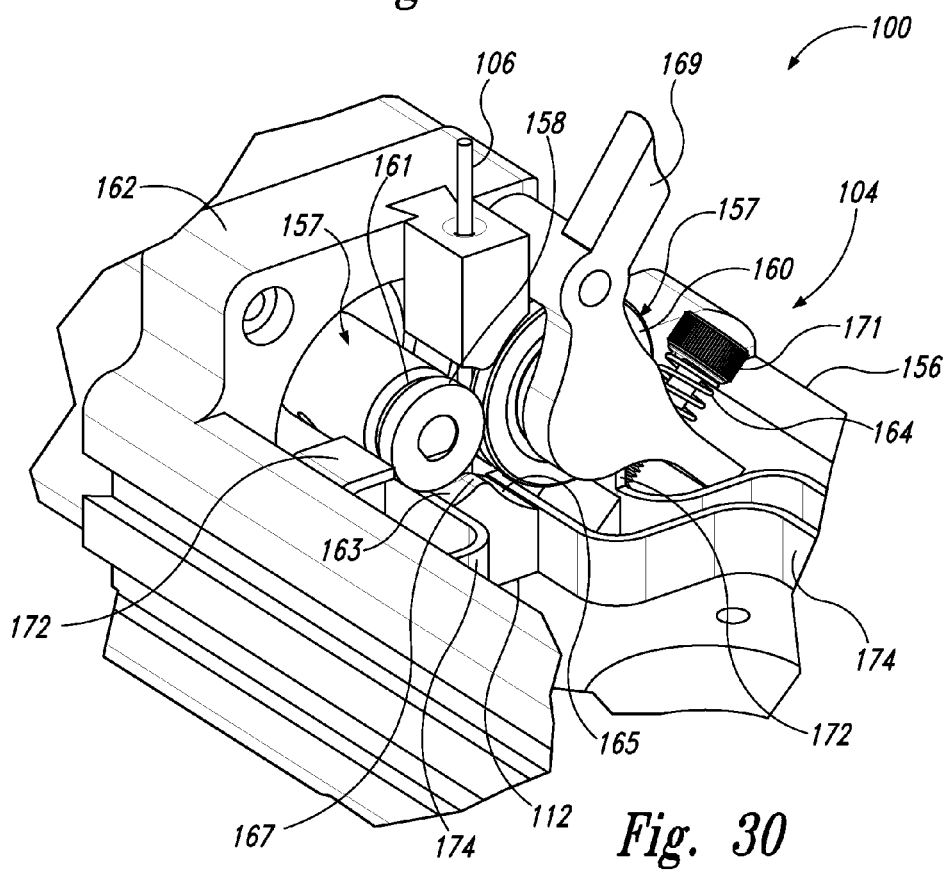
Figure 31:
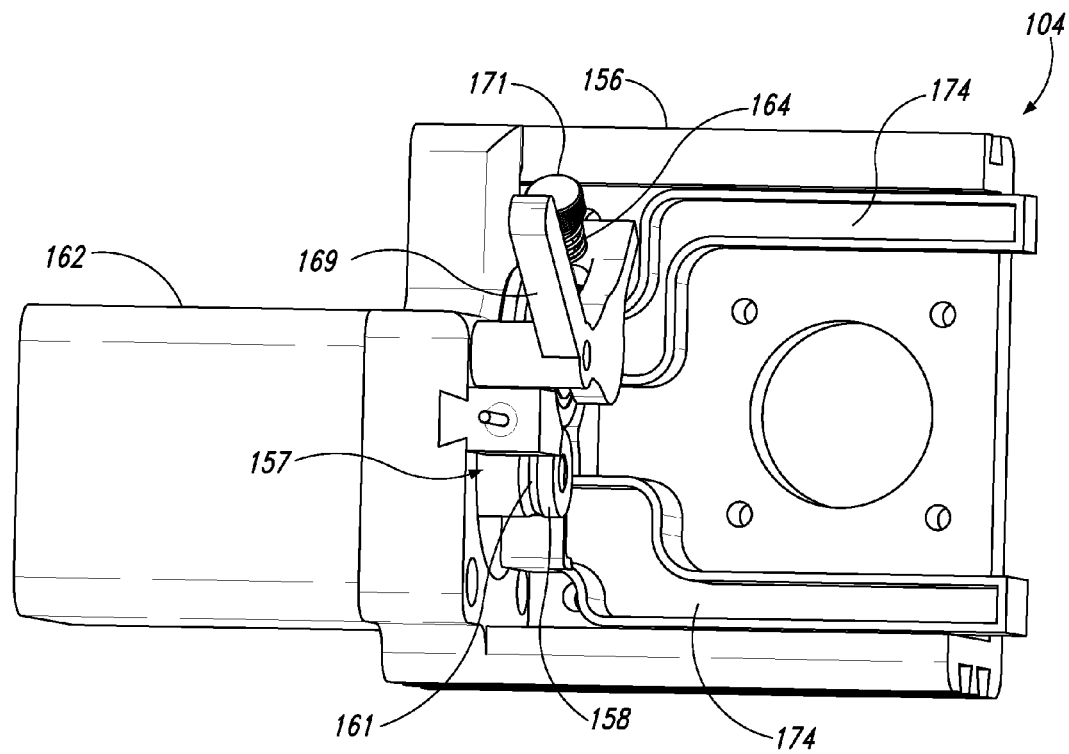
Figures 32, 33:
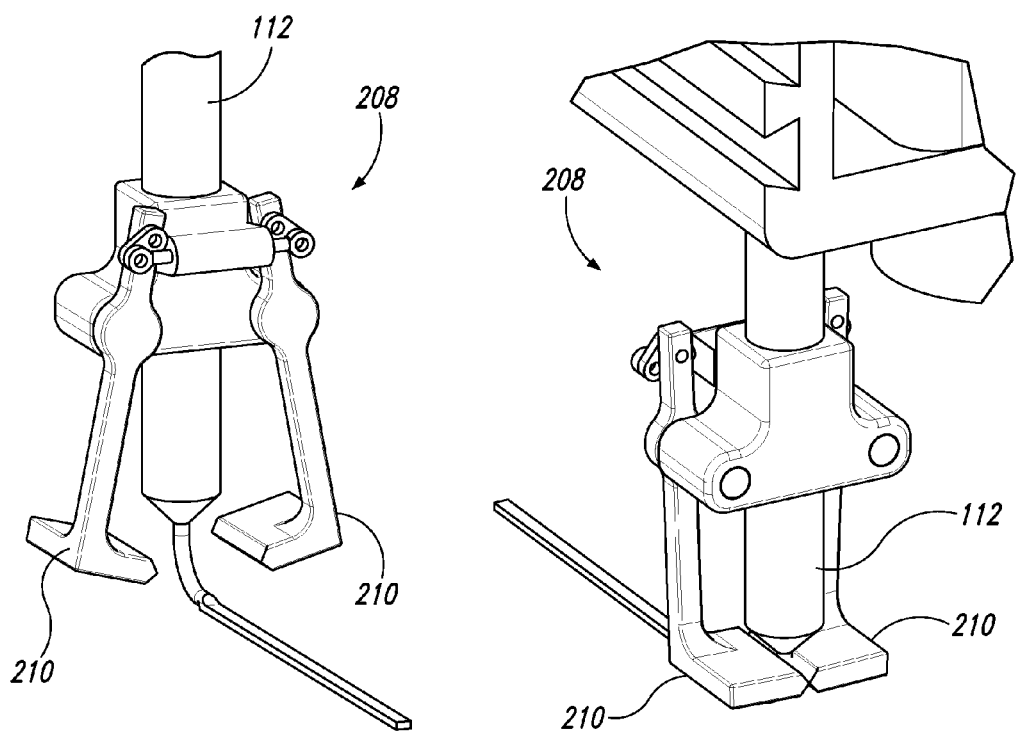
Figure 34A:
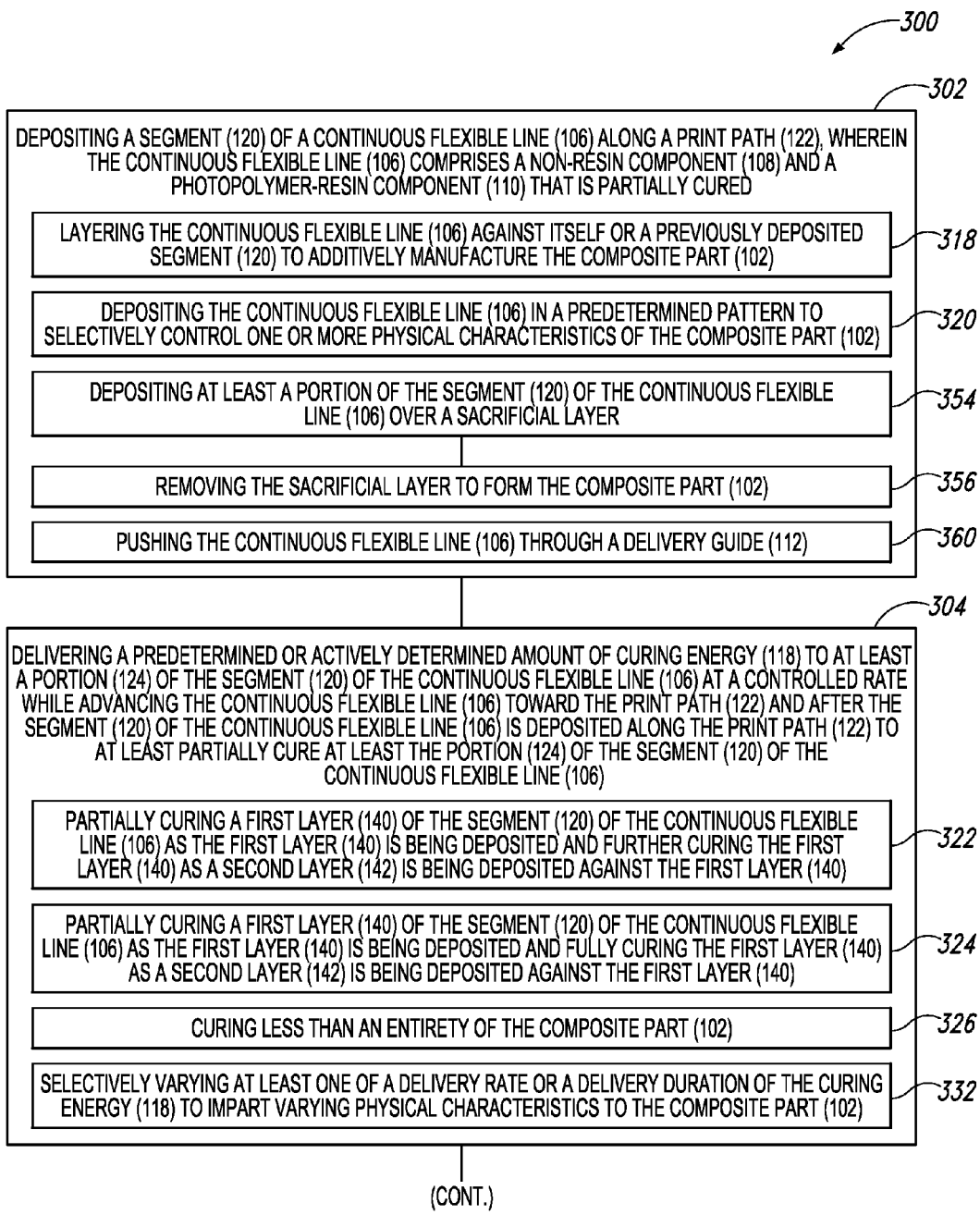
Figure 34B:
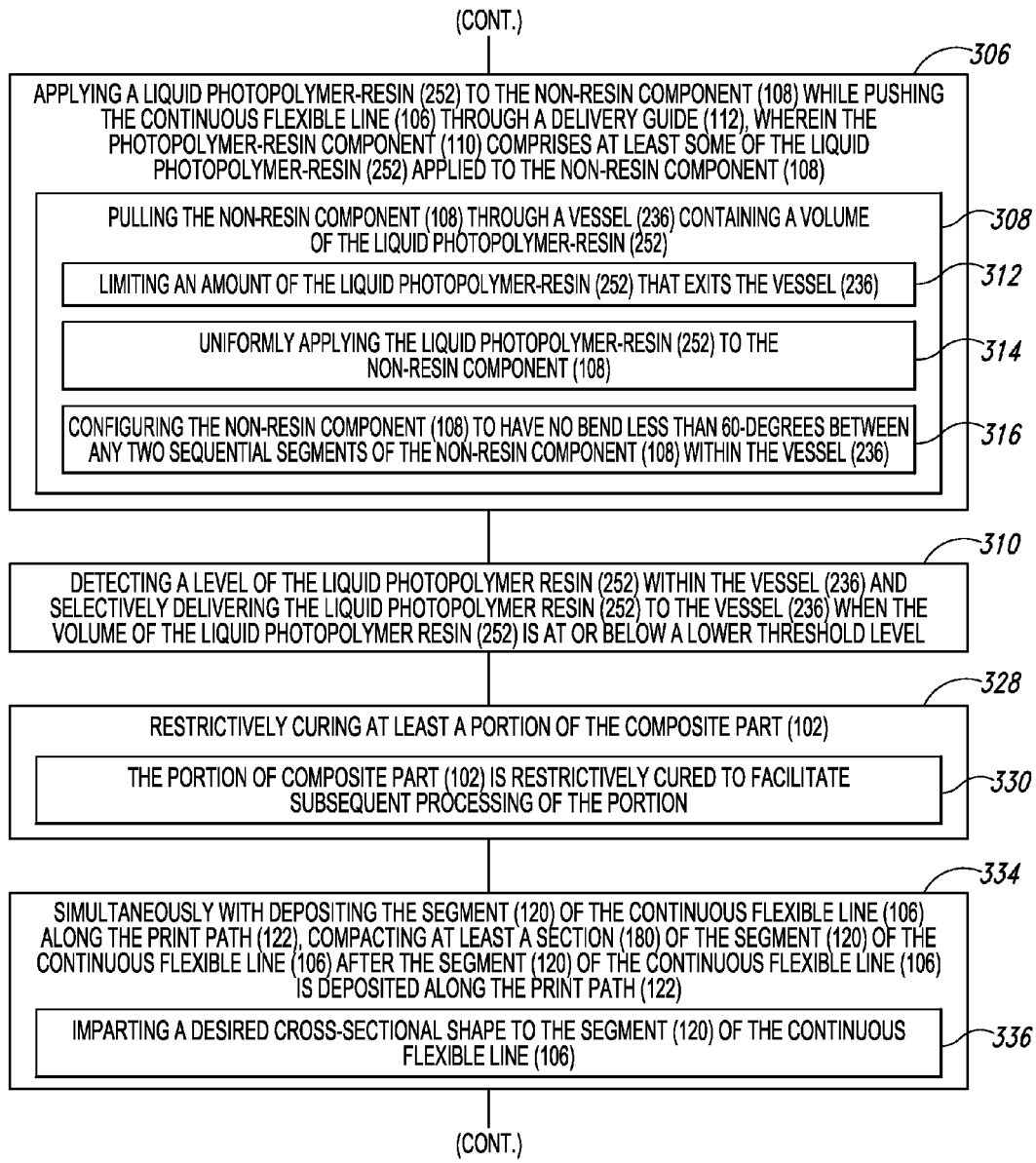
Figure 34C:
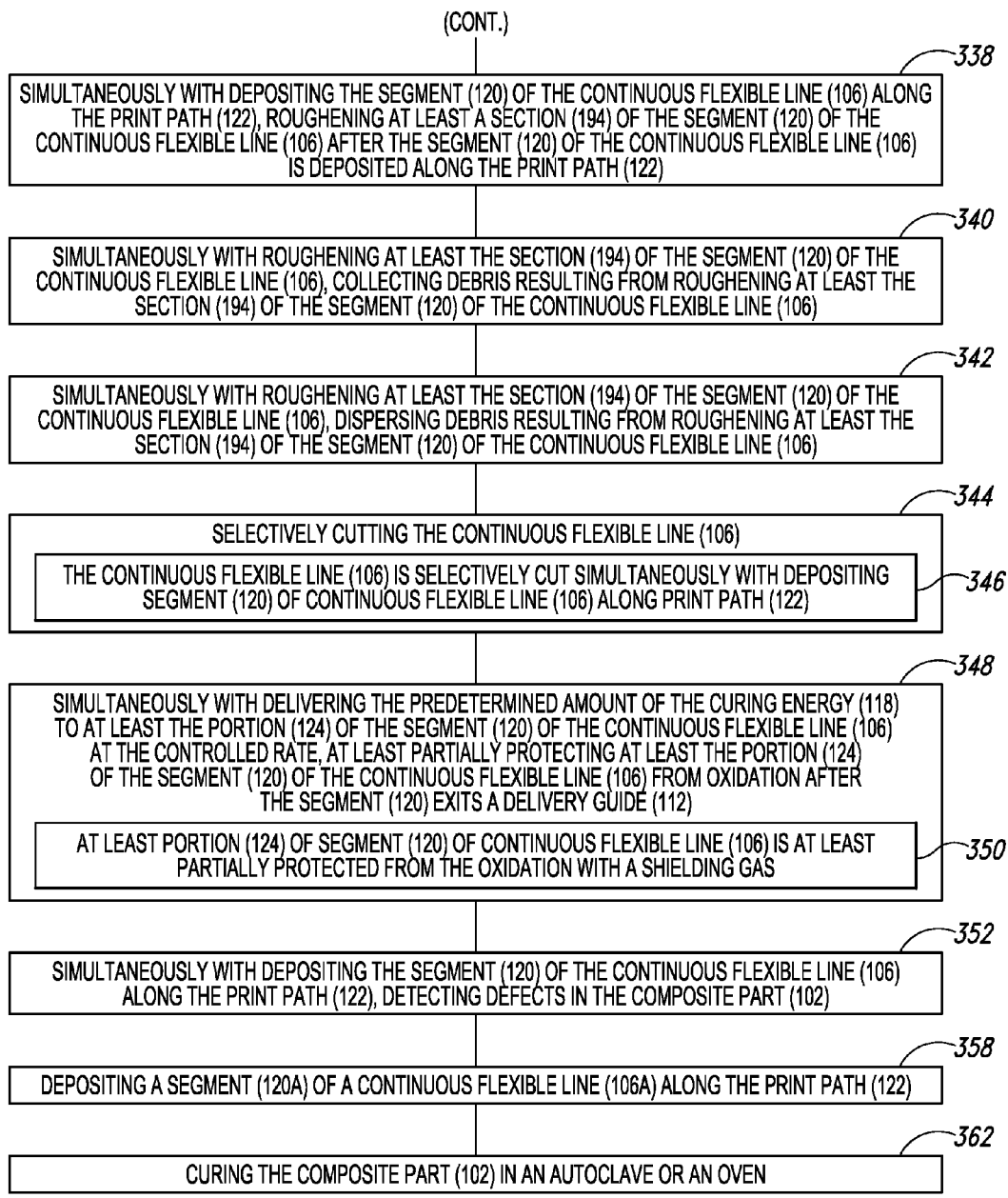
Figure 35A:
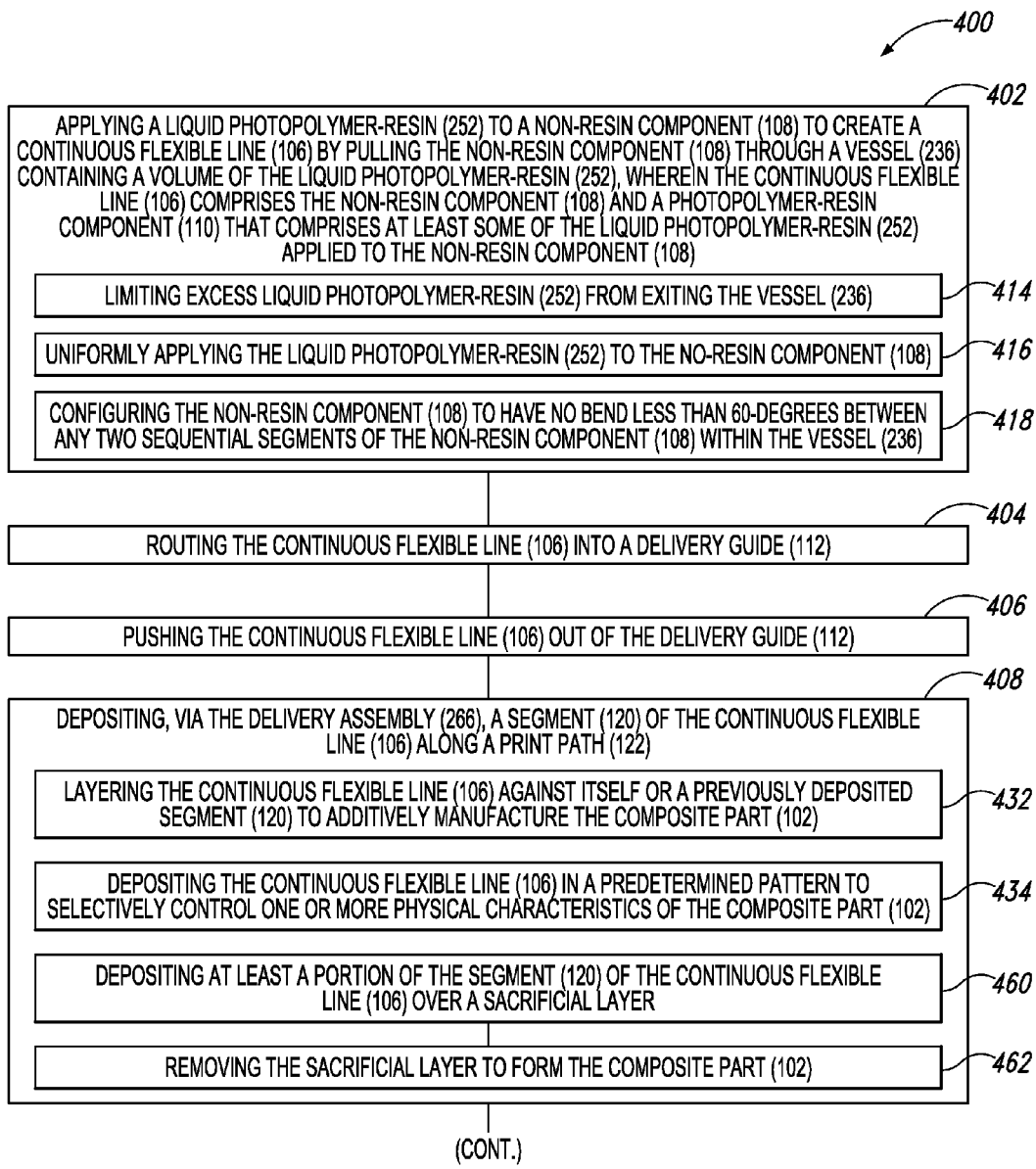
Figure 35B:
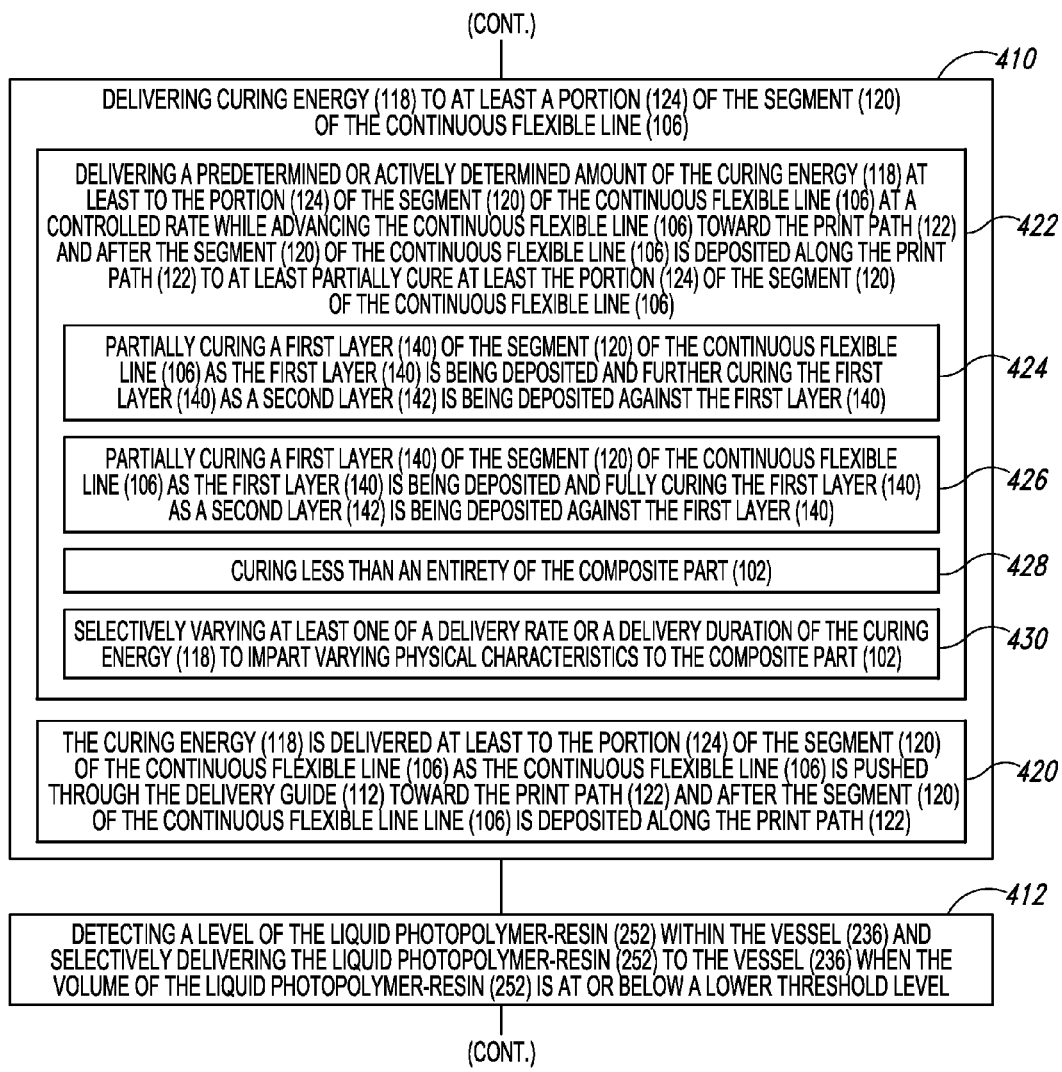
Figure 35C:
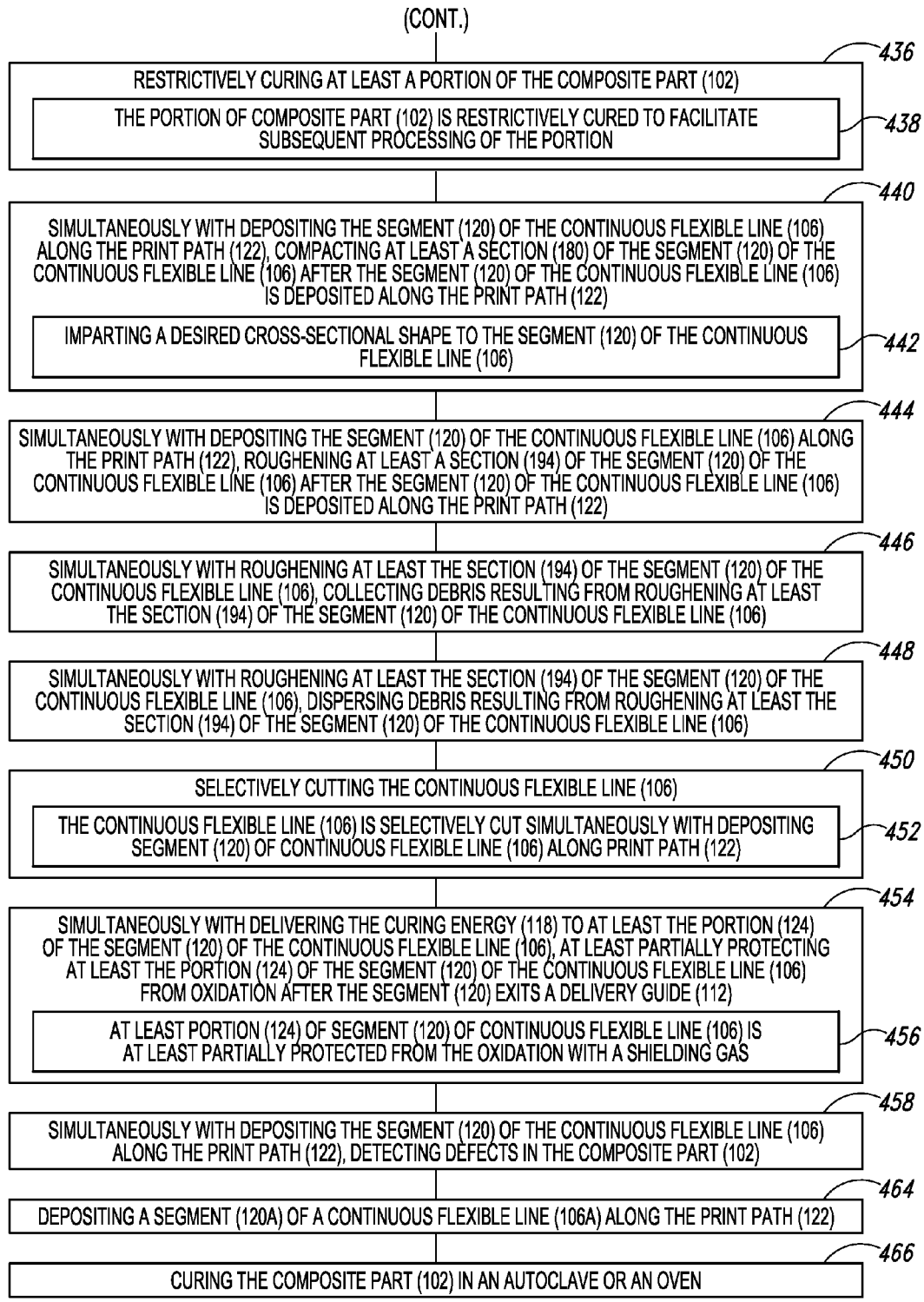
Figure 36:
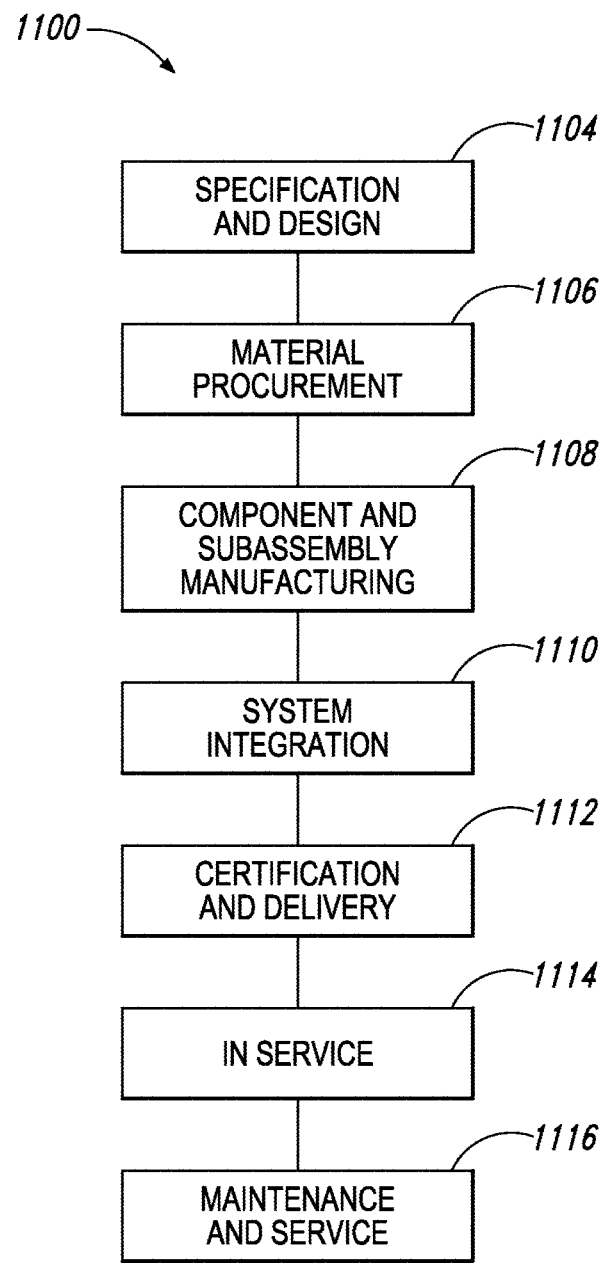
Figure 37:
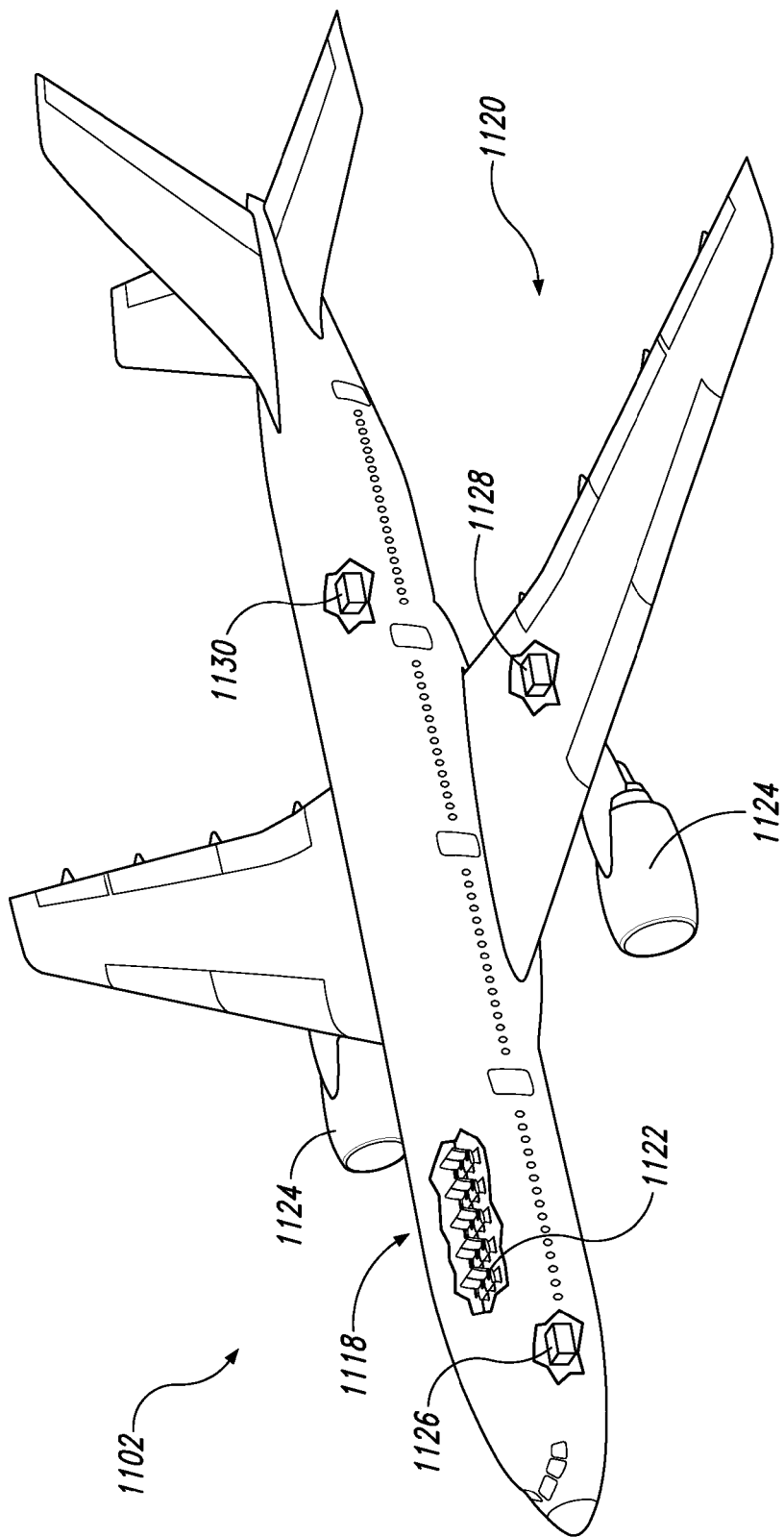

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic diagram of a system for additively manufacturing a composite part, according to one or more examples of the present disclosure;

FIG. 2 is a schematic cross-sectional view of a vessel holding a volume of liquid photopolymer resin of the system of FIG. 1, according to one or more examples of the present disclosure;

FIG. 3 is a schematic cross-section view of a vessel holding a volume of liquid photopolymer resin of the system of FIG. 1, according to one or more examples of the present disclosure;

FIG. 4 is a schematic cross-sectional view of a continuous flexible line deposited by the system of FIG. 1, according to one or more examples of the present disclosure;

FIG. 5 is schematic cross-sectional view of a continuous flexible line deposited by the system of FIG. 1, according to one or more examples of the present disclosure;

FIG. 6 is a schematic illustration of a portion of the system of FIG. 1, in which two layers of continuous flexible line are being cured simultaneously, according to one or more examples of the present disclosure;

FIG. 7 is a schematic illustration of a portion of the system of FIG. 1, in which a delivery guide comprises a curing-energy passage, according to one or more examples of the present disclosure;

FIG. 8 is a schematic illustration of a portion of the system of FIG. 1, in which a delivery guide comprises a curing-energy passage and curing energy is delivered in the form of a ring, according to one or more examples of the present disclosure;

FIG. 9 is a schematic illustration of a portion of the system of FIG. 1, in which curing energy is delivered in the form of a ring, according to one or more examples of the present disclosure;

FIG. 10 is a schematic illustration of a feed assembly and a delivery guide of the system of FIG. 1, according to one or more examples of the present disclosure;

FIG. 11 is a schematic diagram of a roller and a scraper of a feed mechanism of the system of FIG. 1, according to one or more examples of the present disclosure;

FIG. 12 is a schematic illustration of a compactor comprising a compaction roller of the system of FIG. 1, according to one or more examples of the present disclosure;

FIG. 13 is a schematic illustration of a portion of the system of FIG. 1 with a compactor comprising a compaction roller, according to one or more examples of the present disclosure;

FIG. 14 is a schematic illustration of a portion of the system of FIG. 1 with a compactor comprising a compaction roller, according to one or more examples of the present disclosure;

FIG. 15 is a schematic illustration of a portion of the system of FIG. 1 with a compactor comprising a compaction wiper, according to one or more examples of the present disclosure;

FIG. 16 is a schematic illustration of a portion of the system of FIG. 1 with a compactor comprising a skirt, according to one or more examples of the present disclosure;

FIG. 17 is a schematic illustration of a cutter comprising an iris-diaphragm of the system of FIG. 1, according to one or more examples of the present disclosure;

FIG. 18 is a schematic illustration of a portion of the system of FIG. 1 with a cutter comprising two blades movable relative to a delivery guide, according to one or more examples of the present disclosure;

FIG. 19 is a schematic illustration of a portion of the system of FIG. 1 with a cutter comprising at least one blade positioned within a delivery guide, according to one or more examples of the present disclosure;

FIG. 20 is a schematic illustration of the system of FIG. 1 with a cutter comprising a cutting laser, according to one or more examples of the present disclosure;

FIG. 21 is a schematic illustration of the system of FIG. 1 with a source of curing energy comprising one or more curing lasers, according to one or more examples of the present disclosure;

FIG. 22 is a view of the system of FIG. 1 comprising a frame and a drive assembly, according to one or more examples of the present disclosure;

FIG. 23 is a view of a portion of the system of FIG. 1 with a cutter, a compactor, a surface roughener, and a curing source comprising a curing laser, according to one or more examples of the present disclosure;

FIG. 24 is a view of a portion of the system of FIG. 1 with a curing source comprising a curing laser, according to one or more examples of the present disclosure;

FIG. 25 is a view of a portion of the system of FIG. 1 with a compactor and a curing source comprising a curing laser, according to one or more examples of the present disclosure;

FIG. 26 is a view of a portion of the system of FIG. 1 with a curing source comprising a curing laser, according to one or more examples of the present disclosure;

FIG. 27 is a view of a portion of the system of FIG. 1 with a curing source comprising two curing lasers, according to one or more examples of the present disclosure;

FIG. 28 is a view of a portion of the system of FIG. 1 with a curing source comprising four curing lasers, according to one or more examples of the present disclosure;

FIG. 29 is a view of a portion of the system of FIG. 1 with a feed mechanism, according to one or more examples of the present disclosure;

FIG. 30 is another view of the portion of FIG. 29;

FIG. 31 is another view of the portion of FIG. 29;

FIG. 32 is a view of a portion of the system of FIG. 1 with a cutter comprising two blades movable relative to a delivery guide, according to one or more examples of the present disclosure;

FIG. 33 is another view of the portion of FIG. 32;

FIGS. 34A, 34B, and 34C collectively are a block diagram of a method for additively manufacturing composite parts, according to one or more examples of the present disclosure;

FIGS. 35A, 35B, and 35C collectively are a block diagram of a method for additively manufacturing composite parts, according to one or more examples of the present disclosure;

FIG. 36 is a block diagram representing aircraft production and service methodologies;

FIG. 37 is a schematic illustration of an aircraft; and

Figure 38:
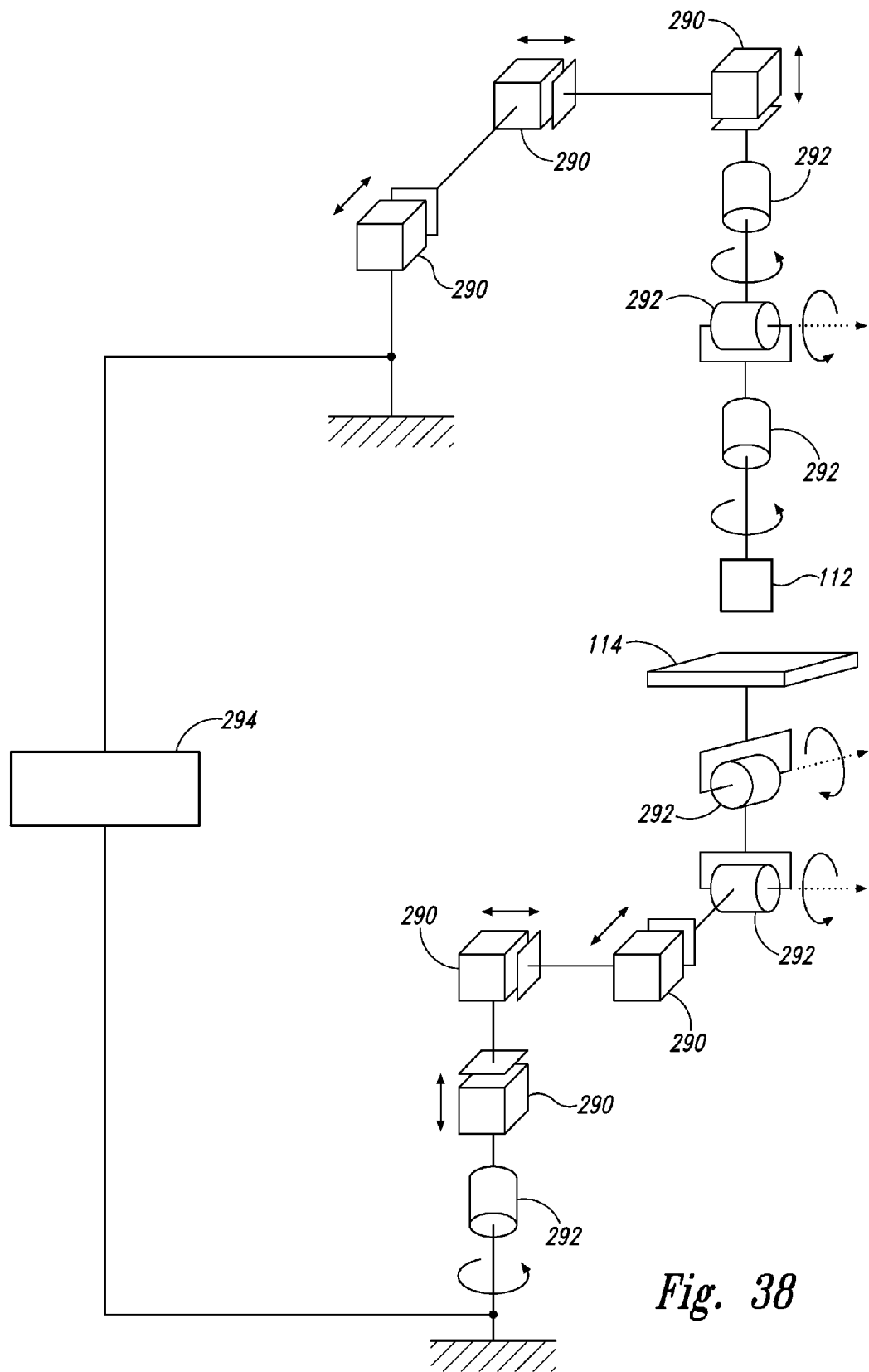

FIG. 38 is a schematic illustration of the system of FIG. 1, in which twelve degrees of freedom are provided between a delivery guide and a surface, according to one or more examples of the present disclosure.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the schematic diagram may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual imaginary elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 34-36, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 34-36 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, or component "configured to" perform a specified function is indeed capable of performing the specified function without any alteration, rather than merely having potential to perform the specified function after further modification. In other words, the system, apparatus, structure, article, element, or component is specifically selected, created, implemented, utilized, programmed, and/or designed for the purpose of performing the specified function. As used herein, "configured to" denotes existing characteristics of a system, apparatus, structure, article, element, or component which enable the system, apparatus, structure, article, element, or component to actually perform the specified function. For purposes of this disclosure, a system, apparatus, structure, article, element, or component described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring, e.g., to FIG. 1, system 100 for additively manufacturing composite part 102 is disclosed. System 100 comprises delivery guide 112, movable relative to surface 114. Delivery guide 112 is configured to deposit at least segment 120 of continuous flexible line 106 along print path 122. Print path 122 is stationary relative to surface 114. System 100 further comprises vessel 236, configured to hold a volume of liquid photopolymer resin 252 and to apply a quantity of liquid photopolymer resin 252 to non-resin component 108. System 100 further comprises feed mechanism 104, configured to pull non-resin component 108 through vessel 236 and to push continuous flexible line 106 out of delivery guide 112. Continuous flexible line 106 comprises non-resin component 108 and further comprises photopolymer-resin component 110 that comprises at least some of liquid photopolymer resin 252 applied to non-resin component 108 in vessel 236. System 100 further comprises source 116 of curing energy 118. Source 116 is configured to deliver curing energy 118 at least to portion 124 of segment 120 of continuous flexible line 106 after segment 120 of continuous flexible line 106 exits delivery guide 112. The preceding subject matter of this paragraph characterizes example 1 of the present disclosure.

System 100 therefore may be used to manufacture composite parts 102 from at least a composite material that is created from liquid photopolymer-resin 252 and non-resin component 108 while composite part 102 is being manufactured. Moreover, photopolymer-resin component 110 is at least partially cured by source 116 of curing energy 118 while composite part 102 is being manufactured, or in situ. In addition, system 100 may be used to manufacture composite parts 102 with continuous flexible line 106 being oriented in desired and/or predetermined orientations throughout composite part 102, such as to define desired properties of composite part 102.

Because continuous flexible line 106 is created within vessel 236 during manufacturing of composite part 102, system 100 has the flexibility of permitting selection of different non-resin components 108 and/or different liquid photopolymer resins 252 to customize or otherwise create a desired composite part 102 with different characteristics at different locations within composite part 102.

Some examples of system 100 additionally or alternatively may be described as 3-D printers.

As mentioned, feed mechanism 104 is configured to push continuous flexible line 106 out of delivery guide 112. In other words, delivery guide 112, which deposits continuous flexible line 106 along print path 122, is positioned downstream of feed mechanism 104 with respect to a direction of movement of continuous flexible line 106 when composite part 102 is being manufactured by system 100.

As used herein, a "continuous flexible line" is an elongate structure having a length significantly longer than a dimension (e.g., diameter or width) that is transverse, or perpendicular, to its length. As an illustrative, non-exclusive example, continuous flexible line 106 may have a length that is at least 100, at least 1000, at least 10000, at least 100000, or at least 1000000 times greater than its diameter or width.

As used herein, a "photopolymer resin" is a resin material that is configured to be cured, or hardened, by selective application of light. As illustrative, non-exclusive examples, liquid photopolymer resin 252, and thus photopolymer-resin component 110, may be configured to be at least partially cured, or hardened, when curing energy 118 in the form of ultraviolet light, visible light, infrared light, and/or x-rays is delivered to portion 124 of continuous flexible line 106 by source 116.

As mentioned, delivery guide 112 is movable relative to surface 114. This means that in some examples, system 100 may include delivery guide 112 that is configured to be selectively moved relative to surface 114, which surface 114 may be a part of system 100 or a part of a structure, such as an airplane wing or a fuselage, etc. Additionally, in examples where system 100 includes surface 114, surface 114 may be selectively moved relative to delivery guide 112. Also, in some examples, system 100 may include delivery guide 112 and surface 114, and both may be selectively moved relative to each other.

Referring generally to FIG. 1 and particularly to, e.g., FIGS. 2, 3, and 22, vessel 236 is configured to receive non-resin component 108 and to discharge continuous flexible line 106. The preceding subject matter of this paragraph characterizes example 2 of the present disclosure, wherein example 2 also includes the subject matter according to example 1, above.

Accordingly, continuous flexible line 106 is created within vessel 236 as non-resin component 108 is pulled through vessel 236, and thus through the volume of liquid photopolymer resin 252 held therein, by feed mechanism 104.

Referring generally to FIG. 1 and particularly to, e.g., FIGS. 2 and 3, vessel 236 comprises inlet 238, through which non-resin component 108 is received into vessel 236, and outlet 240, through which continuous flexible line 106 is discharged from vessel 236. The preceding subject matter of this paragraph characterizes example 3 of the present disclosure, wherein example 3 also includes the subject matter according to example 2, above.

Vessel 236 comprising inlet 238 and outlet 240 provides a discrete path through vessel for non-resin component 108 to enter vessel 236 and continuous flexible line 106 to exit vessel 236.

Referring generally to FIG. 1 and particularly to, e.g., FIGS. 2 and 3, outlet 240 comprises convergent passage 242, shaped to limit an amount of liquid photopolymer resin 252 exiting vessel 236 as part of continuous flexible line 106. The preceding subject matter of this paragraph characterizes example 4 of the present disclosure, wherein example 4 also includes the subject matter according to example 3, above.

In this example, convergent passage 242 therefore ensures that a desired amount of liquid photopolymer rein 252 is applied to non-resin component 108 to create continuous flexible line 106. Moreover, convergent passage 242 may facilitate adequate penetration of liquid photopolymer resin 252 into non-resin component 108 depending on the configuration of non-resin component 108.

Referring generally to FIG. 1 and particularly to, e.g., FIGS. 2 and 3, convergent passage 242 is shaped to facilitate uniform application of liquid photopolymer resin 252 to non-resin component 108. The preceding subject matter of this paragraph characterizes example 5 of the present disclosure, wherein example 5 also includes the subject matter according to example 4, above.

In this example, convergent passage 242 therefore ensures that a uniform application of liquid photopolymer rein 252 to non-resin component 108 is accomplished as non-resin component 108 is pulled through the volume of liquid photopolymer resin 252 held in vessel 236. Such a uniform application of liquid photopolymer resin 252 may be desirable to facilitate adhesion between layers of continuation flexible line 106 being deposited via delivery guide 112, as well as to prevent undesirable voids being formed in composite part 102.

Referring generally to FIG. 1 and particularly to, e.g., FIGS. 2 and 3, vessel 236 further comprises guide 244, positioned to route non-resin component 108 through vessel 236 along a predetermined path. The preceding subject matter of this paragraph characterizes example 6 of the present disclosure, wherein example 6 also includes the subject matter according to any one of examples 2-5, above.

Guide 244 may take any suitable structure and be provided to ensure non-resin component 108 comes into contact with a sufficient volume of liquid photopolymer resin 252 to create continuous flexible line 106.

Referring generally to FIG. 1 and particularly to, e.g., FIGS. 2 and 3, guide 244 is positioned to impart no bend less than 60-degrees between any two sequential segments of non-resin component 108 as non-resin component 108 travels through vessel 236. The preceding subject matter of this paragraph characterizes example 7 of the present disclosure, wherein example 7 also includes the subject matter according to example 6, above.

Limiting bending of non-resin component 108 may prevent damage to non-resin component 108.

Referring generally to FIG. 1 and particularly to, e.g., FIGS. 2 and 3, guide 244 comprises two or more guide structures 245. The preceding subject matter of this paragraph characterizes example 8 of the present disclosure, wherein example 8 also includes the subject matter according to any one of examples 6 or 7, above.

Inclusion of two or more guide structures 244 may facilitate a desired amount of liquid photopolymer resin 252 to create continuous flexible line 106.

FIG. 2 illustrates an example of system 100 with two guide structures 245 positioned so non-resin component 108 entering from a top of vessel 236 is appropriately routed through the volume of liquid photopolymer resin 252 held in vessel 236. FIG. 3 illustrates an example of system 100 with three guide structures 245 positioned so non-resin component 108 entering from inlet 238 positioned on a side of vessel 236 is appropriately routed through the volume of liquid photopolymer resin 252 held in vessel 236.

Referring generally to FIG. 1 and particularly to, e.g., FIGS. 2 and 3, guide 244 comprises one or more rollers 247. The preceding subject matter of this paragraph characterizes example 9 of the present disclosure, wherein example 9 also includes the subject matter according to any one of examples 6-8, above.

Rollers 247 may facilitate the pulling of non-resin component 108 through vessel 236, thereby reducing friction between non-resin component 108 and guide 244 and preventing damage to non-resin component 108.

Referring generally to FIG. 1, at least one roller 247 comprises motorized roller 249 configured to facilitate movement of non-resin component 108 through vessel 236. The preceding subject matter of this paragraph characterizes example 10 of the present disclosure, wherein example 10 also includes the subject matter according to example 9, above.

By including motorized roller 249, movement of non-resin component 108 is facilitated though vessel 236. Moreover, operation of motorized roller 249 may be selectively controlled in conjunction with feed mechanism 104 to facilitate the pulling of non-resin component 108 through vessel 236.

In FIG. 1, motorized roller 249 is schematically and optionally illustrated opposite another roller 247, which optionally may be motorized or not motorized and with non-resin component 108 in engagement between the two rollers 247 to facilitate movement of non-resin component 108 through vessel 236.

Referring generally to FIG. 1, vessel 236 comprises low-level sensor 246, positioned to detect when a level of liquid photopolymer resin 252 in vessel 236 is at or below a lower-threshold level. The preceding subject matter of this paragraph characterizes example 11 of the present disclosure, wherein example 11 also includes the subject matter according to any one of examples 1-10, above.

Inclusion of low-level sensor 246 may be used to alert an operator that the level of liquid photopolymer resin 252 in vessel 236 is low and needs replenishing. Additionally or alternatively, low-level sensor 246 may be used to facilitate an automatic replenishment of liquid photopolymer resin 252 in vessel 236.

Referring generally to FIG. 1, system 100 further comprises supply 262 of liquid photopolymer resin 252. Supply 262 is configured to selectively deliver liquid photopolymer resin 252 to vessel 236 when the level of liquid photopolymer resin 252 is at or below the lower-threshold level. The preceding subject matter of this paragraph characterizes example 12 of the present disclosure, wherein example 12 also includes the subject matter according to example 11, above.

By having supply 262 automatically deliver liquid photopolymer resin 252 to vessel 236 responsive to a low level, a desirable amount of liquid photopolymer resin 252 may be maintained in vessel 236 without an operator needing to manually replenish it.

Referring generally to FIG. 1, vessel 236 further comprises high-level sensor 248, positioned to detect when the level of liquid photopolymer resin 252 in vessel 236 is at or above an upper-threshold level. The preceding subject matter of this paragraph characterizes example 13 of the present disclosure, wherein example 13 also includes the subject matter according to example 11, above.

Inclusion of high-level sensor 248 may be used to prevent overfilling of vessel 236 with liquid photopolymer resin 252.

Referring generally to FIG. 1, system 100 further comprises supply 262 of liquid photopolymer resin 252. Supply 262 is configured to selectively deliver liquid photopolymer resin 252 to vessel 236 when the level of liquid photopolymer resin 252 is at or below the lower-threshold level and to selectively cease delivering liquid photopolymer resin 252 to vessel 236 when the level of liquid photopolymer resin 252 is at or above the upper-threshold level. The preceding subject matter of this paragraph characterizes example 14 of the present disclosure, wherein example 14 also includes the subject matter according to example 13, above.

By having supply 262 automatically deliver liquid photopolymer resin 252 to vessel 236 responsive to a low level and automatically cease delivery of liquid photopolymer resin 252 to vessel 236 responsive to a high level, a desirable amount of liquid photopolymer resin 252 may be maintained in vessel 236 without an operator needing to manually replenish it.

Referring generally to FIG. 1 and particularly to, e.g., FIGS. 4 and 5, non-resin component 108 comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 15 of the present disclosure, wherein example 15 also includes the subject matter according to any one of examples 1-14, above.

Inclusion of a fiber or fibers in continuous flexible line 106 permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. Non-resin component 108 is not limited to the identified examples, and other types of non-resin component 108 may be used.

FIG. 3 schematically represents continuous flexible line 106 with a single fiber as non-resin component 108 within a matrix of photopolymer-resin component 110. FIG. 4 schematically represents continuous flexible 106 with more than one fiber as non-resin component 108 within a matrix of photopolymer-resin component 110.

Referring generally to FIG. 1, liquid photopolymer resin 252 comprises at least one of an ultraviolet-light photopolymer resin, a visible-light photopolymer resin, an infrared-light photopolymer, or an x-ray photopolymer resin. The preceding subject matter of this paragraph characterizes example 16 of the present disclosure, wherein example 16 also includes the subject matter according to any one of examples 1-15, above.

An ultraviolet-light photopolymer resin, an infrared-light photopolymer resin, or an x-ray photopolymer resin may be selected so as to avoid inadvertent curing by visible light and/or to permit for precisely directing curing energy 118 to portion 124 of segment 120 of continuous flexible line 106 after segment 120 of continuous flexible line 106 exits delivery guide 112. On the other hand, a visible-light photopolymer may be selected so that source 116 need only deliver visible light to cure portion 124.

Referring generally to FIG. 1, system 100 further comprises origin 126 of non-resin component 108. The preceding subject matter of this paragraph characterizes example 17 of the present disclosure, wherein example 17 also includes the subject matter according to any one of examples 1-16, above.

System 100, with origin 126, includes the material itself that defines non-resin component 108. When provided, origin 126 may provide one or more non-resin components 108, such as including a first non-resin component 108 with first desired properties and a second non-resin component 108 with second desired properties that are different from the first desired properties. For example, when more than one non-resin component 108 is provided, one or more may be selected for desired properties of composite part 102.

Referring generally to FIG. 1, origin 126 of non-resin component 108 comprises spool 128 of non-resin component 108. The preceding subject matter of this paragraph characterizes example 18 of the present disclosure, wherein example 18 also includes the subject matter according to example 17, above.

Origin 126 in the form of spool 128 may provide a significant length of non-resin component 108 in a compact volume that is readily replenished or replaced during a manufacturing operation.

Accordingly, feed mechanism 104 may be configured to draw, or pull, non-resin component 108 from spool 128.

Additionally or alternatively, origin 126 of non-resin component 108 may comprise a plurality of individual lengths of non-resin component 108.

Referring generally to FIG. 1 and particularly to, e.g., FIGS. 6-8, 14, 21, and 23-28, source 116 of curing energy 118 is configured to deliver curing energy 118 at least to portion 124 of segment 120 of continuous flexible line 106 as feed mechanism 104 pushes continuous flexible line 106 through delivery guide 112 toward print path 122 and after segment 120 of continuous flexible line 106 is deposited along print path 122. The preceding subject matter of this paragraph characterizes example 19 of the present disclosure, wherein example 19 also includes the subject matter according to any one of examples 1-18, above.

By delivering curing energy 118 to portion 124 of segment 120 of continuous flexible line 106 after segment 120 is deposited by delivery guide 112, photopolymer-resin component 110 within portion 124 is at least partially cured, so that portion 124 is effectively fixed in a desired place relative to the remainder of segment 120 having been already deposited by delivery guide 112. In other words, source 116 provides for in situ curing of composite part 102 as it is being manufactured by system 100.

Referring generally to FIG. 1 and particularly to, e.g., FIGS. 6-8, 14, 21, and 23-28, source 116 of curing energy 118 is configured to deliver a predetermined or actively determined amount of curing energy 118 at a controlled rate at least to portion 124 of segment 120 of continuous flexible line 106. The preceding subject matter of this paragraph characterizes example 20 of the present disclosure, wherein example 20 also includes the subject matter according to any one of examples 1-19, above.

As a result of delivering a predetermined or actively determined amount of curing energy 118 at a controlled rate, a desired level, or degree, of cure may be established with respect to portion 124 of segment 120 at any given time during manufacture of composite part 102. For example, it may be desirable to cure one portion 124 greater than or less than another portion 124 during manufacture of composite part 102. A predetermined amount of curing energy 118 may be based, e.g., on the photopolymer resin used for photopolymer-resin component 110. An actively determined amount of curing energy 118 may be based, e.g., on real-time data sensed from continuous flexible line 106 as it is being deposited, including (but not limited to) hardness, color, temperature, glow, etc.

Referring generally to FIG. 1 and particularly to, e.g., FIGS. 6-8, 14, 21, and 23-28, source 116 of curing energy 118 comprises at least one light source 134. At least one light source 134 comprises one or more curing lasers. The preceding subject matter of this paragraph characterizes example 21 of the present disclosure, wherein example 21 also includes the subject matter according to any one of examples 1-20, above.

Inclusion of one or more curing lasers facilitates a concentrated and directed stream of curing energy 118, such that curing energy 118 may be selectively and precisely directed at portion 124 of segment 120 during manufacture of composite part 102.

Referring generally to FIG. 1 and particularly to, e.g., FIGS. 6-8, 14, 21, and 23-28, source 116 of curing energy 118 comprises at least one light source 134. At least one light source 134 comprises one or more ultraviolet-light sources. The preceding subject matter of this paragraph characterizes example 22 of the present disclosure, wherein example 22 also includes the subject matter according to any one of examples 1-21, above.

Inclusion of one or more ultraviolet-light sources permits for use of photopolymer resins 252 that are configured to be cured in the presence of ultraviolet-light.

Referring generally to FIG. 1 and particularly to, e.g., FIGS. 6-8, 14, 21, and 23-28, source 116 of curing energy 118 comprises at least one light source 134. At least one light source 134 comprises one or more visible-light sources. The preceding subject matter of this paragraph characterizes example 23 of the present disclosure, wherein example 23 also includes the subject matter according to any one of examples 1-22, above.

Inclusion of one or more visible-light sources permits for use of photopolymer resins 252 that are configured to be further cured in the presence of visible light.

Referring generally to FIG. 1 and particularly to, e.g., FIGS. 6-8, 14, 21, and 23-28, source 116 of curing energy 118 comprises at least one light source 134. At least one light source 134 comprises one or more infrared-light sources, one or more ultraviolet-light sources, and/or one or more x-ray sources. The preceding subject matter of this paragraph characterizes example 24 of the present disclosure, wherein example 24 also includes the subject matter according to any one of examples 1-23, above.

Inclusion of one or more infrared-light sources permits for use of photopolymer resins 252 that are configured to be further cured in the presence of infrared light. Inclusion of one or more ultraviolet-light sources permits for use of photopolymer resins 252 that are configured to be further cured in the presence of ultraviolet light. Inclusion of one or more x-ray sources permits for use of photopolymer resins 252 that are configured to be further cured in the presence of x-rays.

Referring generally to FIG. 1, source 116 of curing energy 118 comprises heat source 136. The preceding subject matter of this paragraph characterizes example 25 of the present disclosure, wherein example 25 also includes the subject matter according to any one of examples 1-24, above.

Inclusion of heat source 136 permits for use of photopolymer resins 252 that are configured to be cured in the presence of heat.

Referring generally to FIG. 1 and particularly to, e.g., FIGS. 8 and 23-28, source 116 of curing energy 118 is operatively coupled to delivery guide 112 and is configured to move with delivery guide 112. The preceding subject matter of this paragraph characterizes example 26 of the present disclosure, wherein example 26 also includes the subject matter according to any one of examples 1-25, above.

Accordingly, source 116 may be positioned, aligned, or otherwise configured so that curing energy 118 is always directed at portion 124 of segment 120, and as delivery guide 112 moves, source 118 moves with delivery guide 112. As a result, source 116 need not include complex mechanisms to maintain delivery of curing energy 118 to portion 124 of segment 120 as delivery guide 112 moves relative to surface 114 and/or vice versa.

Referring generally to FIG. 1 and particularly to, e.g., FIGS. 23-25, source 116 of curing energy 118 is rotatable relative to delivery guide 112. The preceding subject matter of this paragraph characterizes example 27 of the present disclosure, wherein example 27 also includes the subject matter according to any one of examples 1-26, above.

By being rotatable relative to delivery guide 112, source 116 may be selectively positioned to deliver curing energy 118 to portion 124 of segment 120 as delivery guide 112 moves, including as it changes directions, relative to surface 114 and/or vice versa.

Referring generally to FIG. 1 and particularly to, e.g., FIGS. 23-28, source 116 of curing energy 118 is configured to trail delivery guide 112 when delivery guide 112 moves relative to surface 114. The preceding subject matter of this paragraph characterizes example 28 of the present disclosure, wherein example 28 also includes the subject matter according to any one of examples 1-27, above.

By trailing delivery guide 112, source 116 is selectively positioned to deliver curing energy 118 to portion 124 of segment 120 directly following portion 124 exiting delivery guide 112.

Referring generally to FIG. 1 and particularly to, e.g., FIGS. 8, 9, and 21, source 116 of curing energy 118 is configured to deliver ring 148 of curing energy 118, intersecting segment 120 of continuous flexible line 106. The preceding subject matter of this paragraph characterizes example 29 of the present disclosure, wherein example 29 also includes the subject matter according to any one of examples 1-28, above.

When ring 148 of curing energy 118 intersects segment 120, ring 148 ensures that curing energy 118 is delivered to portion 124 regardless of a direction that segment 120 is exiting delivery guide 112 as delivery guide 112 moves relative to surface 114 and/or vice versa.

Ring 148 of curing energy 118 may be defined by any suitable process and/or structure. For example, with reference to FIG. 10, and as discussed herein, delivery guide 112 may comprise curing-energy passage 146, and source 116 of curing energy 118 may be configured to deliver curing energy 118 through curing-energy passage 146 such that curing energy 118 defines ring 148. Additionally or alternatively, with reference to FIG. 21, as also discussed herein, energy source 116 may comprise at least one galvanometer mirror-positioning system 150 that is configured to deliver ring 148 of curing energy 118 to portion 124 of segment 120.

Referring generally to FIG. 1 and particularly to, e.g., FIG. 21, source 116 of curing energy 118 is not configured to move with delivery guide 112. The preceding subject matter of this paragraph characterizes example 30 of the present disclosure, wherein example 30 also includes the subject matter according to any one of examples 1-25, above.

Such an example of system 100 may provide for a less cumbersome assembly associated with delivery guide 112, permitting delivery guide 112 to more easily make micro-movements and turns, or angle changes, relative to surface 114 and/or vice versa, such as based on the configuration of composite part 102, and desired properties thereof, being manufactured.

FIG. 21 provides an example of system 100, with energy source 116 comprising two galvanometer mirror-positioning systems 150 that are static relative to delivery guide 112 as delivery guide 112 moves relative to surface 114, but with galvanometer mirror-positioning systems 150 configured to deliver curing energy 118 to portion 124 of segment 120 of continuous flexible line 106 as it exits delivery guide 112.

Referring generally to FIG. 1 and particularly to, e.g., FIG. 21, source 116 of curing energy 118 comprises at least one galvanometer mirror-positioning system 150, configured to deliver curing energy 118 at least to portion 124 of segment 120 of continuous flexible line 106 responsive to movement of delivery guide 112 relative to surface 114. The preceding subject matter of this paragraph characterizes example 31 of the present disclosure, wherein example 31 also includes the subject matter according to any one of examples 1-25 and 30, above.

In other words, one or more galvanometer mirror-positioning systems 150 may actively direct curing energy 118 at portion 124 of segment 120 as continuous flexible line 106 exits delivery guide 112.

Referring to FIG. 6, source 116 of curing energy 118 is configured to partially cure first layer 140 of segment 120 of continuous flexible line 106 as at least a portion of first layer 140 is being deposited by delivery guide 112 against surface 114 and to further cure first layer 140 and to partially cure second layer 142 as second layer 142 is being deposited by delivery guide 112 against first layer 140. The preceding subject matter of this paragraph characterizes example 32 of the present disclosure, wherein example 32 also includes the subject matter according to any one of examples 1-31, above.

By only partially curing first layer 140 as first layer 140 is being deposited, first layer 140 may remain tacky, or sticky, thereby facilitating adhesion of second layer 142 against first layer 140 as second layer 142 is deposited against first layer 140. Then, first layer 140 is further cured as second layer 142 is being partially cured for deposition of a subsequent layer against second layer 142, and so forth.

By further curing first layer 140, it is meant that first layer 140 may be fully cured or less than fully cured. For example, in some applications, it may be desirable for a less than full cure of composite part 102 during manufacture by system 100 to permit for subsequent work on composite part 102 before an entirety of composite part 102 is fully cured, such as with a process separate from system 100. For example, composite part 102 may be baked, heated, and/or placed in an autoclave for final curing.

Referring generally to FIG. 1 and particularly to, e.g., FIG. 6, source 116 of curing energy 118 is configured to partially cure first layer 140 of segment 120 of continuous flexible line 106 as at least a portion of first layer 140 is being deposited by delivery guide 112 against surface 114 and to fully cure first layer 140 and to partially cure second layer 142 as second layer 142 is being deposited by delivery guide 112 against first layer 140. The preceding subject matter of this paragraph characterizes example 33 of the present disclosure, wherein example 33 also includes the subject matter according to any one of examples 1-31, above.

Again, by only partially curing first layer 140 as first layer 140 is being deposited, first layer 140 may remain tacky, or sticky, thereby facilitating adhesion of second layer 142 against first layer 140 as second layer 142 is deposited against first layer 140. However, according to this example 42, first layer 140 is fully cured as second layer 142 is being partially cured.

Referring generally to FIG. 1 and particularly to, e.g., FIG. 23, system 100 further comprises surface roughener 144. Source 116 of curing energy 118 is configured to deliver curing energy 118 at least to portion 124 of segment 120 of continuous flexible line 106 prior to abrading a surface of portion 124 with surface roughener 144. The preceding subject matter of this paragraph characterizes example 34 of the present disclosure, wherein example 34 also includes the subject matter according to any one of examples 1-33, above.

Surface roughener 144, when present, abrades portion 124, providing it with an increased surface area for better adhesion of a subsequent layer deposited against it. Moreover, by delivering curing energy 118 to portion 124 prior to surface roughener (144) abrading portion 124, the increased surface area may not relax, or return to a less abraded condition, as photopolymer-resin component 110 is less viscous following delivery of curing energy 118 thereto.

Referring generally to FIG. 1, system 100 further comprises surface roughener 144. Source 116 of curing energy 118 is configured to deliver curing energy 118 at least to portion 124 of segment 120 of continuous flexible line 106 after abrading a surface of portion 124 with surface roughener 144. The preceding subject matter of this paragraph characterizes example 35 of the present disclosure, wherein example 35 also includes the subject matter according to any one of examples 1-33, above.

In contrast to example 34, example 35 may permit for the increased surface area, or abrasion, of portion 124 to be at least temporarily fixed by curing energy 118, such that it remains in a desired state of abrasion until a subsequent layer of continuous flexible line 106 is deposited against it.

Referring generally to FIG. 1 and particularly to, e.g., FIGS. 23-25, system 100 further comprises pivoting arm 152, coupled relative to delivery guide 112 such that pivoting arm 152 trails delivery guide 112 as delivery guide 112 moves relative to surface 114. Source 116 of curing energy 118 is coupled to pivoting arm 152. The preceding subject matter of this paragraph characterizes example 36 of the present disclosure, wherein example 36 also includes the subject matter according to any one of examples 1-29, above.

As with examples 27 and 28, by being coupled to pivoting arm 152, source 116 is selectively positioned to deliver curing energy 118 to portion 124 of segment 120 directly following portion 124 exiting delivery guide 112.

Referring generally to FIG. 1 and particularly to, e.g., FIGS. 23-25, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 37 of the present disclosure, wherein example 37 also includes the subject matter according to example 36, above.

Pivoting-arm actuator 188, by actively controlling a rotational position of pivoting arm 152 relative to delivery guide 112, ensures that source 116 trails delivery guide 112 so that source 116 is selectively positioned to deliver curing energy 118 to portion 124 of segment 120 directly following portion 124 exiting delivery guide 112.

Referring generally to FIG. 1 and particularly to, e.g., FIGS. 23-25, pivoting-arm actuator 188 is configured to actively coordinate the rotational position of pivoting arm 152 with movement of delivery guide 112 relative to surface 114. The preceding subject matter of this paragraph characterizes example 38 of the present disclosure, wherein example 38 also includes the subject matter according to example 37, above.

Pivoting-arm actuator 188, by actively coordinating a rotational position of pivoting arm 152 relative to delivery guide 112, ensures that source 116 trails delivery guide 112 so that source 116 is selectively positioned to deliver curing energy 118 to portion 124 of segment 120 directly following portion 124 exiting delivery guide 112.

Referring generally to FIG. 1 and particularly to, e.g., FIGS. 10 and 23-30, feed mechanism 104 is coupled to delivery guide 112. The preceding subject matter of this paragraph characterizes example 39 of the present disclosure, wherein example 39 also includes the subject matter according to any one of examples 1-38, above.

Having feed mechanism 104 coupled to delivery guide 112 facilitates feed mechanism 104 being able to operatively push continuous flexible line 106 through delivery guide 112.

Referring generally to FIG. 1 and particularly to, e.g., FIGS. 10 and 23-30, delivery guide 112 extends from feed mechanism 104. The preceding subject matter of this paragraph characterizes example 40 of the present disclosure, wherein example 40 also includes the subject matter according to any one of examples 1-39, above.

By extending from feed mechanism 104, delivery guide 112 may be positioned for selective deposition of continuous flexible line 106 in a desired location along print path 122.

Referring generally to FIG. 1 and particularly to, e.g., FIGS. 10 and 23-30, delivery guide 112 comprises guide inlet 284, guide outlet 206, through which continuous flexible line 106 exits delivery guide 112, and guide line passage 154, extending from guide inlet 284 to guide outlet 206. Feed mechanism 104 is configured to push continuous flexible line 106 through guide line passage 154. Feed mechanism 104 comprises support frame 156 and opposing rollers 157, having respective rotational axes 159. Opposing rollers 157 are rotatably coupled to support frame 156. Opposing rollers 157 are configured to engage opposite sides of continuous flexible line 106. Opposing rollers 157 are configured to selectively rotate to push continuous flexible line 106 through line passage 154. The preceding subject matter of this paragraph characterizes example 41 of the present disclosure, wherein example 41 also includes the subject matter according to any one of examples 1-40, above.

Support frame 156 provides support for component parts of feed mechanism 104, including opposing rollers 157. Opposing rollers 157, when selectively rotated, act to frictionally engage continuous flexible line 106, thereby feeding it between opposing rollers 157 and pushing it into guide inlet 284 and through guide line passage 154.

Referring generally to FIG. 9 and particularly to, e.g., FIGS. 29 and 30, opposing rollers 157 are in contact with each other. The preceding subject matter of this paragraph characterizes example 42 of the present disclosure, wherein example 42 also includes the subject matter according to example 41, above.

Contact between opposing rollers 157 may ensure that opposing rollers 157 roll together and avoid imparting an uneven torque that would bend or otherwise create an internal curved bias to continuous flexible line 106 as it is drawn between the rollers. Additionally or alternatively, contact between opposing rollers 157 may permit for only one of opposing rollers 157 to be directly driven by a motor, while the other of opposing rollers 157 simply rotates as a result of being engaged with the driven roller.

Referring generally to FIG. 9 and particularly to, e.g., FIGS. 29 and 30, each of opposing rollers 157 comprises circumferential channel 161, configured to contact continuous flexible line 106. The preceding subject matter of this paragraph characterizes example 43 of the present disclosure, wherein example 43 also includes the subject matter according to any one of examples 41 or 42, above.

Inclusion of circumferential channel 161 in each of opposing rollers 157 thereby creates a passage through which continuous flexible line 106 may extend and provides for a greater surface area of contact between opposing rollers 157 and continuous flexible line 106, thereby facilitating continuous flexible line 106 being pushed into guide inlet 284 and through guide line passage 154.

Referring generally to FIG. 9 and particularly to, e.g., FIGS. 29 and 30, one of opposing rollers 157 comprises circumferential channel 161, configured to contact continuous flexible line 106. The preceding subject matter of this paragraph characterizes example 44 of the present disclosure, wherein example 44 also includes the subject matter according to any one of examples 41 or 42, above.

As with example 43, inclusion of one circumferential channel 161 creates a passage through which continuous flexible line 106 may extend and provides for a greater surface area of contact between opposing rollers 157 and continuous flexible line 106, thereby facilitating continuous flexible line 106 being pushed into guide inlet 284 and through guide line passage 154.

Referring generally to FIG. 1 and particularly to, e.g., FIGS. 29 and 30, opposing rollers 157 are differently sized. The preceding subject matter of this paragraph characterizes example 45 of the present disclosure, wherein example 45 also includes the subject matter according to any one of examples 41-44, above.

Differently sized opposing rollers 157 may permit for efficient packaging of feed mechanism 104. Additionally or alternatively, differently sized opposing rollers 157 may provide for a desired torque transfer between driven roller 158 and idle roller 160.

Referring generally to FIG. 1 and particularly to, e.g., FIG. 10, opposing rollers 157 are identically sized. The preceding subject matter of this paragraph characterizes example 46 of the present disclosure, wherein example 46 also includes the subject matter according to any one of examples 41-44, above.

Identically sized opposing rollers 157 may permit for efficient packaging of feed mechanism 104. Additionally or alternatively, identically sized opposing rollers 157 may provide for a desired torque transfer between driven roller 158 and idle roller 160.

Referring generally to FIG. 1 and particularly to, e.g., FIGS. 10 and 23-31, feed mechanism 104 further comprises motor 162, operatively coupled at least to one of opposing rollers 157 and configured to selectively rotate at least one of opposing rollers 157. The preceding subject matter of this paragraph characterizes example 47 of the present disclosure, wherein example 47 also includes the subject matter according to any one of examples 41-46, above.

Motor 162 provides a motive force for rotating opposing rollers 157 for feed mechanism 104 to push continuous flexible line 106 through delivery guide 112.

Referring generally to FIG. 1 and particularly to, e.g., FIGS. 10 and 29-31, opposing rollers 157 comprise driven roller 158, operatively coupled to motor 162, and idle roller 160, biased toward driven roller 158 to operatively engage opposing sides of continuous flexible line 106. The preceding subject matter of this paragraph characterizes example 48 of the present disclosure, wherein example 48 also includes the subject matter according to example 47, above.

By having idle roller 160 biased toward driven roller 158, idle roller 160 need not be directly driven by a motor for feed mechanism 104 to push continuous flexible line 106 through delivery guide 112. Instead, idle roller 160 is rotated by idle roller 160 being engaged with driven roller 158 and/or by being engaged with continuous flexible line 106, which in turn is engaged with driven roller 158.

Idle roller 160 may be biased toward driven roller 158 by biasing member 164, which may be a spring, such as a coil spring.

Referring generally to FIG. 1 and particularly to, e.g., FIGS. 29-31, feed mechanism 104 further comprises rocker arm 169. Rocker arm 169 is pivotally coupled to support frame 156. Idle roller 160 is rotationally coupled to rocker arm 169. Rocker arm 169 is biased relative to support frame 156 so that idle roller 160 is biased toward driven roller 158. Rocker arm 169 is configured to selectively pivot idle roller 160 away from driven roller 158. The preceding subject matter of this paragraph characterizes example 49 of the present disclosure, wherein example 49 also includes the subject matter according to example 48, above.

Rocker arm 169 provides structure for a user to engage and pivot idle roller 160 away from driven roller 158 against the bias of biasing member 164. Accordingly, a user may selectively pivot idle roller 160 to facilitate initial insertion of continuous flexible line 106 between opposing rollers 157, such as during initial set-up of system 100 and/or to change continuous flexible line 106 during manufacture of composite part 102.

As used herein, "to bias" means to continuously apply a force, which may or may not have a constant magnitude.

Referring generally to FIG. 1 and particularly to, e.g., FIGS. 29-31, feed mechanism 104 further comprises rocker-arm adjuster 171, configured to selectively adjust a force applied to rocker arm 169 to bias idle roller 160 toward driven roller 158. The preceding subject matter of this paragraph characterizes example 50 of the present disclosure, wherein example 50 also includes the subject matter according to example 49, above.

Rocker-arm adjuster 171 permits a user to selectively adjust the biasing force of idle roller 160 toward driven roller 158 and thus the force applied to continuous flexible line 106 between opposing rollers 157. For example, different magnitudes of force facilitate operation of system 100 in connection with different material properties of different configurations and/or different sizes of continuous flexible line 106 that may be used by system 100.

Referring generally to FIG. 1 and particularly to, e.g., FIGS. 10, 29, and 30, delivery guide 112 further comprises first end portion 163, second end portion 165, and junction 167 between first end portion 163 and second end portion 165. First end portion 163 is shaped to be complementary to one of opposing rollers 157, and second end portion 165 is shaped to be complementary to another of opposing rollers 157. The preceding subject matter of this paragraph characterizes example 51 of the present disclosure, wherein example 51 also includes the subject matter according to any one of examples 41-50, above.

Having first end portion 163 and second end portion 165 complementary with opposing rollers 157, delivery guide 112 may be positioned in very close proximity to opposing rollers 157. Accordingly, when feed mechanism 104 pushes continuous flexible line 106 into and through delivery guide 112, continuous flexible line 106 is less likely to bunch, kink, clog, or otherwise mis-feed from feed mechanism 104 to delivery guide 112.

Referring generally to FIG. 1 and particularly to, e.g., FIG. 10, shortest distance D between junction 167 and plane 173, containing respective rotational axes 159 of opposing rollers 157, is less than a radius of a smallest one of opposing rollers 157. The preceding subject matter of this paragraph characterizes example 52 of the present disclosure, wherein example 52 also includes the subject matter according to example 51, above.

Again, having delivery guide 112 in close proximity to opposing rollers 157, such as with junction 167 within distance D of plane 173, continuous flexible line 106 operatively may be pushed into and through delivery guide 112.

Referring generally to FIG. 1 and particularly to, e.g., FIGS. 10, 29, and 30, junction 167 comprises an edge. The preceding subject matter of this paragraph characterizes example 53 of the present disclosure, wherein example 53 also includes the subject matter according to any one of examples 51 or 52, above.

When junction 167 comprises an edge, the edge may be positioned in very close proximity to the interface between opposing rollers 157 and the interface between opposing rollers 157 and continuous flexible line 106.

In some examples, the edge may be linear. In some examples, the edge may be a sharp edge. In some examples, the edge may be a rounded edge.

Referring generally to FIG. 1 and particularly to, e.g., FIGS. 10, 29, and 30, feed mechanism 104 further comprises scraper 172 in contact with at least one of opposing rollers 157 to remove residue of photopolymer-resin component 110 produced by engagement between opposing rollers 157 and continuous flexible line 106 as opposing rollers 157 rotate to selectively translate continuous flexible line 106 to push continuous flexible line 106 through guide line passage 154. The preceding subject matter of this paragraph characterizes example 54 of the present disclosure, wherein example 54 also includes the subject matter according to any one of examples 41-53, above.

Scraper 172 removes residue of photopolymer-resin component 110 from opposing rollers 157 to ensure that resin does not build up on opposing rollers and hinder operation of feed mechanism 104.

Scraper 172 may take any suitable form to operatively remove, or scrape, resin from opposing rollers 157. For example, with reference to FIGS. 29 and 30, scraper 172 may be a rectangular, or other, projection that extends in close proximity to one of opposing rollers 157, such as within 3 mm, 2 mm, 1 mm, 0.5 mm, or that extends to physically engage one of opposing rollers 157. More specifically, as seen in FIGS. 29 and 30, scraper 172 may extend adjacent to a region of opposing rollers 157 where opposing rollers engage continuous flexible line 106.

Referring to FIG. 11, at least one of opposing rollers 157 comprises circumferential channel 161, configured to contact continuous flexible line 106. Scraper 172 comprises projection 175, configured to remove from circumferential channel 161 the residue of photopolymer-resin component 110 produced by engagement between circumferential channel 161 and continuous flexible line 106 as opposing rollers 157 rotate to selectively translate continuous flexible line 106 to push continuous flexible line 106 through line passage 154. The preceding subject matter of this paragraph characterizes example 55 of the present disclosure, wherein example 55 also includes the subject matter according to example 54, above.

In examples of opposing rollers 157 that include circumferential channel 161, scraper 172 having projection 175 extending therein facilitates the scraping, or removal, of any residue of photopolymer-resin component 110 produced by engagement between opposing rollers 157 and continuous flexible line 106.

Referring generally to FIG. 1 and particularly to, e.g., FIGS. 10, 29, and 30, feed mechanism 104 further comprises collection reservoir 174, coupled to support frame 156. Collection reservoir 174 is configured to collect the residue of photopolymer-resin component 110 removed by scraper 172. The preceding subject matter of this paragraph characterizes example 56 of the present disclosure, wherein example 56 also includes the subject matter according to any one of examples 54 or 55, above.

As mentioned, collection reservoir 174 collects residue that is removed by scraper 172. Accordingly, the residue does not interfere with other components of feed mechanism 104 and does not result in unwanted particles hindering the manufacture of composite part 102. Moreover, collection reservoir 174 may be selectively emptied by a user, such as when full or at the end of a process performed by system 100.

Referring generally to FIG. 1 and particularly to, e.g., FIGS. 7-9, delivery guide 112 further comprises curing-energy passage 146. Source 116 of curing energy 118 is configured to deliver curing energy 118 through curing-energy passage 146 at least to portion 124 of segment 120 of continuous flexible line 106. Curing-energy passage 146 is optically isolated from guide line passage 154. The preceding subject matter of this paragraph characterizes example 57 of the present disclosure, wherein example 57 also includes the subject matter according to any one of examples 41-56, above.

A system according to example 57 provides for precise direction of curing energy 118 to portion 124 as continuous flexible line 106 is exiting delivery guide 112. Moreover, by being optically isolated from guide line passage 154, curing-energy passage 146 restricts curing energy 118 from contacting continuous flexible line 106 before continuous flexible line 106 exits delivery guide 112.

According to example 57 (referring, e.g., to FIG. 8), curing-energy passage 146 may encircle guide line passage 154 and may have a circular outlet around guide line outlet 206 of guide line passage 154, such that the exit of curing energy 118 from curing-energy passage 146 results in ring 148 of curing energy 118, such as according to example 38 herein.

Referring generally to FIG. 1 and particularly to, e.g., FIGS. 12-16 and 23-25, system 100 further comprises compactor 138. Source 116 of curing energy 118 is configured to deliver curing energy 118 at least to portion 124 of segment 120 of continuous flexible line 106 at a location following compaction by compactor 138. The preceding subject matter of this paragraph characterizes example 58 of the present disclosure, wherein example 58 also includes the subject matter according to any one of examples 1-57, above.

Compactor 138 compacts adjacent layers of continuous flexible line 106 that have been deposited by delivery guide 112 along print path 122. When curing energy 118 is delivered to portion 124 following compaction by compactor 138, this permits compaction to occur prior to curing, or hardening, of photopolymer-resin component 110 of continuous flexible line 106.

Referring generally to FIG. 1 and particularly to, e.g., FIGS. 12-16 and 23-25, system 100 further comprises compactor 138, operatively coupled to delivery assembly 266 and configured to impart a compaction force at least to section 180 of segment 120 of continuous flexible line 106 after segment 120 of continuous flexible line 106 exits delivery guide 112. The preceding subject matter of this paragraph characterizes example 59 of the present disclosure, wherein example 59 also includes the subject matter according to any one of examples 1-58, above.

Again, compactor 138 compacts adjacent layers of continuous flexible line 106 that have been deposited by delivery guide 112 along print path 122.

Referring generally to FIG. 1 and particularly to, e.g., FIGS. 12-14, compactor 138 comprises compaction roller 182, having compaction-roller surface 184 that is configured to roll over at least section 180 of segment 120 of continuous flexible line 106 after segment 120 of continuous flexible line 106 exits delivery guide 112. The preceding subject matter of this paragraph characterizes example 60 of the present disclosure, wherein example 60 also includes the subject matter according to example 59, above.

Compaction roller 182, compared to alternative examples of compactor 138, may reduce the axial movement of photopolymer-resin component 110 along segment 120 during compaction. Additionally, compared to alternative examples of compactor 138, compaction roller 182 may provide a more desirable normal, or perpendicular, component of the compaction force.

Referring generally to FIG. 1 and particularly to, e.g., FIG. 12, compaction-roller surface 184 is textured. The preceding subject matter of this paragraph characterizes example 61 of the present disclosure, wherein example 61 also includes the subject matter according to example 60, above.

When compaction-roller surface 184 is textured, compaction-roller surface 184 imparts a texture to segment 120 or abrades segment 120, providing it with an increased surface area for better adhesion of a subsequent layer of continuous flexible line 106 deposited against it.

Referring generally to FIG. 1 and particularly to, e.g., FIG. 13, compaction-roller surface 184 is shaped to impart a predetermined cross-sectional shape at least to section 180 of segment 120 of continuous flexible line 106 after segment 120 of continuous flexible line 106 exits delivery guide 112. The preceding subject matter of this paragraph characterizes example 62 of the present disclosure, wherein example 62 also includes the subject matter according to any one of examples 60 or 61, above.

It may be desirable, in some applications, to impart a predetermined cross-sectional shape to continuous flexible line 106 as it is being deposited by delivery guide 112.

Referring generally to FIG. 1 and particularly to, e.g., FIG. 15, compactor 138 comprises compaction wiper 185, having wiper drag surface 186 that is configured to drag against at least section 180 of segment 120 of continuous flexible line 106 after segment 120 of continuous flexible line 106 exits delivery guide 112. The preceding subject matter of this paragraph characterizes example 63 of the present disclosure, wherein example 63 also includes the subject matter according to example 59, above.

Compaction wiper 185, compared to alternative examples of compactor 138, may increase the axial movement of photopolymer-resin component 110 along segment 120 during compaction.

Referring generally to FIG. 1 and particularly to, e.g., FIG. 15, wiper drag surface 186 is textured. The preceding subject matter of this paragraph characterizes example 64 of the present disclosure, wherein example 64 also includes the subject matter according to example 63, above.

When drag surface 186 is textured, drag surface 186 imparts a texture to segment 120 or abrades segment 120, providing it with an increased surface area for better adhesion of a subsequent layer of continuous flexible line 106 deposited against it.

Referring generally to FIG. 1 and particularly to, e.g., FIG. 15, wiper drag surface 186 is shaped to impart a predetermined cross-sectional shape to segment 120 of continuous flexible line 106 after segment 120 of continuous flexible line 106 exits delivery guide 112. The preceding subject matter of this paragraph characterizes example 65 of the present disclosure, wherein example 65 also includes the subject matter according to any one of examples 63 or 64, above.

As mentioned, it may be desirable, in some applications, to impart a predetermined cross-sectional shape to continuous flexible line 106 as it is being deposited by delivery guide 112.

Referring generally to FIG. 1 and particularly to, e.g., FIGS. 14, 23, and 25, compactor 138 is biased toward section 180 of segment 120 of continuous flexible line 106. The preceding subject matter of this paragraph characterizes example 66 of the present disclosure, wherein example 66 also includes the subject matter according to any one of examples 59-65, above.

By being biased toward section 180, compactor 138 imparts a desired compaction force against section 180.

Compactor 138 may be biased toward section 180, such as by spring 181 or other biasing member.

Referring generally to FIG. 1 and particularly to, e.g., FIGS. 14, 23, and 25, compactor 138 is rotatable relative to delivery guide 112. The preceding subject matter of this paragraph characterizes example 67 of the present disclosure, wherein example 67 also includes the subject matter according to any one of examples 59-66, above.

By being rotatable relative to delivery guide 112, compactor 138 may be selectively positioned to impart its compaction force against section 180 of segment 120 as delivery guide 112 moves, including as it changes directions, relative to surface 114 and/or vice versa.

FIG. 14 schematically illustrates compaction roller 182 that freely rotates relative to delivery guide 112. FIGS. 23 and 25 illustrate compaction roller 182 that is selectively and actively rotated by pivoting-arm actuator 188, as discussed herein.

Referring generally to FIG. 1 and particularly to, e.g., FIGS. 14, 23, and 25, compactor 138 is configured to trail delivery guide 112 when delivery guide 112 moves relative to surface 114. The preceding subject matter of this paragraph characterizes example 68 of the present disclosure, wherein example 68 also includes the subject matter according to any one of examples 59-67, above.

By trailing delivery guide 112, compactor 138 is selectively positioned to impart its compaction force against section 180 of segment 120 directly following section 180 exiting delivery guide 112.

Referring to FIG. 16, compactor 138 comprises skirt 190, coupled to delivery guide 112. Skirt 190 comprises skirt drag surface 192 that is positioned to drag against at least section 180 of segment 120 of continuous flexible line 106 after segment 120 of continuous flexible line 106 exits delivery guide 112. The preceding subject matter of this paragraph characterizes example 69 of the present disclosure, wherein example 69 also includes the subject matter according to example 59, above.

Skirt 190 extends from delivery guide 112 and circumferentially around outlet 206. Accordingly, regardless of a direction of movement of delivery guide 112 relative to surface 114, and/or vice versa, skirt 90 is positioned to compact section 180 of segment 120 of continuous flexible line 106 as it is being deposited.

Referring generally to FIG. 1 and particularly to, e.g., FIGS. 23 and 25, system 100 further comprises compactor 138, operatively coupled to delivery assembly 266 and configured to impart a compaction force at least to section 180 of segment 120 of continuous flexible line 106 after segment 120 of continuous flexible line 106 exits delivery guide 112. System 100 further comprises pivoting arm 152, coupled relative delivery assembly 266 such that pivoting arm 152 trails delivery guide 112 as delivery guide 112 moves relative to surface 114. Compactor 138 is coupled to pivoting arm 152. The preceding subject matter of this paragraph characterizes example 70 of the present disclosure, wherein example 70 also includes the subject matter according to example 1, above.

Pivoting arm 152 provides for selective pivoting of compactor 138 relative to delivery guide 112. Accordingly, compactor 138 may be selectively positioned to impart its compaction force against section 180 of segment 120 as delivery guide 112 moves, including as it changes directions, relative to surface 114 and/or vice versa.

Referring generally to FIG. 1 and particularly to, e.g., FIGS. 23 and 25, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 71 of the present disclosure, wherein example 71 also includes the subject matter according to example 70, above.

Pivoting-arm actuator 188 provides for selective pivoting of pivoting arm 152 and thus of compactor 138 relative to delivery guide 112. Accordingly, compactor 138 may be selectively positioned to impart its compaction force against section 180 of segment 120 as delivery guide 112 moves, including as it changes directions, relative to surface 114 and/or vice versa.

Referring generally to FIG. 1 and particularly to, e.g., FIGS. 23 and 25, pivoting-arm actuator 188 is configured to actively coordinate the rotational position of pivoting arm 152 with movement of delivery guide 112 relative to surface 114. The preceding subject matter of this paragraph characterizes example 72 of the present disclosure, wherein example 72 also includes the subject matter according to example 71, above.

Accordingly, compactor 138 may be selectively and actively positioned to impart its compaction force against section 180 of segment 120 as delivery guide 112 moves, including as it changes directions, relative to surface 114 and/or vice versa.

Referring generally to FIG. 1 and particularly to, e.g., FIG. 23, system 100 further comprises surface roughener 144, operatively coupled to delivery assembly 112 and configured to abrade at least section 194 of segment 120 of continuous flexible line 106 after segment 120 of continuous flexible line 106 exits delivery guide 112. The preceding subject matter of this paragraph characterizes example 73 of the present disclosure, wherein example 73 also includes the subject matter according to any one of examples 1-33, above.

Surface roughener 144 abrades section 194, providing it with an increased surface area for better adhesion of a subsequent layer deposited against it.

Referring to FIG. 1, surface roughener 144 comprises roughening roller 196 that is configured to rotationally abrade at least section 194 of segment 120 of continuous flexible line 106 after segment 120 of continuous flexible line 106 exits delivery guide 112. The preceding subject matter of this paragraph characterizes example 74 of the present disclosure, wherein example 74 also includes the subject matter according to example 73, above.

Roughening roller 196, compared to alternative examples of surface roughener 144, may reduce the axial movement of photopolymer-resin component 110 along segment 120 during abrasion thereof.

Referring generally to FIG. 1, roughening roller 196 comprises roughening roller surface 198, shaped to impart a predetermined cross-sectional shape to segment 120 of continuous flexible line 106 after segment 120 of continuous flexible line 106 exits delivery guide 112. The preceding subject matter of this paragraph characterizes example 75 of the present disclosure, wherein example 75 also includes the subject matter according to example 74, above.

It may be desirable, in some applications, to impart a predetermined cross-sectional shape to continuous flexible line 106 as it is being deposited by delivery guide 112.

Referring to FIG. 23, surface roughener 144 comprises roughening drag surface 200 that is configured to translationally abrade at least section 194 of segment 120 of continuous flexible line 106 after segment 120 of continuous flexible line 106 exits delivery guide 112. The preceding subject matter of this paragraph characterizes example 76 of the present disclosure, wherein example 76 also includes the subject matter according to example 73, above.

Roughening drag surface 200, compared to alternative examples of surface roughener 144, may increase the axial movement of photopolymer-resin component 110 along segment 120 during abrasion thereof.

Referring generally to FIG. 1 and particularly to, e.g., FIG. 23, surface roughener 144 is biased toward section 194 of segment 120 of continuous flexible line 106 after segment 120 of continuous flexible line 106 exits delivery guide 112. The preceding subject matter of this paragraph characterizes example 77 of the present disclosure, wherein example 77 also includes the subject matter according to any one of examples 73-76, above.

By being biased toward section 194, surface roughener 144 imparts a desired abrasion force against section 194.

Referring generally to FIG. 1 and particularly to, e.g., FIG. 23, surface roughener 144 is rotatable relative to delivery assembly 266. The preceding subject matter of this paragraph characterizes example 78 of the present disclosure, wherein example 78 also includes the subject matter according to any one of examples 73-77, above.

By being rotatable relative to delivery guide 112, surface roughener 144 may be selectively positioned to abrade section 194 as delivery guide 112 moves, including as it changes directions, relative to surface 114 and/or vice versa.

Referring generally to FIG. 1 and particularly to, e.g., FIG. 23, surface roughener 144 is configured to trail delivery guide 112 when delivery guide 112 moves relative to surface 114. The preceding subject matter of this paragraph characterizes example 79 of the present disclosure, wherein example 79 also includes the subject matter according to any one of examples 73-78, above.

By trailing delivery guide 112, surface roughener 144 is selectively positioned to abrade section 194 directly following segment 120 exiting delivery guide 112.

Referring generally to FIG. 1 and particularly to, e.g., FIG. 23, system 100 further comprises pivoting arm 152, configured such that pivoting arm 152 trails delivery guide 112 as delivery guide 112 moves relative to surface 114. Surface roughener 144 is coupled to pivoting arm 152. The preceding subject matter of this paragraph characterizes example 80 of the present disclosure, wherein example 80 also includes the subject matter according to any one of examples 73-79, above.

Pivoting arm 152 provides for selective pivoting of surface roughener 144 relative to delivery guide 112. Accordingly, surface roughener 144 may be selectively positioned to abrade section 194 as delivery guide 112 moves, including as it changes directions, relative to surface 114 and/or vice versa.

Referring generally to FIG. 1 and particularly to, e.g., FIG. 23, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 81 of the present disclosure, wherein example 81 also includes the subject matter according to example 80, above.

Pivoting-arm actuator 188 provides for selective pivoting of pivoting arm 152 and thus of surface roughener 144 relative to delivery guide 112. Accordingly, surface roughener 144 may be selectively positioned to abrade section 194 as delivery guide 112 moves, including as it changes directions, relative to surface 114 and/or vice versa.

Referring generally to FIG. 1 and particularly to, e.g., FIG. 23, pivoting-arm actuator 188 is configured to actively coordinate the rotational position of pivoting arm 152 with movement of delivery guide 112 relative to surface 114. The preceding subject matter of this paragraph characterizes example 82 of the present disclosure, wherein example 82 also includes the subject matter according to example 81, above.

Accordingly, surface roughener 144 may be selectively and actively positioned to abrade section 194 as delivery guide 112 moves, including as it changes directions, relative to surface 114 and/or vice versa.

Referring generally to FIG. 1 and particularly to, e.g., FIG. 23, system 100 further comprises compactor 138. Surface roughener 144 is positioned to abrade at least section 194 of segment 120 of continuous flexible line 106 following compaction of at least section 194 by compactor 138. The preceding subject matter of this paragraph characterizes example 83 of the present disclosure, wherein example 83 also includes the subject matter according to any one of examples 73-82, above.

A system according to example 83 includes both compactor 138 and surface roughener 144. By having surface roughener 144 positioned to abrade section 194 following compaction by compactor 138, the abrasion of section 194 is not hindered, or dulled, by a subsequent compaction thereof. Accordingly, abrasion of section 194 has an increased surface area for better adhesion of a subsequent layer deposited against it.

Referring generally to FIG. 1 and particularly to, e.g., FIG. 23, system 100 further comprises debris inlet 202, configured to collect debris resulting from abrading at least section 194 of segment 120 of continuous flexible line 106 with surface roughener 144. The preceding subject matter of this paragraph characterizes example 84 of the present disclosure, wherein example 84 also includes the subject matter according to any one of examples 73-79, above.

Collection by debris inlet 202 of debris that results from abrasion of section 194 by surface roughener 144, avoids unwanted, loose particles of photopolymer-resin component 110 becoming trapped between adjacent deposited layers of continuous flexible line 106 that may otherwise result in unwanted properties of composite part 102.

Referring to FIG. 1, system 100 further comprises vacuum source 203, selectively communicatively coupled with debris inlet 202. The preceding subject matter of this paragraph characterizes example 85 of the present disclosure, wherein example 85 also includes the subject matter according to example 84, above.

Vacuum source 202 draws air and debris from adjacent section 194 through debris inlet 202.

Referring generally to FIG. 1 and particularly to, e.g., FIG. 23, system 100 further comprises pivoting arm 152, coupled relative to delivery guide 112 such that pivoting arm 152 trails delivery guide 112 as at delivery guide 112 moves relative to surface 114. Debris inlet 202 is operatively coupled to pivoting arm 152. The preceding subject matter of this paragraph characterizes example 86 of the present disclosure, wherein example 86 also includes the subject matter according to any one of examples 84 or 85, above.

By being coupled to pivoting arm 152, debris inlet 202 is selectively positioned to collect debris directly from adjacent section 194 as delivery guide 112 moves relative to surface 114 and/or vice versa.

Referring generally to FIG. 1 and particularly to, e.g., FIG. 23, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 87 of the present disclosure, wherein example 87 also includes the subject matter according to example 86, above.

Pivoting-arm actuator 188, by actively controlling a rotational position of pivoting arm 152 relative to delivery guide 112, ensures that debris inlet 202 trails delivery guide 112 so that debris inlet 202 is selectively positioned to collect debris directly adjacent to section 194 as delivery guide 112 moves relative to surface 114 and/or vice versa.

Referring generally to FIG. 1 and particularly to, e.g., FIG. 23, pivoting-arm actuator 188 is configured to actively coordinate the rotational position of pivoting arm 152 with movement of delivery guide 112 relative to surface 114. The preceding subject matter of this paragraph characterizes example 88 of the present disclosure, wherein example 88 also includes the subject matter according to example 87, above.

Pivoting-arm actuator 188, by actively coordinating a rotational position of pivoting arm 152 relative to delivery guide 112, ensures that debris inlet 202 trails delivery guide 112 so that debris inlet 202 is selectively positioned to collect debris directly adjacent to section 194 as delivery guide 112 moves relative to surface 114 and/or vice versa.

Referring generally to FIG. 1 and particularly to, e.g., FIG. 23, system 100 further comprises pressurized-gas outlet 204, configured to disperse debris, resulting from roughening of segment 120 of continuous flexible line 106 by surface roughener 144, with a pressurized gas. The preceding subject matter of this paragraph characterizes example 89 of the present disclosure, wherein example 89 also includes the subject matter according to any one of examples 73-88, above.

Dispersal by pressurized-gas outlet 204 of debris that results from abrasion of section 194 by surface roughener 144, avoids unwanted, loose particles of photopolymer-resin component 110 becoming trapped between adjacent deposited layers of continuous flexible line 106 that may otherwise result in unwanted properties of composite part 102.

Referring to FIG. 1, system 100 further comprises pressurized-gas source 205, selectively communicatively coupled with pressurized-gas outlet 204. The preceding subject matter of this paragraph characterizes example 90 of the present disclosure, wherein example 90 also includes the subject matter according to example 89, above.

Pressurized-gas source 205 provides a source of the pressurized gas to be delivered to section 194 via pressurized-gas outlet 204.

Referring generally to FIG. 1 and particularly to, e.g., FIG. 23, system 100 further comprises pivoting arm 152, configured such that pivoting arm 152 trails delivery guide 112 as delivery guide 112 moves relative to surface 114. Pressurized-gas outlet 204 is operatively coupled to pivoting arm 152. The preceding subject matter of this paragraph characterizes example 91 of the present disclosure, wherein example 91 also includes the subject matter according to any one of examples 89 or 90, above.

By being coupled to pivoting arm 152, pressurized-gas outlet 204 is selectively positioned to collect debris directly from adjacent section 194 as delivery guide 112 moves relative to surface 114 and/or vice versa.

Referring generally to FIG. 1 and particularly to, e.g., FIG. 23, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 92 of the present disclosure, wherein example 92 also includes the subject matter according to example 91, above.

Pivoting-arm actuator 188, by actively controlling a rotational position of pivoting arm 152 relative to delivery guide 112, ensures that pressurized-gas outlet 204 trails delivery guide 112 so that pressurized-gas outlet 204 is selectively positioned to disperse debris directly adjacent to section 194 as delivery guide 112 moves relative to surface 114 and/or vice versa.

Referring generally to FIG. 1 and particularly to, e.g., FIG. 23, pivoting-arm actuator 188 is configured to actively coordinate the rotational position of pivoting arm 152 with movement of delivery guide 112 relative to surface 114. The preceding subject matter of this paragraph characterizes example 93 of the present disclosure, wherein example 93 also includes the subject matter according to example 92, above.

Pivoting-arm actuator 188, by actively coordinating a rotational position of pivoting arm 152 relative to delivery guide 112, ensures that pressurized-gas outlet 204 trails delivery guide 112 so that pressurized-gas outlet 204 is selectively positioned to disperse debris directly adjacent to section 194 as delivery guide 112 moves relative to surface 114 and/or vice versa.

Referring generally to FIG. 1 and particularly to, e.g., FIGS. 17-20, 23, 32, and 33, delivery guide 112 comprises guide line passage 154 through which continuous flexible line 106 is delivered to print path 122. Line passage 154 comprises guide outlet 206. System 100 further comprises cutter 208, configured to selectively cut continuous flexible line 106 adjacent to guide outlet 206. The preceding subject matter of this paragraph characterizes example 94 of the present disclosure, wherein example 94 also includes the subject matter according to any one of examples 1-93, above.

Inclusion of cutter 208 permits for the selective stopping and starting of delivery of continuous flexible line 106 by delivery guide 112. By having cutter 208 configured to cut continuous flexible line 106 adjacent to outlet 206, continuous flexible line 106 may be cut prior to being at least partially cured by curing energy 118 and while continuous flexible line 106 is not yet in contact with, and optionally compacted against, a prior deposited layer of continuous flexible line 106. In other words, access to an entirety of the circumference of continuous flexible line 106 by cutter 208 is permitted.

Referring generally to FIG. 1 and particularly to, e.g., FIGS. 17-19, 23, 32, and 33, cutter 208 comprises at least one blade 210, movable relative to delivery guide 112. The preceding subject matter of this paragraph characterizes example 95 of the present disclosure, wherein example 95 also includes the subject matter according to example 94, above.

Referring generally to FIG. 1 and particularly to, e.g., FIG. 17, cutter 208 is iris diaphragm 212. The preceding subject matter of this paragraph characterizes example 96 of the present disclosure, wherein example 96 also includes the subject matter according to any one of examples 94 or 95, above.

Iris diaphragm 212 enables cutting of continuous flexible line 106 from multiple sides of continuous flexible line 106. Accordingly, a cross-sectional profile of continuous flexible line 106 may be less deformed by cutter 208 than may otherwise result from other examples of cutter 208.

Referring generally to FIG. 1 and particularly to, e.g., FIG. 19, cutter 208 is positioned within delivery guide 112. The preceding subject matter of this paragraph characterizes example 97 of the present disclosure, wherein example 97 also includes the subject matter according to any one of examples 94-96, above.

Positioning of cutter 208 within delivery guide 112 provides for a compact assembly of system 100, such that cutter 208 does not hinder movement of delivery guide relative to surface 114 and/or vice versa.

Referring generally to FIG. 1 and particularly to, e.g., FIG. 20, cutter 208 comprises cutting laser 213. The preceding subject matter of this paragraph characterizes example 98 of the present disclosure, wherein example 98 also includes the subject matter according to example 94, above.

Use of cutting laser 213 to cut continuous flexible line 106 facilitates precision cutting of continuous flexible line 106 at a desired location during manufacture of composite part 102.

Referring generally to FIG. 1 and particularly to, e.g., FIG. 20, cutter 208 further comprises at least one galvanometer mirror-positioning system 214, configured to direct cutting laser 213 to selectively cut continuous flexible line 106 adjacent to outlet 206. The preceding subject matter of this paragraph characterizes example 99 of the present disclosure, wherein example 99 also includes the subject matter according to example 98, above.

In other words, one or more galvanometer mirror-positioning systems 214 may actively direct cutting laser 213 at continuous flexible line 106 as it exits delivery guide 112.

Referring generally to FIG. 1 and particularly to, e.g., FIG. 22, system 100 further comprises drive assembly 216, operatively coupled at least to one of delivery guide 112 or surface 114 and configured to operatively and selectively move at least one of delivery guide 112 or surface 114 relative to another. The preceding subject matter of this paragraph characterizes example 100 of the present disclosure, wherein example 100 also includes the subject matter according to any one of examples 1-99, above.

Drive assembly 216 facilitates the relative movement between delivery guide 112 and surface 114 so that composite part 102 is manufactured from continuous flexible line 106 as it is deposited via delivery guide 112.

Referring generally to FIG. 1 and particularly to, e.g., FIG. 22, drive assembly 216 comprises X-axis drive 217, Y-axis drive 219, and Z-axis drive 215, at least one of which is operatively coupled at least to one of delivery assembly 266 or surface 114. The preceding subject matter of this paragraph characterizes example 101 of the present disclosure, wherein example 101 also includes the subject matter according to example 100, above.

A system according to example 101 provides for three-dimensional relative movement between delivery guide 112 and surface 114.

Referring to FIG. 1, drive assembly 216 comprises robotic arm 218. The preceding subject matter of this paragraph characterizes example 102 of the present disclosure, wherein example 102 also includes the subject matter according to any one of examples 100 or 101, above.

Use of robotic arm 218 to operatively and selectively move delivery guide 112 relative to surface 114 and/or vice versa permits for multiple degrees of freedom and the manufacture of complex three-dimensional composite parts 102.

Referring generally to FIG. 1 and particularly to, e.g., FIG. 22, drive assembly 216 is configured to operatively and selectively move at least one of delivery guide 112 or surface 114 orthogonally in three dimensions relative to another. The preceding subject matter of this paragraph characterizes example 103 of the present disclosure, wherein example 103 also includes the subject matter according to any one of examples 100-102, above.

A system according to example 103 may manufacture composite part 102 in three dimensions.

Referring generally to FIG. 1 and particularly to, e.g., FIG. 22, drive assembly 216 is configured to operatively and selectively move at least one of delivery guide 112 or surface 114 in three dimensions with at least three degrees of freedom relative to another. The preceding subject matter of this paragraph characterizes example 104 of the present disclosure, wherein example 104 also includes the subject matter according to any one of examples 100-102, above.

A system according to example 104 may manufacture complex three-dimensional composite parts 102.

Referring generally to FIG. 1, drive assembly 216 is configured to operatively and selectively move at least one of delivery guide 112 or surface 114 in three dimensions with at least six degrees of freedom relative to another. The preceding subject matter of this paragraph characterizes example 105 of the present disclosure, wherein example 105 also includes the subject matter according to any one of examples 100-102, above.

A system according to example 105 may manufacture complex three-dimensional composite parts 102.

Referring to FIG. 1, drive assembly 216 is configured to operatively and selectively move at least one of delivery guide 112 or surface 114 in three dimensions with at least nine degrees of freedom relative to another. The preceding subject matter of this paragraph characterizes example 106 of the present disclosure, wherein example 106 also includes the subject matter according to any one of examples 100-102, above.

A system according to example 106 may manufacture complex three-dimensional composite parts 102.

Referring to FIG. 1 and particularly to, e.g., FIG. 38, drive assembly 216 is configured to operatively and selectively move at least one of delivery guide 112 or surface 114 in three dimensions with at least twelve degrees of freedom relative to another. The preceding subject matter of this paragraph characterizes example 107 of the present disclosure, wherein example 107 also includes the subject matter according to any one of examples 100-102, above.

A system according to example 107 may manufacture complex three-dimensional composite parts 102.

With reference to FIG. 38, a schematic illustration according to example 107 is presented, with linear translational elements 290 and rotational elements 292 providing twelve degrees of freedom between delivery guide 112 and surface 114, and with controller 294 being operatively communicatively coupled to linear translational elements 290 and rotational elements 292.

Referring to FIG. 1, system 100 further comprises shielding-gas outlet 220, configured to at least partially protect segment 120 of continuous flexible line 106 from oxidation by delivering shielding gas 221 to segment 120 of continuous flexible line 106 after segment 120 exits delivery guide 112. The preceding subject matter of this paragraph characterizes example 108 of the present disclosure, wherein example 108 also includes the subject matter according to any one of examples 1-107, above.

Inclusion of shielding-gas outlet 220 and delivery of shielding gas 221 therefrom to segment 120 restricts oxidation of continuous flexible line 106 prior to being at least partially cured and/or during curing by source 116.

Referring to FIG. 1, system 100 further comprises shielding-gas source 222, selectively communicatively coupled with shielding-gas outlet 220. The preceding subject matter of this paragraph characterizes example 109 of the present disclosure, wherein example 109 also includes the subject matter according to example 108, above.

Shielding-gas source 222 provides a source of shielding gas 221 to be delivered to segment 120 via shielding-gas outlet 220.

Referring to FIG. 1, system 100 further comprises shielding-gas outlet 220, configured to at least partially protect segment 120 of continuous flexible line 106 from oxidation by delivering shielding gas 221 to segment 120 of continuous flexible line 106 after segment 120 exits delivery guide 112. System 100 further comprises pivoting arm 152, coupled relative to delivery guide 112 such that pivoting arm 152 trails delivery guide 112 as delivery guide 112 moves relative to surface 114. Shielding-gas outlet 220 is operatively coupled to pivoting arm 152. The preceding subject matter of this paragraph characterizes example 110 of the present disclosure, wherein example 110 also includes the subject matter according to example 1, above.

By being coupled to pivoting arm 152, shielding-gas outlet 220 is selectively positioned to deliver shielding gas 221 to segment 120 as delivery guide 112 moves relative to surface 114 and/or vice versa.

Referring to FIG. 1, system 100 further comprises pivoting-arm actuator 188, operatively coupled to pivoting arm 152 and configured to actively control a rotational position of pivoting arm 152 relative to delivery guide 112 as delivery guide 112 moves relative to surface 114. The preceding subject matter of this paragraph characterizes example 111 of the present disclosure, wherein example 111 also includes the subject matter according to example 110, above.

Pivoting-arm actuator 188, by actively controlling a rotational position of pivoting arm 152 relative to delivery guide 112, ensures that shielding-gas outlet 220 trails delivery guide 112 so that shielding-gas outlet 220 is selectively positioned to deliver shielding gas 221 to segment 120 as delivery guide 112 moves relative to surface 114 and/or vice versa.

Referring to FIG. 1, pivoting-arm actuator 188 is configured to actively coordinate the rotational position of pivoting arm 152 with movement of delivery guide 112 relative to surface 114. The preceding subject matter of this paragraph characterizes example 112 of the present disclosure, wherein example 112 also includes the subject matter according to example 111, above.

Pivoting-arm actuator 188, by actively coordinating a rotational position of pivoting arm 152 relative to delivery guide 112, ensures that shielding-gas outlet 220 trails delivery guide 112 so that shielding-gas outlet 220 is selectively positioned to deliver shielding gas 221 to segment 120 as delivery guide 112 moves relative to surface 114 and/or vice versa.

Referring to FIG. 1, system 100 further comprises defect detector 224, configured to detect defects in segment 120 of continuous flexible line 106 after segment 120 of continuous flexible line 106 exits delivery guide 112. The preceding subject matter of this paragraph characterizes example 113 of the present disclosure, wherein example 113 also includes the subject matter according to any one of examples 1-112, above.

Detection of defects in segment 120 permits for selective scrapping of composite parts 102 having defects prior to completion of composite parts 102. Accordingly, less material may be wasted. Moreover, defects that otherwise would be hidden from view by various types of defect detectors may be detected by defect detector 224 prior to a subsequent layer of continuous flexible line 106 obscuring, or hiding, the defect from view.

Referring to FIG. 1, defect detector 224 comprises optical detector 226 or ultrasonic detector 227. The preceding subject matter of this paragraph characterizes example 114 of the present disclosure, wherein example 114 also includes the subject matter according to example 113, above.

In some applications, optical detector 226 may be well suited to detect defects in segment 120 of continuous flexible line 106. In some applications, ultrasonic detector 227 may be well suited to detect defects in segment 120 of continuous flexible line 106.

Referring to FIG. 1, defect detector 224 comprises camera 228. The preceding subject matter of this paragraph characterizes example 115 of the present disclosure, wherein example 115 also includes the subject matter according to example 113, above.

Camera 228 may be well suited to detect defects in segment 120 of continuous flexible line 106.

Referring to FIG. 1, system 100 further comprises controller 230 and one or more of origin 126 of continuous flexible line 106; pivoting-arm actuator 188; compactor 138; surface roughener 144; motor 162; debris inlet 202; vacuum source 203, selectively communicatively coupled with debris inlet 202; pressurized-gas outlet 204; pressurized-gas source 205, selectively communicatively coupled with pressurized-gas outlet 204; cutter 208; drive assembly 216; shielding-gas outlet 220; shielding-gas source 222, selectively communicatively coupled with shielding-gas outlet 220; defect detector 224; low-level sensor 246; high-level sensor 248; supply 262 of liquid photopolymer resin 252; and motorized roller 249. Controller 230 is programmed to selectively operate one or more of delivery guide 112, feed mechanism 104, source 116 of curing energy 118, origin 126 of continuous flexible line 106, pivoting-arm actuator 188, compactor 138, surface roughener 144, motor 162, vacuum source 203, pressurized-gas source 205, cutter 208, drive assembly 216, shielding-gas source 222, defect detector 224, low-level sensor 246, high-level sensor 248, supply 262 of liquid photopolymer resin 252, and motorized roller 249. The preceding subject matter of this paragraph characterizes example 116 of the present disclosure, wherein example 116 also includes the subject matter according to any one of examples 1-115, above.

Controller 230 controls the operation of various component parts of system 100. For example, precise movement of delivery guide 112 and/or surface 114 relative to each other may be controlled to manufacture a desired three-dimensional composite part 102. Precise pivoting of pivoting arm 152 by pivoting-arm actuator 188 may be controlled to precisely deliver a compaction force by compactor 138, to precisely deliver curing energy 118, to precisely abrade continuous flexible line 106 by surface roughener 144, and so forth. Additionally, operation of various component parts may be selectively started and stopped by controller 230 during manufacture of composite part 102 to create desired properties and configurations of composite part 102.

In FIG. 1, communication between controller 230 and various component parts of system 100 is schematically represented by lightning bolts. Such communication may be wired and/or wireless in nature.

Controller 230 may include any suitable structure that may be adapted, configured, designed, constructed, and/or programmed to automatically control the operation of at least a portion of system 100. As illustrative, non-exclusive examples, controller 230 may include and/or be an electronic controller, a dedicated controller, a special-purpose controller, a personal computer, a display device, a logic device, and/or a memory device. In addition, controller 230 may be programmed to perform one or more algorithms to automatically control the operation of system 100. This may include algorithms that may be based upon and/or that may cause controller 230 to direct system 100 to perform methods 300 and 400 disclosed herein.

Referring generally to FIG. 1 and particularly to, e.g., FIG. 22, system 100 further comprises frame 232. Frame 232 supports feed mechanism 104 and surface 114. The preceding subject matter of this paragraph characterizes example 117 of the present disclosure, wherein example 117 also includes the subject matter according to any one of examples 1-116, above.

Frame 232 structurally supports feed mechanism 104 and surface 114 so that feed mechanism 104 may operatively and selectively move delivery guide 112 relative to surface 114 and/or vice versa.

Referring, e.g., to FIGS. 1, 4-10, 14, and 21-28 and particularly to FIG. 34, method 300 of additively manufacturing composite part 102 is disclosed. Method 300 comprises (block 302) depositing segment 120 of continuous flexible line 106 along print path 122. Continuous flexible line 106 comprises non-resin component 108 and further comprises photopolymer-resin component 110 that is uncured. Method 300 further comprises (block 304) delivering a predetermined or actively determined amount of curing energy 118 at least to portion 124 of segment 120 of continuous flexible line 106 at a controlled rate, while advancing continuous flexible line 106 toward print path 122 and after segment 120 of continuous flexible line 106 is deposited along print path 120, to at least partially cure at least portion 124 of segment 120 of continuous flexible line 106. The preceding subject matter of this paragraph characterizes example 118 of the present disclosure.

Method 300 therefore may be performed to manufacture composite parts 102 from at least a composite material that includes photopolymer-resin component 110 initially in an uncured state and that is at least partially cured while composite part 102 is being manufactured, or in situ, by curing energy 118. As a result of delivering a predetermined or actively determined amount of curing energy 118 at a controlled rate, a desired level, or degree, of cure may be established with respect to portion 124 of segment 120 at any given time during manufacture of composite part 102. For example, as discussed herein, in some examples, it may be desirable to cure one portion 124 greater than or less than another portion 124 during manufacture of composite part 102. Moreover, method 300 may be performed to manufacture composite parts 102 with continuous flexible line 106 being oriented in desired and/or predetermined orientations throughout composite part 102, such as to define desired properties of composite part 102.

Method 300 may be performed by system 100.

Referring, e.g., to FIGS. 1-3 and 22 and particularly to FIG. 34, method 300 further comprises (block 306) applying liquid photopolymer resin 252 to non-resin component 108 while pushing continuous flexible line 106 through delivery guide 112. Photopolymer-resin component 110 comprises at least some of liquid photopolymer resin 252 applied to non-resin component 108. The preceding subject matter of this paragraph characterizes example 119 of the present disclosure, wherein example 119 also includes the subject matter according to example 118, above.

By applying liquid photopolymer resin 252 to non-resin component 108 during the manufacture of composite part 102, continuous flexible line 106 is created during manufacture of composite part 102. Accordingly, different non-resin components 108 and/or different liquid photopolymer resins 252 may be selected during performance of method 300 to customize or otherwise create a desired composite part 102 with different characteristics at different locations within composite part 102.

Referring, e.g., to FIGS. 1-3 and 22 and particularly to FIG. 34, (block 306) applying liquid photopolymer resin 252 to non-resin component 108 while pushing continuous flexible line 106 through delivery guide 112 comprises (block 308) pulling non-resin component 108 through vessel 236 containing a volume of liquid photopolymer resin 252. The preceding subject matter of this paragraph characterizes example 120 of the present disclosure, wherein example 120 also includes the subject matter according to example 119, above.

By pulling non-resin component 108 through liquid photopolymer resin 252 held in vessel 236, non-resin component 108 becomes coated in liquid photopolymer resin 252, thereby creating photopolymer resin component 110 and continuous flexible line 106.

Referring, e.g., to FIG. 1 and particularly to FIG. 34, method 300 further comprises (block 310) detecting a level of liquid photopolymer resin 252 within vessel 236 and selectively delivering liquid photopolymer resin 252 to vessel 236 when the volume of liquid photopolymer resin 252 is at or below a lower-threshold level. The preceding subject matter of this paragraph characterizes example 121 of the present disclosure, wherein example 121 also includes the subject matter according to example 120, above.

Detection of a low level of liquid photopolymer resin 252 in vessel 236 may be used to alert an operator that the level of liquid photopolymer resin 252 in vessel 236 is low and needs replenishing. Additionally or alternatively, detection of a low level may be used to facilitate an automatic replenishment of liquid photopolymer resin 252 in vessel 236.

Referring, e.g., to FIGS. 1-3 and particularly to FIG. 34, (block 308) pulling non-resin component 108 through vessel 236 comprises (block 312) limiting an amount of liquid photopolymer resin 252 that exits vessel 236. The preceding subject matter of this paragraph characterizes example 122 of the present disclosure, wherein example 122 also includes the subject matter according to any one of examples 120 or 121, above.

By limiting an amount of liquid photopolymer resin 252 that exits vessel 236, a desired amount of liquid photopolymer resin 252 may be applied to non-resin component 108 to create continuous flexible line 106. Additionally or alternatively, such limiting may prevent liquid photopolymer resin 252 from dripping, spilling, or otherwise undesirably coming into contact with composite part 102 or components of system 100, for example.

Referring, e.g., to FIGS. 1-3 and particularly to FIG. 34, (bock 308) pulling non-resin component 108 through vessel 236 comprises (block 314) uniformly applying liquid photopolymer resin 252 to non-resin component 108. The preceding subject matter of this paragraph characterizes example 123 of the present disclosure, wherein example 123 also includes the subject matter according to any one of examples 120-122, above.

By uniformly applying liquid photopolymer resin 252 to non-resin component 108, continuous flexible line 106 may be created with desired properties, for example, ensuring that non-resin component 108 is adequately coated, and in some examples fully impregnated, with liquid photopolymer resin 252.

Referring, e.g., to FIGS. 1-3 and particularly to FIG. 34, (block 308) pulling non-resin component 108 through vessel 236 comprises (block 316) configuring non-resin component 108 to have no bend less than 60-degrees between any two sequential segments of non-resin component 108 within vessel 236. The preceding subject matter of this paragraph characterizes example 124 of the present disclosure, wherein example 124 also includes the subject matter according to any one of examples 120-123, above.

Limiting bending of non-resin component 108 may prevent damage to non-resin component 108.

Referring, e.g., to FIGS. 4 and 5 and particularly to FIG. 34, non-resin component 108 comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 125 of the present disclosure, wherein example 125 also includes the subject matter according to any one of examples 118-124, above.

Inclusion of a fiber or fibers in continuous flexible line 106 permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. Non-resin component 108 is not limited to the identified examples, and other types of non-resin component 108 may be used.

FIG. 3 schematically represents continuous flexible line 106 with a single fiber as non-resin component 108 within a matrix of photopolymer-resin component 110. FIG. 4 schematically represents continuous flexible 106 with more than one fiber as non-resin component 108 within a matrix of photopolymer-resin component 110.

Referring, e.g., to FIG. 1 and particularly to FIG. 34, photopolymer-resin component 110 comprises at least one of an ultraviolet-light photopolymer resin, a visible-light photopolymer resin, an infrared-light photopolymer resin, or an x-ray photopolymer resin. The preceding subject matter of this paragraph characterizes example 126 of the present disclosure, wherein example 126 also includes the subject matter according to any one of examples 118-125, above.

An ultraviolet-light photopolymer resin, an infrared-light photopolymer resin, or an x-ray photopolymer resin may be selected so as to avoid inadvertent curing by visible light and/or to permit for precisely directing curing energy 118 to portion 124 of segment 120 of continuous flexible line 106 after segment 120 of continuous flexible line 106 exits delivery guide 112. On the other hand, a visible-light photopolymer may be selected so that source 116 need only deliver visible light to cure portion 124.

Referring, e.g., to FIGS. 1 and 6 and particularly to FIG. 34, (block 302) depositing segment 120 of continuous flexible line 106 along print path 122 comprises (block 318) layering continuous flexible line 106 against itself or a previously deposited segment 120 to additively manufacture composite part 102. The preceding subject matter of this paragraph characterizes example 127 of the present disclosure, wherein example 127 also includes the subject matter according to any one of examples 118-126, above.

By layering continuous flexible line 106 against itself or a previously deposited segment 120, a three-dimensional composite part 102 may be manufactured by performance of method 300.

Accordingly, method 300 may be described as a 3-D printing method and/or as an additive manufacturing method.

Referring, e.g., to FIG. 1 and particularly to FIG. 34, (block 302) depositing segment 120 of continuous flexible line 106 along print path 122 comprises (block 320) depositing continuous flexible line 106 in a predetermined pattern to selectively control one or more physical characteristics of composite part 102. The preceding subject matter of this paragraph characterizes example 128 of the present disclosure, wherein example 128 also includes the subject matter according to any one of examples 118-127, above.

By controlling one or more physical characteristics of composite part 102, less overall material may be used and/or the size of a specific part may be reduced when compared to a similar part manufactured by a traditional composite layup method.

For example, in contrast to composite parts constructed from multiple layers of planar plies of composite material, composite part 102 may be manufactured so that the orientation of continuous flexible line 106, and thus of non-resin component 108, results in desired properties. As an example, if a part includes holes, continuous flexible line may be arranged generally in concentric circles or spiral around the holes, resulting in no or few interruptions to continuous flexible line 106 at the boundary of the holes. As a result, the strength of the part may be significantly greater around the hole than a similar part constructed by traditional composite layup methods. In addition the part may be less subject to cracks and propagation thereof at the boundary of the holes. Moreover, because of the desired properties around the holes, the overall thickness, volume, and/or mass of the part may be reduced while achieving the desired properties, when compared to a similar part constructed by traditional composite layup methods.

Referring, e.g., to FIG. 1 and particularly to FIG. 34, at least one of (block 302) depositing segment 120 of continuous flexible line 106 along print path 122 or (block 304) delivering the predetermined or actively determined amount of curing energy 118 at least to portion 124 of segment 120 of continuous flexible line 106 at the controlled rate provides different physical characteristics at different locations of composite part 102. The preceding subject matter of this paragraph characterizes example 129 of the present disclosure, wherein example 129 also includes the subject matter according to any one of examples 118-128, above.

The controlled deposition of continuous flexible line 106 and/or the controlled delivery of curing energy 118 may be selected to result in desired physical characteristics at different locations of composite part 102. For example, it may be desirable to cure one portion of continuous flexible line 106 greater than or less than another portion of continuous flexible line 106 during manufacture of composite part 102. In some applications, a less cured portion may be desirable so that it may be subsequently worked on by a subsequent process, such as to remove material and/or add a structural or other component to composite part 102.

Referring, e.g., to FIG. 1 and particularly to FIG. 34, the physical characteristics include at least one of strength, stiffness, flexibility, ductility, or hardness. The preceding subject matter of this paragraph characterizes example 130 of the present disclosure, wherein example 130 also includes the subject matter according to any one of examples 128 or 129, above.

Each of these physical characteristics may be selected for a particular purpose. For example, in a composite part that when in use receives a significant torque on a sub-part thereof compared to the remainder of the composite part, it may be desirable to have such sub-part less stiff and/or more flexible than other parts of the composite part. Additionally, it may be desirable to build more strength into a sub-part than other parts of composite part 102 for various reasons depending on a specific application of composite part 102.

Referring, e.g., to FIGS. 1 and 6 and particularly to FIG. 34, (block 304) delivering the predetermined or actively determined amount of curing energy 118 at least to portion 124 of segment 120 of continuous flexible line 106 at the controlled rate comprises (block 322) partially curing first layer 140 of segment 120 of continuous flexible line 106 as first layer 140 is being deposited and further curing first layer 140 as second layer 142 is being deposited against first layer 140. The preceding subject matter of this paragraph characterizes example 131 of the present disclosure, wherein example 131 also includes the subject matter according to any one of examples 118-130, above.

By only partially curing first layer 140 as first layer 140 is being deposited, first layer 140 may remain tacky, or sticky, thereby facilitating adhesion of second layer 142 against first layer 140 as second layer 142 is deposited against first layer 140. Then, first layer 140 is further cured as second layer 142 is being partially cured for deposition of a subsequent layer against second layer 142, and so forth.

Referring, e.g., to FIGS. 1 and 6 and particularly to FIG. 34, (block 304) delivering the predetermined or actively determined amount of curing energy 118 at least to portion 124 of segment 120 of continuous flexible line 106 at the controlled rate comprises (block 324) partially curing first layer 140 of segment 120 of continuous flexible line 106 as first layer 140 is being deposited and fully curing first layer 140 as second layer 142 is being deposited against first layer 140. The preceding subject matter of this paragraph characterizes example 132 of the present disclosure, wherein example 132 also includes the subject matter according to any one of examples 118-131, above.

Again, by only partially curing first layer 140 as first layer 140 is being deposited, first layer 140 may remain tacky, or sticky, thereby facilitating adhesion of second layer 142 against first layer 140 as second layer 142 is deposited against first layer 140. However, according to this example 132, first layer 140 is fully cured as second layer 142 is being partially cured.

Referring, e.g., to FIG. 1 and particularly to FIG. 34, (block 304) delivering the predetermined or actively determined amount of curing energy 118 at least to portion 124 of segment 120 of continuous flexible line 106 at the controlled rate comprises (block 326) curing less than an entirety of composite part 102. The preceding subject matter of this paragraph characterizes example 133 of the present disclosure, wherein example 133 also includes the subject matter according to any one of examples 118-132, above.

In some applications, a less cured portion may be desirable so that it may be subsequently worked on by a subsequent process, such as to remove material and/or add a structural or other component to composite part 102.

Referring, e.g., to FIG. 1 and particularly to FIG. 34, method 300 further comprises (block 328) restrictively curing at least a portion of composite part 102. The preceding subject matter of this paragraph characterizes example 134 of the present disclosure, wherein example 134 also includes the subject matter according to any one of examples 118-133, above.

Again, in some applications, a less cured portion may be desirable so that it may be subsequently worked on by a subsequent process, such as to remove material and/or add a structural or other component to composite part 102, and a less cured portion may result from restriction of the curing process.

Referring, e.g., to FIG. 1 and particularly to FIG. 34, (block 330) the portion of composite part 102 is restrictively cured to facilitate subsequent processing of the portion. The preceding subject matter of this paragraph characterizes example 135 of the present disclosure, wherein example 135 also includes the subject matter according to example 134, above.

Subsequent processing on composite part 102 may be desirable, such as to remove material and/or add a structural or other component to composite part 102.

Referring, e.g., to FIG. 1 and particularly to FIG. 34, (block 332) delivering the predetermined or actively determined amount of curing energy 118 at least to portion 124 of segment 120 of continuous flexible line 106 at the controlled rate comprises (block 332) selectively varying at least one of a delivery rate or a delivery duration of curing energy 118 to impart varying physical characteristics to composite part 102. The preceding subject matter of this paragraph characterizes example 136 of the present disclosure, wherein example 136 also includes the subject matter according to any one of examples 118-135, above.

By imparting varying physical characteristics of composite part 102, a customized composite part 102 may be manufactured with sub-parts having desirable properties that are different from other sub-parts.

Referring, e.g., to FIG. 1 and particularly to FIG. 34, the varying physical characteristics include at least one of strength, stiffness, flexibility, ductility, or hardness. The preceding subject matter of this paragraph characterizes example 137 of the present disclosure, wherein example 137 also includes the subject matter according to example 136, above.

As mentioned, each of these properties may be selected for a particular purpose. For example, in composite part 102 that when in use receives a significant torque on a sub-part thereof compared to the remainder of composite part 102, it may be desirable to have such sub-part less stiff and/or more flexible than other parts of composite part 102. Additionally, it may be desirable to build more strength into a sub-part than other parts of composite part 102 for various reasons depending on a specific application of composite part 102.

Referring, e.g., to FIGS. 1, 12-16, 22, 23, and 25 and particularly to FIG. 34, method 300 further comprises (block 334), simultaneously with depositing segment 120 of continuous flexible line 106 along print path 122, compacting at least section 180 of segment 120 of continuous flexible line 106 after segment 120 of continuous flexible line 106 is deposited along print path 122. The preceding subject matter of this paragraph characterizes example 138 of the present disclosure, wherein example 138 also includes the subject matter according to any one of examples 118-137, above.

Compaction of section 180 of continuous flexible line 106 during performance of method 300 facilitates adherence between adjacent layers of continuous flexible line 106 being deposited during performance of method 300.

Referring, e.g., to FIGS. 1 and 13 and particularly to FIG. 34, (block 334) compacting at least section 180 of segment 120 of continuous flexible line 106 after segment 120 of continuous flexible line 106 is deposited along print path 122 comprises (block 336) imparting a desired cross-sectional shape to segment 120 of continuous flexible line 106. The preceding subject matter of this paragraph characterizes example 139 of the present disclosure, wherein example 139 also includes the subject matter according to example 138, above.

It may be desirable, in some applications, to impart a predetermined cross-sectional shape to continuous flexible line 106 as it is being deposited.

Referring, e.g., to FIGS. 1 and 23 and particularly to FIG. 34, method 300 further comprises, (block 338) simultaneously with depositing segment 120 of continuous flexible line 106 along print path 122, roughening at least section 194 of segment 120 of continuous flexible line 106 after segment 120 of continuous flexible line 106 is deposited along print path 122. The preceding subject matter of this paragraph characterizes example 140 of the present disclosure, wherein example 140 also includes the subject matter according to any one of examples 118-139, above.

Roughening section 194 of continuous flexible line 106 increases the surface area thereof and aids in adhesion of a subsequent layer of continuous flexible line 106 deposited against it during performance of method 300.

Referring, e.g., to FIGS. 1 and 23 and particularly to FIG. 34, method 300 further comprises, (block 340) simultaneously with roughening at least section 194 of segment 120 of continuous flexible line 106, collecting debris resulting from roughening at least section 194 of segment 120 of continuous flexible line 106. The preceding subject matter of this paragraph characterizes example 141 of the present disclosure, wherein example 141 also includes the subject matter according to example 140, above.

Collection of debris that results from roughening section 194 avoids unwanted, loose particles of photopolymer-resin component 110 becoming trapped between adjacent deposited layers of continuous flexible line 106 that may otherwise result in unwanted properties of composite part 102.

Referring, e.g., to FIGS. 1 and 23 and particularly to FIG. 34, method 300 further comprises, (block 342) simultaneously with roughening at least section 194 of segment 120 of continuous flexible line 106, dispersing debris resulting from roughening at least section 194 of segment 120 of continuous flexible line 106. The preceding subject matter of this paragraph characterizes example 142 of the present disclosure, wherein example 142 also includes the subject matter according to any one of examples 140 or 141, above.

Dispersal of debris that results from roughening section 194 avoids unwanted, loose particles of photopolymer-resin component 110 becoming trapped between adjacent deposited layers of continuous flexible line 106 that may otherwise result in unwanted properties of composite part 102.

Referring, e.g., to FIGS. 1, 17-20, 23, 32, and 33 and particularly to FIG. 34, method 300 further comprises (block 344) selectively cutting continuous flexible line 106. The preceding subject matter of this paragraph characterizes example 143 of the present disclosure, wherein example 143 also includes the subject matter according to any one of examples 118-142, above.

Selective cutting of continuous flexible line 106 during performance of method 300 permits for the stopping and starting of continuous flexible line 106 in different locations on composite part 102.

Referring, e.g., to FIGS. 1, 17-20, 23, 32, and 33 and particularly to FIG. 34, (block 346) continuous flexible line 106 is selectively cut simultaneously with depositing segment 120 of continuous flexible line 106 along print path 122. The preceding subject matter of this paragraph characterizes example 144 of the present disclosure, wherein example 144 also includes the subject matter according to example 143, above.

Simultaneous cutting and delivering of continuous flexible line 106 provides for controlled deposition of continuous flexible line 106 along print path 122.

Referring, e.g., to FIG. 1 and particularly to FIG. 34, method 300 further comprises, (block 348) simultaneously with delivering the predetermined or actively determined amount of curing energy 118 at least to portion 124 of segment 120 of continuous flexible line 106 at the controlled rate, at least partially protecting at least portion 124 of segment 120 of continuous flexible line 106 from oxidation after segment 120 exits delivery guide 112. The preceding subject matter of this paragraph characterizes example 145 of the present disclosure, wherein example 145 also includes the subject matter according to any one of examples 118-144, above.

Protecting portion 124 from oxidation may facilitate the subsequent and/or simultaneous curing of portion 124.

Referring, e.g., to FIG. 1 and particularly to FIG. 34, (block 350) at least portion 124 of segment 120 of continuous flexible line 106 is at least partially protected from the oxidation with a shielding gas. The preceding subject matter of this paragraph characterizes example 146 of the present disclosure, wherein example 146 also includes the subject matter according to example 145, above.

Again, protecting portion 124 from oxidation may facilitate the subsequent and/or simultaneous curing of portion 124.

Referring, e.g., to FIG. 1 and particularly to FIG. 34, method 300 further comprises, (block 352) simultaneously with depositing segment 120 of continuous flexible line 106 along print path 122, detecting defects in composite part 102. The preceding subject matter of this paragraph characterizes example 147 of the present disclosure, wherein example 147 also includes the subject matter according to any one of examples 118-146, above.

Detection of defects in segment 120 permits for selective scrapping of composite parts 102 having defects prior to completion of composite parts 102. Accordingly, less material may be wasted. Moreover, defects that otherwise would be hidden from view by various types of defect detectors may be detected prior to a subsequent layer of continuous flexible line 106 obscuring, or hiding, the defect from view.

Referring, e.g., to FIG. 1 and particularly to FIG. 34, (block 302) depositing segment 120 of continuous flexible line 106 along print path 122 comprises (block 354) depositing at least a portion of segment 120 of continuous flexible line 106 over a sacrificial layer. The preceding subject matter of this paragraph characterizes example 148 of the present disclosure, wherein example 148 also includes the subject matter according to any one of examples 118-147, above.

Use of a sacrificial layer may permit for deposition of an initial layer of continuous flexible line 106 in midair without requiring an outer mold, surface 114, or other rigid structure for initial deposition of the initial layer. That is, the sacrificial layer may become an outer mold for subsequent deposition of layers that are not sacrificial.

Referring, e.g., to FIG. 1 and particularly to FIG. 34, method 300 further comprises (block 356) removing the sacrificial layer to form composite part 102. The preceding subject matter of this paragraph characterizes example 149 of the present disclosure, wherein example 149 also includes the subject matter according to example 148, above.

Removal of the sacrificial layer results in composite part 102 being in a desired state, which may be a completed state or may be a state that is subsequently operated on by processes after completion of method 300.

Referring, e.g., to FIG. 1 and particularly to FIG. 34, method 300 further comprises (block 358) depositing segment 120A of continuous flexible line 106A along print path 122. The preceding subject matter of this paragraph characterizes example 150 of the present disclosure, wherein example 150 also includes the subject matter according to any one of examples 118-149, above.

In other words, different configurations of continuous flexible line 106 may be used during performance of method 300.

For example, different properties of different continuous flexible lines 106 may be selected for different sub-parts of composite part 102. As an example, continuous flexible line 106 may comprise non-resin component 108 that comprises carbon fiber for a significant portion of composite part 102, but continuous flexible line 106 may comprise non-resin component 108 that comprises copper wiring for another portion to define an integral electrical path for connection to an electrical component. Additionally or alternatively, a different non-resin component 108 may be selected for an outer surface of composite part 102 than non-resin component 108 selected for internal portions of composite part 102. Various other examples also are within the scope of example 161.

Referring, e.g., to FIG. 1 and particularly to FIG. 34, continuous flexible line 106A differs from continuous flexible line 106 in at least one of non-resin component 108 or photopolymer-resin component 110. The preceding subject matter of this paragraph characterizes example 151 of the present disclosure, wherein example 151 also includes the subject matter according to example 150, above.

Varying non-resin component 108 and/or photopolymer-resin component 110 during performance of method 300 permits for customized composite parts 102 to be manufactured with varying and desired properties throughout composite part 102.

Referring, e.g., to FIGS. 1, 10, and 23-31 and particularly to FIG. 34, (block 302) depositing segment 120 of continuous flexible line 106 along print path 122 comprises (block 360) pushing continuous flexible line 106 through delivery guide 112. The preceding subject matter of this paragraph characterizes example 152 of the present disclosure, wherein example 152 also includes the subject matter according to any one of examples 118-151, above.

By pushing continuous flexible line 106 through delivery guide 112, delivery guide 112 may be positioned downstream of the source of motive force that pushes continuous flexible line 106, such as feed mechanism 104 herein. As a result, such source of motive force does not interfere with deposition of continuous flexible line 106, and delivery guide 112 may be more easily manipulated in complex three-dimensional patterns during performance of method 300.

Referring to FIG. 34, method 300 further comprises (block 362) curing composite part 102 in an autoclave or an oven. The preceding subject matter of this paragraph characterizes example 153 of the present disclosure, wherein example 153 also includes the subject matter according to any one of examples 118-152, above.

Accordingly, the in situ delivery of curing energy 118 may only partially cure composite part 102, such as to permit subsequent work on composite part 102, as discussed herein, and a subsequent fully curing of composite part 102 may be accomplished in an autoclave or oven when needed.

Referring, e.g., to FIGS. 1-11, 14, and 21-31 and particularly to FIG. 35, method 400 of additively manufacturing composite part 102 is disclosed. Method 400 comprises (block 402) applying liquid photopolymer resin 252 to non-resin component 108 to create continuous flexible line 106 by pulling non-resin component 108 through vessel 236 containing a volume of liquid photopolymer resin 252. Continuous flexible line 106 comprises non-resin component 108 and photopolymer-resin component 110 that comprises at least some of liquid photopolymer resin 252 applied to non-resin component 108. Method 400 further comprises (block 404) routing continuous flexible line 106 into delivery guide 112, (block 406) pushing continuous flexible line 106 out of delivery guide 112, (block 408) depositing, via delivery guide 112, segment 120 of continuous flexible line 106 along print path 122, and (block 410) delivering curing energy 118 at least to portion 124 of segment 120 of continuous flexible line 106. The preceding subject matter of this paragraph characterizes example 154 of the present disclosure.

Method 400 therefore may be performed to manufacture composite parts 102 from at least a composite material that includes photopolymer-resin component 110 initially in an uncured state and that is at least partially cured while composite part 102 is being manufactured, or in situ, by curing energy 118. By applying liquid photopolymer resin 252 to non-resin component 108 during the manufacture of composite part 102, continuous flexible line 106 is created during manufacture of composite part 102. Accordingly, different non-resin components 108 and/or different liquid photopolymer resins 252 may be selected during performance of method 400 to customize or otherwise create a desired composite part 102 with different characteristics at different locations within composite part 102. Moreover, method 400 may be performed to manufacture composite parts 102 with continuous flexible line 106 being oriented in desired and/or predetermined orientations throughout composite part 102, such as to define desired properties of composite part 102.

Method 400 may be performed by system 100.

Referring, e.g., to FIG. 1 and particularly to FIG. 35, method 400 further comprises (block 412) detecting a level of liquid photopolymer resin 252 within vessel 236 and selectively delivering liquid photopolymer resin 252 to vessel 236 when the volume of liquid photopolymer resin 252 is at or below a lower-threshold level. The preceding subject matter of this paragraph characterizes example 155 of the present disclosure, wherein example 155 also includes the subject matter according to example 154, above.

Accordingly, an operator may be alerted that the level of liquid photopolymer resin 252 within vessel 236 is low and needs replenishing. Additionally or alternatively, liquid photopolymer resin 252 may be automatically replenished in view of detecting a low level in vessel 236.

Referring, e.g., to FIGS. 1-3 and particularly to FIG. 35, (block 402) pulling non-resin component 108 through vessel 236 comprises limiting an amount of liquid photopolymer resin 252 that exits vessel 236. The preceding subject matter of this paragraph characterizes example 156 of the present disclosure, wherein example 156 also includes the subject matter according to any one of examples 154 or 155, above.

By limiting an amount of liquid photopolymer resin 252 that exits vessel 236, a desired amount of liquid photopolymer resin 252 may be applied to non-resin component 108 to create continuous flexible line 106. In addition, such limitation may avoid undesirable contact of excess liquid photopolymer resin 252 with component parts of system 100 or with portions of composite part 102.

Referring, e.g., to FIGS. 1-3 and particularly to FIG. 35, (block 402) pulling non-resin component 108 through vessel 236 comprises uniformly applying liquid photopolymer resin 252 to non-resin component 108. The preceding subject matter of this paragraph characterizes example 157 of the present disclosure, wherein example 157 also includes the subject matter according to any one of examples 154-156, above.

Uniformly applying liquid photopolymer resin 252 may be desirable to facilitate adhesion between layers of continuation flexible line 106 being deposited via delivery guide 112, as well as to prevent undesirable voids being formed in composite part 102.

Referring, e.g., to FIGS. 1-3 and particularly to FIG. 35, (block 402) pulling non-resin component 108 through vessel 236 comprises configuring non-resin component 108 to have no bend less than 60-degrees between any two sequential segments of non-resin component 108 within vessel 236. The preceding subject matter of this paragraph characterizes example 158 of the present disclosure, wherein example 158 also includes the subject matter according to any one of examples 154-157, above.

Limiting bending of non-resin component 108 may prevent damage to non-resin component 108.

Referring, e.g., to FIGS. 1, 6-9, 14, 21, and 23-28 and particularly to FIG. 35, (block 420) curing energy 118 is delivered at least to portion 124 of segment 120 of continuous flexible line 106 as continuous flexible line 106 is pushed through delivery guide 112 toward print path 122 and after segment 120 of continuous flexible line 106 is deposited along print path 122. The preceding subject matter of this paragraph characterizes example 159 of the present disclosure, wherein example 159 also includes the subject matter according to any one of examples 154-158, above.

Simultaneous curing and pushing, results in in situ curing of composite part 102, and subsequent curing, such as in an autoclave, may not be necessary.

Referring, e.g., to FIGS. 1, 6-9, 14, 21, and 23-28 and particularly to FIG. 35, (block 410) delivering curing energy 118 at least to portion 124 of segment 120 of continuous flexible line 106 comprises (block 422) delivering a predetermined or actively determined amount of curing energy 118 at least to portion 124 of segment 120 of continuous flexible line 106 at a controlled rate, while advancing continuous flexible line 106 toward print path 122 and after segment 120 of continuous flexible line 106 is deposited along print path 122, to at least partially cure at least portion 124 of segment 120 of continuous flexible line 106. The preceding subject matter of this paragraph characterizes example 160 of the present disclosure, wherein example 160 also includes the subject matter according to any one of examples 154-159, above.

As a result of delivering a predetermined or actively determined amount of curing energy 118 at a controlled rate, a desired level, or degree, of cure may be established with respect to portion 124 of segment 120 at any given time during manufacture of composite part 102. For example, as discussed herein, in some examples, it may be desirable to cure one portion 124 greater than or less than another portion 124 during manufacture of composite part 102.

161. Referring, e.g., to FIGS. 1 and 6 and particularly to FIG. 35, (block 422) delivering the predetermined or actively determined amount of curing energy 118 at least to portion 124 of segment 120 of continuous flexible line 106 at the controlled rate comprises (block 424) partially curing first layer 140 of segment 120 of continuous flexible line 106 as first layer 140 is being deposited and further curing first layer 140 as second layer 142 is being deposited against first layer 140. The preceding subject matter of this paragraph characterizes example 161 of the present disclosure, wherein example 161 also includes the subject matter according to example 160, above.

By only partially curing first layer 140 as first layer 140 is being deposited, first layer 140 may remain tacky, or sticky, thereby facilitating adhesion of second layer 142 against first layer 140 as second layer 142 is deposited against first layer 140. Then, first layer 140 is further cured as second layer 142 is being partially cured for deposition of a subsequent layer against second layer 142, and so forth.

Referring, e.g., to FIGS. 1 and 6 and particularly to FIG. 35, (block 422) delivering the predetermined or actively determined amount of curing energy 118 at least to portion 124 of segment 120 of continuous flexible line 106 at the controlled rate comprises (block 426) partially curing first layer 140 of segment 120 of continuous flexible line 106 as first layer 140 is being deposited and fully curing first layer 140 as second layer 142 is being deposited against first layer 140. The preceding subject matter of this paragraph characterizes example 162 of the present disclosure, wherein example 162 also includes the subject matter according to any one of examples 160 or 161, above.

Again, by only partially curing first layer 140 as first layer 140 is being deposited, first layer 140 may remain tacky, or sticky, thereby facilitating adhesion of second layer 142 against first layer 140 as second layer 142 is deposited against first layer 140. However, according to this example 162, first layer 140 is fully cured as second layer 142 is being partially cured.

Referring, e.g., to FIG. 1 and particularly to FIG. 35, (block 422) delivering the predetermined or actively determined amount of curing energy 118 at least to portion 124 of segment 120 of continuous flexible line 106 at the controlled rate comprises (block 428) curing less than an entirety of composite part 102. The preceding subject matter of this paragraph characterizes example 163 of the present disclosure, wherein example 163 also includes the subject matter according to any one of examples 160-162, above.

In some applications, a less cured portion may be desirable so that it may be subsequently worked on by a subsequent process, such as to remove material and/or add a structural or other component to composite part 102.

164. Referring, e.g., to FIG. 1 and particularly to FIG. 35, (block 422) delivering the predetermined or actively determined amount of curing energy 118 at least to portion 124 of segment 120 of continuous flexible line 106 at the controlled rate comprises (block 430) selectively varying at least one of a delivery rate or a delivery duration of curing energy 118 to impart varying physical characteristics to composite part 102. The preceding subject matter of this paragraph characterizes example 164 of the present disclosure, wherein example 164 also includes the subject matter according to any one of examples 160-163, above.

By imparting varying physical characteristics of composite part 102, a customized composite part 102 may be manufactured with sub-parts having desirable properties that are different from other sub-parts.

Referring, e.g., to FIG. 1 and particularly to FIG. 35, the varying physical characteristics include at least one of strength, stiffness, flexibility, ductility, or hardness. The preceding subject matter of this paragraph characterizes example 165 of the present disclosure, wherein example 165 also includes the subject matter according to example 164, above.

As mentioned, each of these properties may be selected for a particular purpose. For example, in composite part 102 that when in use receives a significant torque on a sub-part thereof compared to the remainder of composite part 102, it may be desirable to have such sub-part less stiff and/or more flexible than other parts of composite part 102. Additionally, it may be desirable to build more strength into a sub-part than other parts of composite part 102 for various reasons depending on a specific application of composite part 102.

Referring, e.g., to FIGS. 1, 4, and 5 and particularly to FIG. 35, non-resin component 108 comprises one or more of a fiber, a carbon fiber, a glass fiber, a synthetic organic fiber, an aramid fiber, a natural fiber, a wood fiber, a boron fiber, a silicon-carbide fiber, an optical fiber, a fiber bundle, a fiber tow, a fiber weave, a wire, a metal wire, a conductive wire, or a wire bundle. The preceding subject matter of this paragraph characterizes example 166 of the present disclosure, wherein example 166 also includes the subject matter according to any one of examples 154-165, above.

Inclusion of a fiber or fibers in continuous flexible line 106 permits for selecting desired properties of composite part 102. Moreover, selection of specific materials of fibers and/or selection of specific configurations of fibers (e.g., a bundle, a tow, and/or a weave) may permit for precise selection of desired properties of composite part 102. Example properties of composite parts 102 include strength, stiffness, flexibility, ductility, hardness, electrical conductivity, thermal conductivity, etc. Non-resin component 108 is not limited to the identified examples, and other types of non-resin component 108 may be used.

Referring, e.g., to FIG. 1 and particularly to FIG. 35, liquid photopolymer resin 252 comprises at least one of an ultraviolet-light photopolymer resin, a visible-light photopolymer resin, an infrared-light photopolymer resin, or an x-ray photopolymer resin. The preceding subject matter of this paragraph characterizes example 167 of the present disclosure, wherein example 167 also includes the subject matter according to any one of examples 154-166, above.

An ultraviolet-light photopolymer, an infrared photopolymer resin, or an x-ray photopolymer resin may be selected so as to avoid inadvertent curing by visible light and/or to permit for precisely directing curing energy 118 to portion 124 of segment 120 of continuous flexible line 106. On the other hand, a visible-light photopolymer may be selected so that curing energy 118 in the form of visible light may be used to cure portion 124.

Referring, e.g., to FIGS. 1 and 6 and particularly to FIG. 35, (block 408) depositing segment 120 of continuous flexible line 106 along print path 122 comprises (block 432) layering continuous flexible line 106 against itself or a previously deposited segment 120 to additively manufacture composite part 102. The preceding subject matter of this paragraph characterizes example 168 of the present disclosure, wherein example 168 also includes the subject matter according to any one of examples 154-167, above.

By layering continuous flexible line 106 against itself, a three-dimensional composite part 102 may be manufactured by performance of method 400.

Referring, e.g., to FIG. 1 and particularly to FIG. 35, (block 408) depositing segment 120 of continuous flexible line 106 along print path 122 comprises (block 434) depositing continuous flexible line 106 in a predetermined pattern to selectively control one or more physical characteristics of composite part 102. The preceding subject matter of this paragraph characterizes example 169 of the present disclosure, wherein example 169 also includes the subject matter according to any one of examples 154-168, above.

By controlling one or more physical characteristics of composite part 102, less overall material may be used and/or the size of a specific part may be reduced when compared to a similar part manufactured by a traditional composite layup method.

For example, in contrast to composite parts constructed from multiple layers of planar plies of composite material, composite part 102 may be manufactured so that the orientation of continuous flexible line 106, and thus of non-resin component 108, results in desired properties. As an example, if a part includes holes, continuous flexible line may be arranged generally in concentric circles or spiral around the holes, resulting in no or few interruptions to continuous flexible line 106 at the boundary of the holes. As a result, the strength of the part may be significantly greater around the hole than a similar part constructed by traditional composite layup methods. In addition, the part may be less subject to cracks and propagation thereof at the boundary of the holes. Moreover, because of the desired properties around the holes, the overall thickness, volume, and/or mass of the part may be reduced while achieving the desired properties, when compared to a similar part constructed by traditional composite layup methods.

Referring, e.g., to FIG. 1 and particularly to FIG. 35, at least one of (block 408) depositing segment 120 of continuous flexible line 106 along print path 122 or (block 410) delivering curing energy 118 at least to portion 124 of segment 120 of continuous flexible line 106 provides different physical characteristics at different locations of composite part 102. The preceding subject matter of this paragraph characterizes example 170 of the present disclosure, wherein example 170 also includes the subject matter according to any one of examples 154-169, above.

Again, for various reasons and applications, it may be desirable to manufacture composite part 102 with different properties at different locations.

Referring, e.g., to FIG. 1 and particularly to FIG. 35, the physical characteristics include at least one of strength, stiffness, flexibility, ductility, or hardness. The preceding subject matter of this paragraph characterizes example 171 of the present disclosure, wherein example 171 also includes the subject matter according to any one of examples 169 or 170, above.

Each of these properties may be selected for a particular purpose. For example, in a composite part that, when in use, receives a significant torque on a sub-part thereof compared to the remainder of the composite part, it may be desirable to have such sub-part less stiff and/or more flexible than other parts of the composite part. Additionally, it may be desirable to build more strength into a sub-part than other parts of composite part 102 for various reasons depending on a specific application of composite part 102.

Referring, e.g., to FIG. 1 and particularly to FIG. 35, method 400 further comprises (block 436) restrictively curing at least a portion of composite part 102. The preceding subject matter of this paragraph characterizes example 172 of the present disclosure, wherein example 172 also includes the subject matter according to any one of examples 154-171, above.

Again, in some applications, a less cured portion may be desirable so that it may be subsequently worked on by a subsequent process, such as to remove material and/or add a structural or other component to composite part 102, and a less cured portion may result from restriction of the curing process.

Referring, e.g., to FIG. 1 and particularly to FIG. 35, (block 438) the portion of composite part 102 is restrictively cured to facilitate subsequent processing of the portion. The preceding subject matter of this paragraph characterizes example 173 of the present disclosure, wherein example 173 also includes the subject matter according to example 172, above.

Subsequent processing of composite part 102 may be desirable, such as to remove material and/or add a structural or other component to composite part 102.

Referring, e.g., to FIGS. 1, 12-16, 23, and 25 and particularly to FIG. 35, method 400 further comprises, (block 440) simultaneously with depositing segment 120 of continuous flexible line 106 along print path 122, compacting at least section 180 of segment 120 of continuous flexible line 106 after segment 120 of continuous flexible line 106 is deposited along print path 122. The preceding subject matter of this paragraph characterizes example 174 of the present disclosure, wherein example 174 also includes the subject matter according to any one of examples 154-173, above.

Compaction of section 180 of continuous flexible line 106 during performance of method 400 facilitates adherence between adjacent layers of continuous flexible line 106 being deposited during performance of method 400.

Referring, e.g., to FIGS. 1 and 13 and particularly to FIG. 35, (block 440) compacting at least section 180 of segment 120 of continuous flexible line 106 after segment 120 of continuous flexible line 106 is deposited along print path 122 comprises (block 442) imparting a desired cross-sectional shape to segment 120 of continuous flexible line 106. The preceding subject matter of this paragraph characterizes example 175 of the present disclosure, wherein example 175 also includes the subject matter according to example 174, above.

It may be desirable, in some applications, to impart a predetermined cross-sectional shape to continuous flexible line 106 as it is being deposited.

Referring, e.g., to FIGS. 1, 12, and 23 and particularly to FIG. 35, method 400 further comprises, (block 444) simultaneously with depositing segment 120 of continuous flexible line 106 along print path 122, roughening at least section 194 of segment 120 of continuous flexible line 106 after segment 120 of continuous flexible line 106 is deposited along print path 122. The preceding subject matter of this paragraph characterizes example 176 of the present disclosure, wherein example 176 also includes the subject matter according to any one of examples 154-175, above.

Roughening section 194 of continuous flexible line 106 increases the surface area thereof and aids in adhesion of a subsequent layer of continuous flexible line 106 deposited against it during performance of method 400.

Referring, e.g., to FIGS. 1 and 23 and particularly to FIG. 35, method 400 further comprises, (block 446) simultaneously with roughening at least section 194 of segment 120 of continuous flexible line 106, collecting debris resulting from roughening at least section 194 of segment 120 of continuous flexible line 106. The preceding subject matter of this paragraph characterizes example 177 of the present disclosure, wherein example 177 also includes the subject matter according to example 176, above.

Collection of debris that results from roughening section 194 avoids unwanted, loose particles of photopolymer-resin component 110 becoming trapped between adjacent deposited layers of continuous flexible line 106 that may otherwise result in unwanted properties of composite part 102.

Referring, e.g., to FIGS. 1 and 23 and particularly to FIG. 35, method 400 further comprises, (block 448) simultaneously with roughening at least section 194 of segment 120 of continuous flexible line 106, dispersing debris resulting from roughening at least section 194 of segment 120 of continuous flexible line 106. The preceding subject matter of this paragraph characterizes example 178 of the present disclosure, wherein example 178 also includes the subject matter according to any one of examples 176 or 177, above.

Dispersal of debris that results from roughening section 194 avoids unwanted, loose particles of photopolymer-resin component 110 becoming trapped between adjacent deposited layers of continuous flexible line 106 that may otherwise result in unwanted properties of composite part 102.

Referring, e.g., to FIGS. 1, 17-20, 23, 32, and 33 and particularly to FIG. 35, method 400 further comprises (block 450) selectively cutting continuous flexible line 106. The preceding subject matter of this paragraph characterizes example 179 of the present disclosure, wherein example 179 also includes the subject matter according to any one of examples 154-178, above.

Selective cutting of continuous flexible line 106 during performance of method 300 permits for the stopping and starting of continuous flexible line 106 in different locations on composite part 102.

Referring, e.g., to FIGS. 1, 17-20, 23, 32, and 33 and particularly to FIG. 35, (block 452) continuous flexible line 106 is selectively cut simultaneously with depositing segment 120 of continuous flexible line 106 along print path 122. The preceding subject matter of this paragraph characterizes example 180 of the present disclosure, wherein example 180 also includes the subject matter according to example 179, above.

Simultaneous cutting and depositing of continuous flexible line 106 provides for controlled deposition of continuous flexible line 106 along print path 122.

Referring, e.g., to FIG. 1 and particularly to FIG. 35, method 400 further comprises, (block 454) simultaneously with delivering curing energy 118 at least to portion 124 of segment 120 of continuous flexible line 106, at least partially protecting at least portion 124 of segment 120 of continuous flexible line 106 from oxidation after segment 120 exits delivery guide 112. The preceding subject matter of this paragraph characterizes example 181 of the present disclosure, wherein example 181 also includes the subject matter according to any one of examples 154-180, above.

Protecting portion 124 from oxidation may facilitate the subsequent and/or simultaneous curing of portion 124.

Referring, e.g., to FIG. 1 and particularly to FIG. 35, (block 456) at least portion 124 of segment 120 of continuous flexible line 106 is at least partially protected from the oxidation with a shielding gas. The preceding subject matter of this paragraph characterizes example 182 of the present disclosure, wherein example 182 also includes the subject matter according to example 181, above.

Again, protecting portion 124 from oxidation may facilitate the subsequent and/or simultaneous curing of portion 124.

Referring, e.g., to FIG. 1 and particularly to FIG. 35, method 400 further comprises, (block 458) simultaneously with depositing segment 120 of continuous flexible line 106 along print path 122, detecting defects in composite part 102. The preceding subject matter of this paragraph characterizes example 183 of the present disclosure, wherein example 183 also includes the subject matter according to any one of examples 154-182, above.

Detection of defects in segment 120 permits for selective scrapping of composite parts 102 having defects prior to completion of composite parts 102. Accordingly, less material may be wasted. Moreover, defects that otherwise would be hidden from view by various types of defect detectors may be detected prior to a subsequent layer of continuous flexible line 106 obscuring, or hiding, the defect from view.

Referring, e.g., to FIG. 1 and particularly to FIG. 35, (block 408) depositing segment 120 of continuous flexible line 106 along print path 122 comprises (block 460) depositing at least a portion of segment 120 of continuous flexible line 106 over a sacrificial layer. The preceding subject matter of this paragraph characterizes example 184 of the present disclosure, wherein example 184 also includes the subject matter according to any one of examples 154-183, above.

Use of a sacrificial layer may permit for deposition of an initial layer of continuous flexible line 106 in midair without requiring an outer mold, surface 114, or other rigid structure for initial deposition of the initial layer. That is, the sacrificial layer may become an outer mold for subsequent deposition of layers that are not sacrificial.

Referring, e.g., to FIG. 1 and particularly to FIG. 35, method 400 further comprises (block 462) removing the sacrificial layer to form composite part 102. The preceding subject matter of this paragraph characterizes example 185 of the present disclosure, wherein example 185 also includes the subject matter according to example 184, above.

Removal of the sacrificial layer results in composite part 102 being in a desired state, which may be a completed state or may be a state that is subsequently operated on by processes after completion of method 400.

Referring, e.g., to FIG. 1 and particularly to FIG. 35, method 400 further comprises (block 464) depositing segment 120A of continuous flexible line 106A along print path 122. The preceding subject matter of this paragraph characterizes example 186 of the present disclosure, wherein example 186 also includes the subject matter according to any one of examples 154-185, above.

In other words, different configurations of continuous flexible line 106 may be used during performance of method 400.

For example, different properties of different continuous flexible lines 106 may be selected for different sub-parts of composite part 102. As an example, continuous flexible line 106 may comprise non-resin component 108 that comprises carbon fiber for a significant portion of composite part 102, but continuous flexible line 106 may comprise non-resin component 108 that comprises copper wiring for another portion to define an integral electrical path for connection to an electrical component. Additionally or alternatively, a different non-resin component 108 may be selected for an outer surface of composite part 102 than non-resin component 108 selected for internal portions of composite part 102. Various other examples also are within the scope of example 186.

Referring, e.g., to FIG. 1 and particularly to FIG. 35, continuous flexible line 106A differs from continuous flexible line 106 in at least one of non-resin component 108 or photopolymer-resin component 110. The preceding subject matter of this paragraph characterizes example 187 of the present disclosure, wherein example 187 also includes the subject matter according to example 186, above.

Varying non-resin component 108 and/or photopolymer-resin component 110 during performance of method 400 permits for customized composite parts 102 to be manufactured with varying and desired properties throughout composite part 102.

Referring to FIG. 35, method 400 further comprises (block 466) curing composite part 102 in an autoclave or an oven. The preceding subject matter of this paragraph characterizes example 188 of the present disclosure, wherein example 188 also includes the subject matter according to any one of examples 154-187, above.

Accordingly, the in situ delivery of curing energy 118 may only partially cure composite part 102, such as to permit subsequent work on composite part 102, as discussed herein, and a subsequent fully curing of composite part 102 may be accomplished in an autoclave or oven when needed.

Examples of the present disclosure may be described in the context of aircraft manufacturing and service method 1100 as shown in FIG. 35 and aircraft 1102 as shown in FIG. 36. During pre-production, illustrative method 1100 may include specification and design (block 1104) of aircraft 1102 and material procurement (block 1106). During production, component and subassembly manufacturing (block 1108) and system integration block 1110 of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator e.g., a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 36, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed:

1. A system for additively manufacturing a composite part, the system comprising:
 a delivery guide movable relative to a surface and configured to deposit at least a segment of a continuous flexible line along a print path, wherein the print path is stationary relative to the surface;
 a vessel, separate from the delivery guide, wherein the vessel comprises an inlet and an outlet, and wherein the vessel is configured to hold a volume of a liquid photopolymer resin, to receive a non-resin component through the inlet, to apply a quantity of the liquid photopolymer resin to the non-resin component to create the continuous flexible line, and to discharge the continuous flexible line through the outlet;
 a feed mechanism, configured to pull the non-resin component through the vessel by engaging the continuous flexible line, discharged through the outlet of the vessel, and further configured to push the continuous flexible line through the delivery guide, wherein the continuous flexible line comprises the non-resin component and further comprises a photopolymer-resin component that comprises at least some of the liquid photopolymer resin applied to the non-resin component in the vessel, wherein the feed mechanism comprises:
  opposing rollers, configured to engage opposite sides of the continuous flexible line and to selectively rotate to push the continuous flexible line through the delivery guide;
  a scraper in contact with at least one of the opposing rollers to remove residue of the photopolymer-resin component, produced when the opposing rollers engage the continuous flexible line as the opposing rollers rotate to selectively translate the continuous flexible line to push the continuous flexible line through the delivery guide; and
  a collection reservoir, configured to collect the residue of the photopolymer-resin component removed by the scraper; and
 a source of curing energy, wherein the source is configured to deliver the curing energy at least to a portion of the segment of the continuous flexible line after the segment of the continuous flexible line exits the delivery guide.

2. The system according to claim 1, wherein:
the outlet comprises a convergent passage, shaped to limit an amount of the liquid photopolymer resin exiting the vessel as part of the continuous flexible line.

3. The system according to claim 2, wherein the convergent passage is shaped to facilitate uniform application of the liquid photopolymer resin to the non-resin component.

4. The system according to claim 1, wherein:
the vessel further comprises a guide positioned to route the non-resin component through the vessel along a predetermined path.

5. The system according to claim 4, wherein the guide is positioned to impart no bend less than 60-degrees between any two sequential segments of the non-resin component as the non-resin component travels through the vessel.

6. The system according to claim 4, wherein the guide comprises two or more guide structures.

7. The system according to claim 4, wherein the guide comprises one or more rollers.

8. The system according to claim 7, wherein at least one of the one or more rollers comprises a motorized roller configured to facilitate movement of the non-resin component through the vessel.

9. The system according to claim 1, further comprising a supply of the liquid photopolymer resin, wherein:
the vessel comprises a low-level sensor, positioned to detect when a level of the liquid photopolymer resin in the vessel is at or below a lower-threshold level; and
the supply is configured to selectively deliver the liquid photopolymer resin to the vessel when the level of the liquid photopolymer resin is at or below the lower-threshold level.

10. The system according to claim 9, further comprising the supply of the liquid photopolymer resin, wherein:
the vessel further comprises a high-level sensor, positioned to detect when the level of the liquid photopolymer resin in the vessel is at or above an upper-threshold level; and
the supply is configured to selectively deliver the liquid photopolymer resin to the vessel when the level of the liquid photopolymer resin is at or below the lower-threshold level and to selectively cease delivering the liquid photopolymer resin to the vessel when the level of the liquid photopolymer resin is at or above the upper-threshold level.

11. The system according to claim 1, wherein the source of the curing energy is configured to deliver the curing energy at least to the portion of the segment of the continuous flexible line as the feed mechanism pushes the continuous flexible line through the delivery guide toward the print path and after the segment of the continuous flexible line is deposited along the print path.

12. The system according to claim 1, wherein the source of the curing energy is configured to deliver an actively determined amount of the curing energy at a controlled rate at least to the portion of the segment of the continuous flexible line, wherein the actively determined amount of the curing energy is based on real-time data, sensed from the continuous flexible line as it is being deposited, and wherein the real-time data includes hardness, color, temperature, or glow of the continuous flexible line.

13. The system according to claim 1, wherein the source of the curing energy is operatively coupled to the delivery guide and is configured to move with the delivery guide.

14. The system according to claim 1, wherein the source of the curing energy is configured to partially cure a first layer of the segment of the continuous flexible line as at least a portion of the first layer is being deposited by the delivery guide against the surface and to further cure the first layer and to partially cure a second layer as the second layer is being deposited by the delivery guide against the first layer.

15. The system according to claim 1, wherein:
the delivery guide comprises a guide inlet, a guide outlet, through which the continuous flexible line exits the delivery guide, and a guide line passage extending from the guide inlet to the guide outlet;
the feed mechanism is configured to push the continuous flexible line through the guide line passage;
the feed mechanism comprises a support frame; and
the opposing rollers are rotatably coupled to the support frame.

16. The system according to claim 1, further comprising a compactor operatively coupled to the delivery guide and configured to impart a compaction force at least to a section of plural adjacent layers of the continuous flexible line after the segment of the continuous flexible line exits the delivery guide.

17. The system according to claim 16, wherein the compactor is rotatable relative to the delivery guide.

18. The system according to claim 1, further comprising a surface roughener operatively coupled to the delivery guide and configured to increase surface area of at least a section of the segment of the continuous flexible line after the segment of the continuous flexible line exits the delivery guide to facilitate adhesion of a subsequent layer of the continuous flexible line with the section of the segment of the continuous flexible line.

19. The system according to claim 1, wherein the delivery guide comprises a guide line passage through which the continuous flexible line is delivered to the print path and the guide line passage comprises a guide outlet, the system further comprising a cutter configured to selectively cut the continuous flexible line adjacent to the guide outlet.

20. The system according to claim 1, further comprising a defect detector, configured to detect defects in the segment of the continuous flexible line after the segment of the continuous flexible line exits the delivery guide.

21. The system according to claim 15, wherein:
the delivery guide further comprises a first end portion, a second end portion, and a junction between the first end portion and the second end portion;
the first end portion is shaped to be complementary to one of the opposing rollers and the second end portion is shaped to be complementary to another of the opposing rollers; and
a shortest distance (D) between the junction and a plane containing the respective rotational axes of the opposing rollers is less than a radius of a smallest one of the opposing rollers.

22. The system according to claim 21, wherein the junction comprises an edge.

23. The system according to claim 1, wherein:
at least one of the opposing rollers comprises a circumferential channel configured to contact the continuous flexible line; and
the scraper comprises a projection configured to remove from the circumferential channel the residue of the photopolymer-resin component produced by the engagement between the circumferential channel and the continuous flexible line as the opposing rollers rotate to selectively translate the continuous flexible line to push the continuous flexible line through the guide line passage.

24. The system according to claim 1, wherein:
the delivery guide comprises a guide inlet, a guide outlet, through which the continuous flexible line exits the delivery guide, and a guide line passage extending from the guide inlet to the guide outlet;
the delivery guide further comprises a curing-energy passage;
the source of the curing energy is configured to deliver the curing energy through the curing-energy passage at least to the portion of the segment of the continuous flexible line; and
the curing-energy passage is optically isolated from the guide line passage.

25. The system according to claim 24, wherein the curing-energy passage encircles the guide line passage, such that the curing energy exiting from the curing-energy passage results in a ring of the curing energy intersecting the segment of the continuous flexible line.

26. The system according to claim 16, wherein:
the compactor comprises a skirt coupled to the delivery guide; and
the skirt comprises a skirt drag surface that is positioned to drag against at least the section of the segment of the continuous flexible line after the segment of the continuous flexible line exits the delivery guide.

27. The system according to claim 16, further comprising:
a pivoting arm coupled relative to the delivery guide such that the pivoting arm trails the delivery guide as the delivery guide moves relative to the surface, wherein the compactor is coupled to the pivoting arm.

28. The system according to claim 27, further comprising:
a pivoting-arm actuator operatively coupled to the pivoting arm and configured to actively control a rotational position of the pivoting arm relative to the delivery guide as the delivery guide moves relative to the surface;
wherein the pivoting-arm actuator is configured to actively coordinate the rotational position of the pivoting arm with movement of the delivery guide relative to the surface.

29. The system according to claim 18, wherein the source of the curing energy is configured to deliver the curing energy at least to the portion of the segment of the continuous flexible line prior to the surface roughener abrading the portion.

30. The system according to claim 18, wherein the source of the curing energy is configured to deliver the curing energy at least to the portion of the segment of the continuous flexible line after the surface roughener abrades the portion.

31. The system according to claim 1, wherein the source of the curing energy is rotatable relative to the delivery guide.

32. The system according to claim 1, wherein the source of the curing energy is configured to trail the delivery guide when the delivery guide moves relative to the surface.

33. The system according to claim 1, wherein the source of the curing energy is configured to deliver a ring of the curing energy, intersecting the segment of the continuous flexible line.

34. The system according to claim 1, wherein the source of the curing energy is configured not to move with the delivery guide.

35. The system according to claim 1, wherein the source of the curing energy comprises at least one galvanometer mirror-positioning system, configured to deliver the curing energy at least to the portion of the segment of the continuous flexible line responsive to movement of the delivery guide relative to the surface.

36. The system according to claim 1, further comprising a pivoting arm, coupled relative to the delivery guide such that the pivoting arm trails the delivery guide as the delivery guide moves relative to the surface, and wherein the source of the curing energy is coupled to the pivoting arm.

37. The system according to claim 36, further comprising a pivoting-arm actuator, operatively coupled to the pivoting arm and configured to actively control a rotational position of the pivoting arm relative to the delivery guide as the delivery guide moves relative to the surface.

38. The system according to claim 1, wherein:
the feed mechanism further comprises a motor, operatively coupled at least to one of the opposing rollers and configured to selectively rotate at least one of the opposing rollers;
the opposing rollers comprise a driven roller, operatively coupled to the motor, and an idle roller, biased toward the driven roller to operatively engage opposing sides of the continuous flexible line;
the feed mechanism further comprises a rocker arm;
the idle roller is rotationally coupled to the rocker arm;
the rocker arm is biased so that the idle roller is biased toward the driven roller; and
the rocker arm is configured to selectively pivot the idle roller away from the driven roller.

39. The system according to claim 38, wherein the feed mechanism further comprises a rocker-arm adjuster, configured to selectively adjust a force applied to the rocker arm to bias the idle roller toward the driven roller.

40. The system according to claim 16, wherein the compactor comprises a compaction roller, having a compaction-roller surface that is configured to roll over at least the section of the segment of the continuous flexible line after the segment of the continuous flexible line exits the delivery guide.

41. The system according to claim 40, wherein the compaction-roller surface is textured.

42. The system according to claim 40, wherein the compaction-roller surface is shaped to impart a predetermined cross-sectional shape at least to the section of the segment of the continuous flexible line after the segment of the continuous flexible line exits the delivery guide.

43. The system according to claim 16, wherein the compactor comprises a compaction wiper, having a wiper drag surface that is configured to drag against at least the section of the segment of the continuous flexible line after the segment of the continuous flexible line exits the delivery guide.

44. The system according to claim 43, wherein the wiper drag surface is textured.

45. The system according to claim 43, wherein the wiper drag surface is shaped to impart a predetermined cross-sectional shape to the segment of the continuous flexible line after the segment of the continuous flexible line exits the delivery guide.

46. The system according to claim 16, wherein the compactor is biased toward the section of the segment of the continuous flexible line.

47. The system according to claim 16, wherein the compactor is configured to trail the delivery guide when the delivery guide moves relative to the surface.

48. The system according to claim 18, wherein the surface roughener comprises a roughening roller that is configured to rotationally abrade at least the section of the segment of the continuous flexible line after the segment of the continuous flexible line exits the delivery guide.

49. The system according to claim 48, wherein the roughening roller comprises a roughening roller surface, shaped to impart a predetermined cross-sectional shape to the segment of the continuous flexible line after the segment of the continuous flexible line exits the delivery guide.

50. The system according to claim 18, wherein the surface roughener comprises a roughening drag surface that is configured to translationally abrade at least the section of the segment of the continuous flexible line after the segment of the continuous flexible line exits the delivery guide.

51. The system according to claim 18, wherein the surface roughener is biased toward the section of the segment of the continuous flexible line after the segment of the continuous flexible line exits the delivery guide.

52. The system according to claim 18, wherein the surface roughener is rotatable relative to the delivery guide.

53. The system according to claim 18, wherein the surface roughener is configured to trail the delivery guide when the delivery guide moves relative to the surface.

54. The system according to claim 18, further comprising a pivoting arm, configured such that the pivoting arm trails the delivery guide as the delivery guide moves relative to the surface, and wherein the surface roughener is coupled to the pivoting arm.

55. The system according to claim 54, further comprising a pivoting-arm actuator, operatively coupled to the pivoting arm and configured to actively control a rotational position of the pivoting arm relative to the delivery guide as the delivery guide moves relative to the surface, and wherein the pivoting-arm actuator is configured to actively coordinate the rotational position of the pivoting arm with movement of the delivery guide relative to the surface.

56. The system according to claim 18 further comprising a compactor, and wherein the surface roughener is positioned to abrade at least the section of the segment of the continuous flexible line following compaction of at least the section by the compactor.

57. The system according to claim 18, further comprising a debris inlet, configured to collect debris, resulting from abrading at least the section of the segment of the continuous flexible line with the surface roughener.

58. The system according to claim 18, further comprising a pressurized-gas outlet, configured to disperse debris, resulting from roughening of the segment of the continuous flexible line by the surface roughener, with a pressurized gas.

59. The system according to claim 19, wherein the cutter is an iris diaphragm.

60. The system according to claim 19, wherein the cutter is positioned within the delivery guide.

61. The system according to claim 19, wherein the cutter comprises a cutting laser.

62. The system according to claim 61, wherein the cutter further comprises at least one galvanometer mirror-positioning system, configured to direct the cutting laser to selectively cut the continuous flexible line adjacent to the guide outlet.

63. The system according to claim 1, further comprising:
a shielding-gas outlet, configured to at least partially protect the segment of the continuous flexible line from oxidation by delivering a shielding gas to the segment of the continuous flexible line after the segment exits the delivery guide; and
a pivoting arm, coupled relative to the delivery guide such that the pivoting arm trails the delivery guide as the delivery guide moves relative to the surface, and wherein the shielding-gas outlet is operatively coupled to the pivoting arm.

64. A system for additively manufacturing a composite part, the system comprising:
a delivery guide, movable relative to a surface and configured to deposit at least a segment of a continuous flexible line along a print path, wherein the print path is stationary relative to the surface;
a vessel, configured to hold a volume of a liquid photopolymer resin and to apply a quantity of the liquid photopolymer resin to a non-resin component;
a feed mechanism, configured to pull the non-resin component through the vessel and to push the continuous flexible line, comprising the non-resin component and further comprising a photopolymer-resin component that comprises at least some of the liquid photopolymer resin applied to the non-resin component in the vessel, out of the delivery guide; and
a source of curing energy, wherein the source is configured to deliver the curing energy at least to a portion of the segment of the continuous flexible line after the segment of the continuous flexible line exits the delivery guide; and
wherein the source of the curing energy comprises at least one galvanometer mirror-positioning system, configured to deliver a ring of the curing energy, intersecting the segment of the continuous flexible line, responsive to movement of the delivery guide relative to the surface.

65. The system according to claim 64, wherein the source of the curing energy is configured to deliver a predetermined or actively determined amount of the curing energy at a controlled rate at least to the portion of the segment of the continuous flexible line.

66. The system according to claim 64, wherein the source of the curing energy is configured to partially cure a first layer of the segment of the continuous flexible line as at least a portion of the first layer is being deposited by the delivery guide against the surface and to further cure the first layer and to partially cure a second layer as the second layer is being deposited by the delivery guide against the first layer.

* * * * *